(12) United States Patent
Powell et al.

(10) Patent No.: US 11,862,822 B2
(45) Date of Patent: Jan. 2, 2024

(54) DIRECT CARBON FUEL CELL (DCFC) WITH MOLTEN METAL

(71) Applicant: Worcester Polytechnic Institute, Worcester, MA (US)

(72) Inventors: Adam C. Powell, Newton, MA (US); Boyd Davis, Worcester, MA (US); Uday Bhanu Pal, Worcester, MA (US); Yu Zhong, Worcester, MA (US); Christian Faria, Worcester, MA (US); Naoki Ono, Worcester, MA (US); Takeshi Inozume, Tokyo (JP); Chiaki Endo, Tokyo (JP); Tomoya Miyauchi, Tokyo (JP)

(73) Assignee: Worcester Polytechnic Institute, Worcester, MA (US)

( * ) Notice: Subject to any disclaimer, the term of this patent is extended or adjusted under 35 U.S.C. 154(b) by 0 days.

(21) Appl. No.: 17/586,165

(22) Filed: Jan. 27, 2022

(65) Prior Publication Data
US 2022/0238893 A1   Jul. 28, 2022

Related U.S. Application Data

(60) Provisional application No. 63/141,994, filed on Jan. 27, 2021.

(51) Int. Cl.
*H01M 8/0234* (2016.01)
*H01M 8/14* (2006.01)
*H01M 4/96* (2006.01)

(52) U.S. Cl.
CPC .......... *H01M 8/0234* (2013.01); *H01M 4/96* (2013.01); *H01M 8/14* (2013.01)

(58) Field of Classification Search
None
See application file for complete search history.

(56) References Cited

U.S. PATENT DOCUMENTS

| 2006/0234098 A1 | 10/2006 | Gur |
| 2016/0156056 A1* | 6/2016 | Gorte ............... H01M 8/124 429/495 |

FOREIGN PATENT DOCUMENTS

| CN | 105932299 A | 9/2016 |
| WO | 2014175976 A1 | 10/2014 |
| WO | 2015152759 A1 | 10/2015 |

OTHER PUBLICATIONS

International Search Report, PCT/US2022/014043, dated May 5, 2022, pp. 1-2.

* cited by examiner

*Primary Examiner* — Haroon S. Sheikh
(74) *Attorney, Agent, or Firm* — Armis IP Law, LLC

(57) ABSTRACT

Devices and methods for generating electricity in a direct carbon fuel cell are provided herein. The method includes heating and melting an alloy to obtain a liquid alloy anode; circulating the liquid alloy anode through a porous ceramic cathode, the cathode being a tubular structure and in communication with oxygen; reducing the oxygen at the porous cathode to obtain oxygen ions for diffusing through an electrolyte to the liquid alloy anode; and oxidizing the oxygen ions at the liquid alloy anode thereby generating electricity. The direct carbon fuel cells have high electronic conductivity, high carbon solubility with fast carbon diffusion, lower viscosity and eutectic temperatures, and rapid fuel dissolution kinetics.

20 Claims, 46 Drawing Sheets

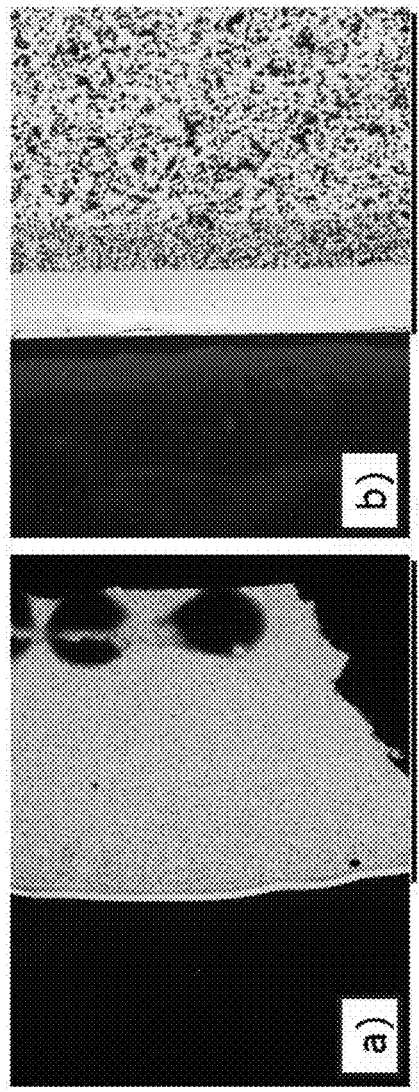
Figure 43A
Figure 43B
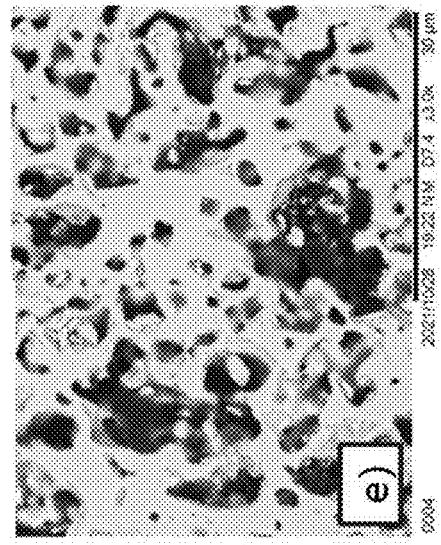
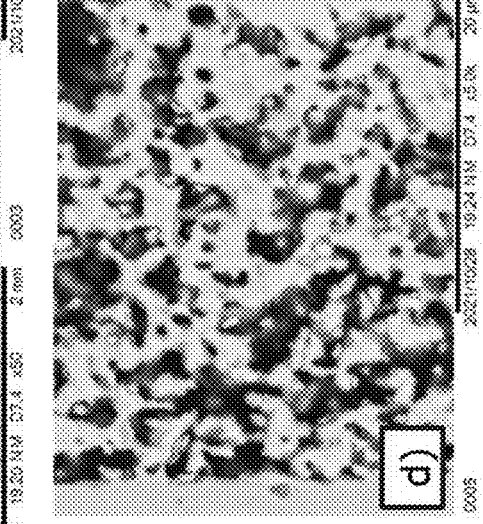
Figure 43C
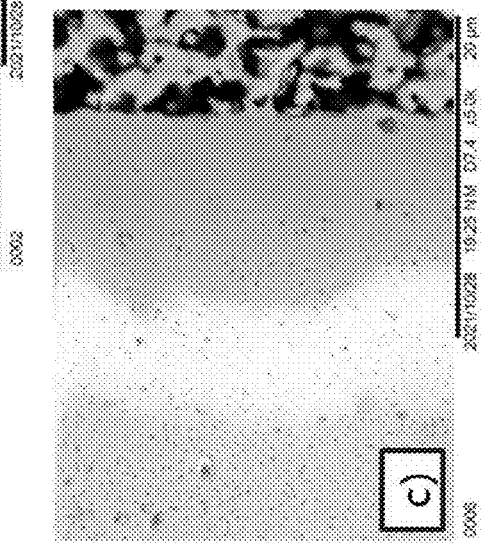
Figure 43D
Figure 43E

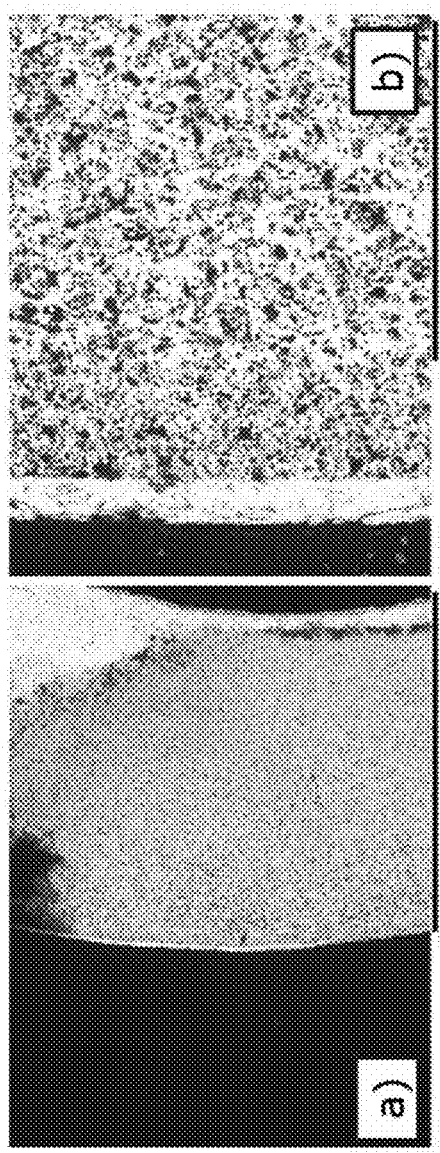
Figure 44A
Figure 44B
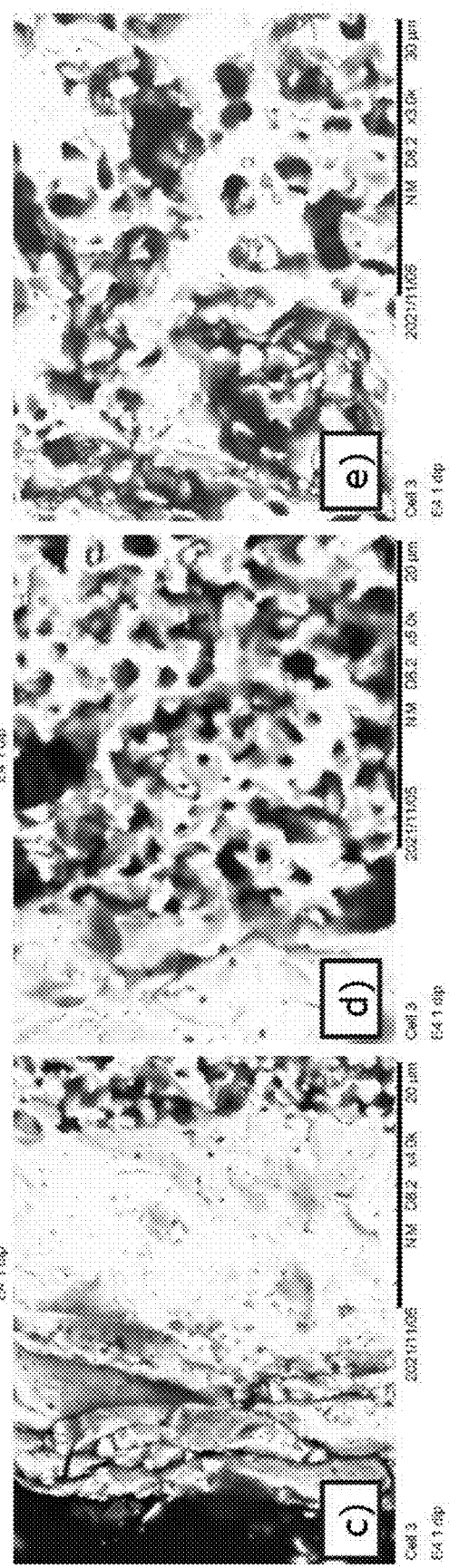
Figure 44C
Figure 44D
Figure 44E

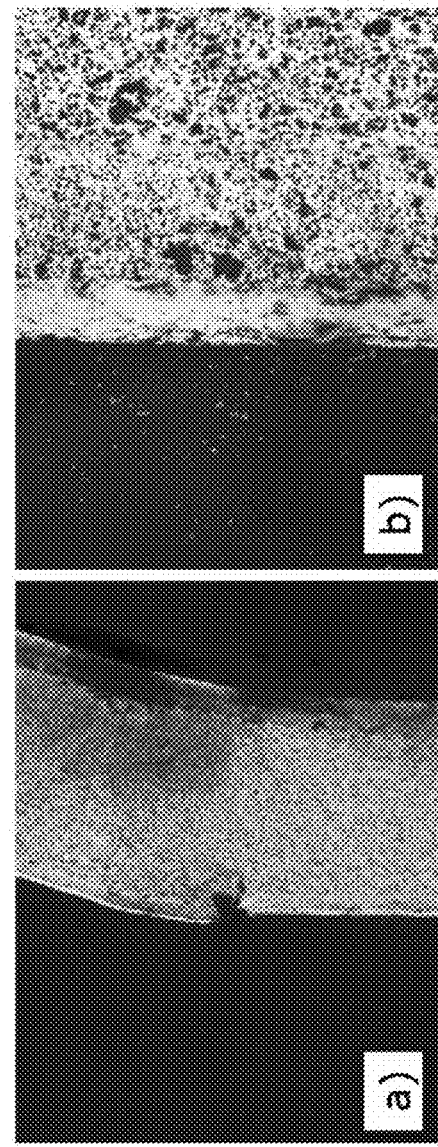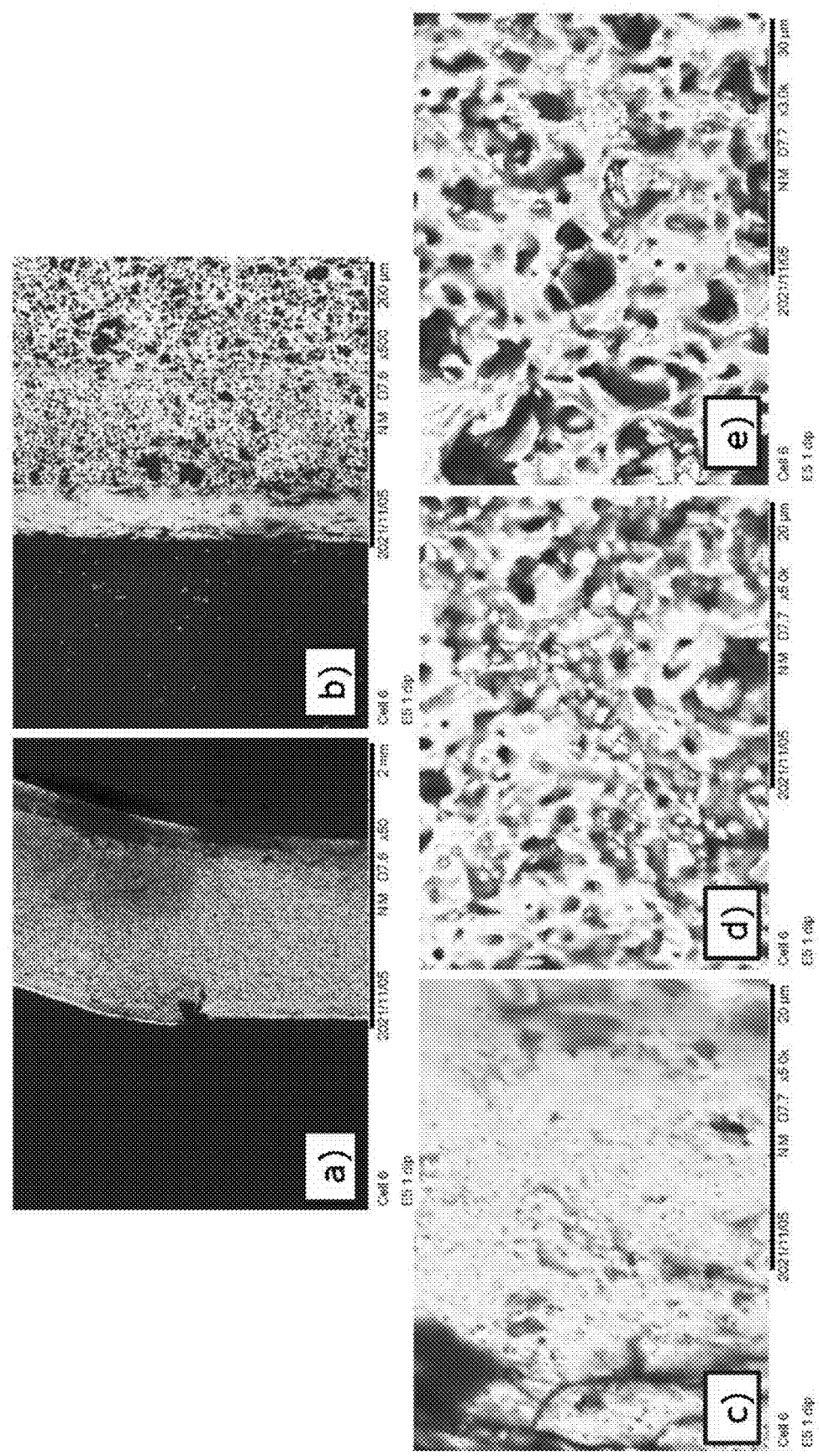
Figure 45A Figure 45B Figure 45C Figure 45D Figure 45E

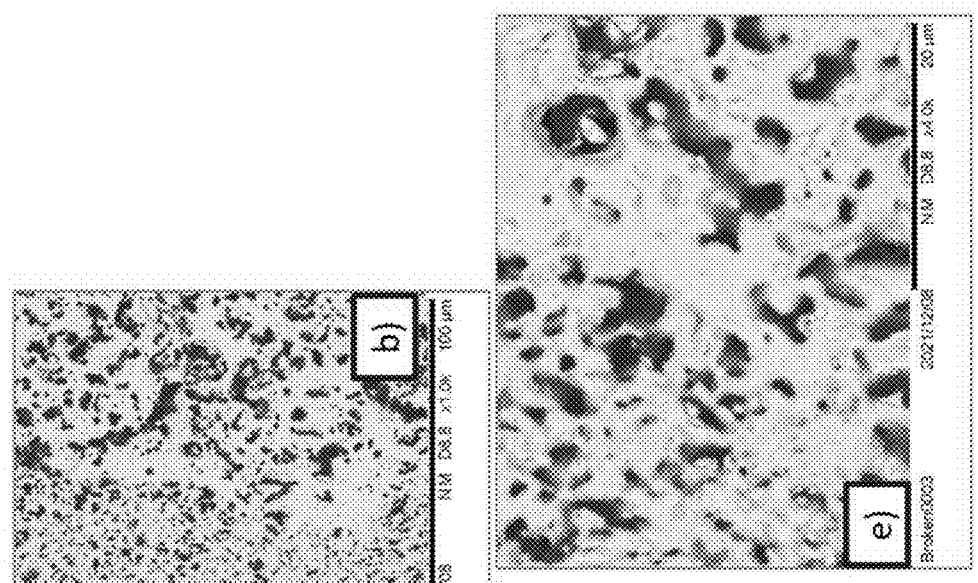
Figure 46B
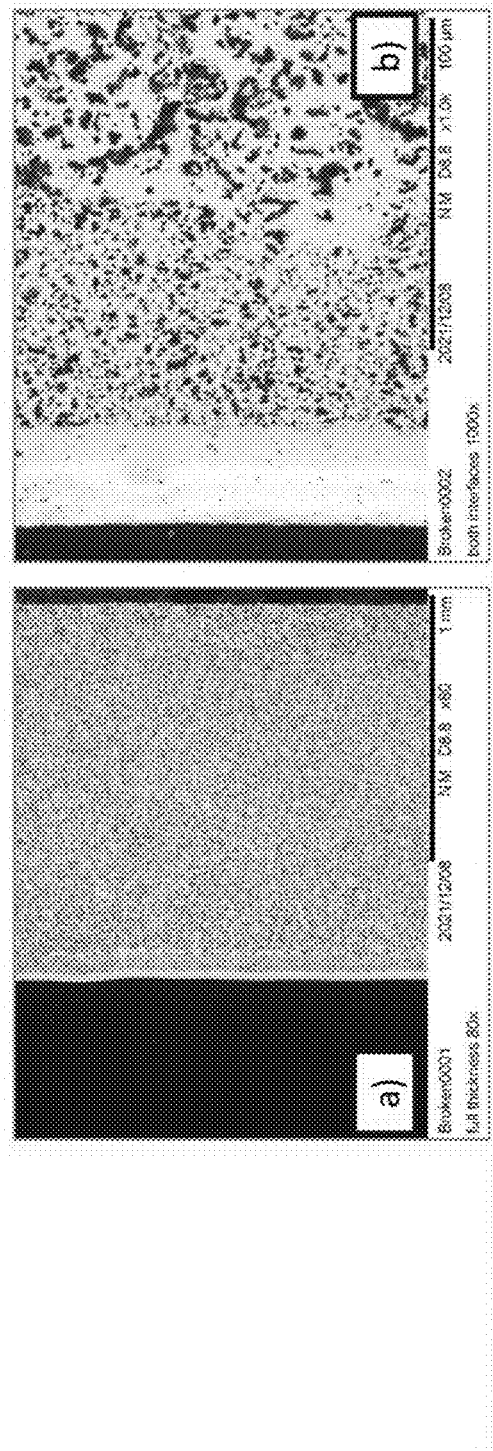
Figure 46A
Figure 46E
Figure 46D
Figure 46C

DIRECT CARBON FUEL CELL (DCFC) WITH MOLTEN METAL

RELATED APPLICATIONS

This application claims priority to U.S. Provisional application No. 63/141,994 filed Jan. 27, 2021, entitled, "Direct carbon fuel cell (DCFC) with molten metal" by inventors, Adam C. Powell, Boyd Davis, Uday Bhanu Pal, Yu Zhong, Christian Faria, Naoki Ono, Takeshi Inozume, Chiaki Endo, and Tomoya Miyauchi which is hereby incorporated by reference herein in its entirety.

BACKGROUND

A direct carbon fuel cell (DCFC) uses solid fuels such as biomass, municipal solid waste (MSW), coal, and petcoke to produce electricity at high efficiency. Using biofuels with carbon capture and sequestration (CCS) provides on-demand electricity on a large scale with net-negative emissions. It is more efficient than gasification power plant designs with a simpler flowsheet and similar fuel flexibility. Indeed, low entropy change of the reaction $C+O_2 \rightarrow CO_2$ leads to theoretical efficiency of 100%, with practical efficiency up to 70-80%. And by supersaturating carbon, a DCFC provides high-density energy storage, similar to a primary battery. The potential DCFC advantages of efficiency, flow sheet simplicity, fuel flexibility, integrated air separation and energy storage have been known for over 100 years.

For comparison, an alternative power plant design for biofuel or coal power generation with CCS known as Integrated Gasification Combined Cycle (IGCC) uses about a dozen unit operations, including fuel pulverization, air separation, carbon gasification, and an extensive gas cleaning system. The Integrated Gasification Fuel Cell (IGFC) design is similar, with a solid oxide fuel cell (SOFC) replacing the syngas combustor, turbine and generator. A high-temperature (>850° C.) DCFC could replace oxygen separation, gasification, steam generation and the steam turbine in the IGCC/IGFC flow sheet one unit operation replaces four and would provide CO or syngas to the combustor or SOFC. An intermediate-temperature DCFC which captures more energy and releases $CO_2$—$H_2O$ could replace all unit operations except for heat exchangers. However, such DCFC would have to operate below about 750° C. to minimize the parasitic reaction $C+CO_2 \rightarrow 2\ CO$ which reduces efficiency.

DCFCs have used one of three electrolytes: molten hydroxides, molten carbonates, or solid oxides similar to SOFC. Molten hydroxides and carbonates exhibit high ionic conductivity but low electronic conductivity, such that the carbon-oxygen reaction takes place at the carbon-electrolyte-anode triple line with relatively slow kinetics. Hydroxides in this environment also tend to form carbonates in situ. The SOFC approach with porous Pt or Ni-YSZ anode exhibits slow reactions between the solid carbon fuel and solid anode, reaching at most 0.225 W/cm². Liquid tin and antimony metal anodes have low carbon solubility, with maximum power density of 0.350 W/cm² at 700° C. With little dissolved carbon they form passivating oxide layers at the electrolyte, which must then diffuse into the anode to react with carbon. A hybrid system using molten carbonate and solid oxide electrolytes with Ni-YSZ anode holds the record for highest power density of 0.878 W/cm² at 750° C. however, chemical reactivity of molten carbonates rapidly degrades the anode structure and solid electrolyte. Some DCFCs use an Fe—Sn alloy anode for combination of low liquidus and moderate high carbon solubility. However, those devices are focused on hydrogen production rather than electricity generation. Therefore, current DCFCs have slow carbon transport to the electrolyte which results in limited power density. The current DCFCs has reactive anodes ($XCO_3$, Sn—$SnO_2$) which degrade electrolytes.

Therefore, there is a need for a new DCFC having anodes which are non-reactive thereby preventing degradation of electrolytes. Further, there is a need for DCFC that has fast carbon transport to the electrolyte thereby increasing power density.

SUMMARY

An aspect of the invention described herein provides a method for generating electricity in a direct carbon fuel cell, the method includes heating and melting an alloy to obtain a liquid alloy anode; circulating the liquid alloy anode through a porous ceramic cathode, the cathode being a tubular structure and in communication with oxygen; reducing the oxygen at the porous cathode to obtain oxygen ions for diffusing through an electrolyte to the liquid alloy anode; and oxidizing the oxygen ions at the liquid alloy anode thereby generating electricity.

An embodiment of the method further includes directing CO and $CO_2$ bubbles formed in the liquid alloy anode towards the surface of the liquid alloy anode for gas lift stirring. In an embodiment of the method, the cathode is a vertical tubular structure. In an embodiment of the method, the cathode is a horizontal tubular structure. In an embodiment of the method, the cathode further includes a coating of the electrolyte. In an embodiment of the method, the liquid alloy anode includes at least one of: iron, carbon, manganese, nickel, cobalt, chromium, tin, molybdenum, silicon, and antimony.

An embodiment of the method further includes contacting the liquid alloy anode and CO and $CO_2$ bubbles with a reactive metal for carbon capture and sequestration. In an embodiment of the metal, the reactive metal is at least one selected from: magnesium, calcium, strontium, potassium, barium, and francium. An embodiment of the method further includes controlling a generation rate of electricity by varying a flow of oxygen.

An aspect of the invention described herein provides a direct carbon fuel cell device including a porous ceramic tubular cathode, the cathode being coated with an electrolyte; and a liquid alloy anode, the anode being circulated through the tubular cathode.

An embodiment of the device further includes an oxygen source. In some embodiments of the device, the oxygen source is ambient air. In an embodiment of the device, the porous ceramic cathode is a perovskite material. In some embodiments of the device, the perovskite material is selected from: $La_{0.8}Sr_{0.2}MnO_3$ (LSM), $La_{0.8}Ca_{0.2}MnO_3$ (LCM), magnesium oxide, and zirconium oxide. In an embodiment of the device, the electrolyte is at least one material selected from: yttria-stabilized zirconia (YSZ), scandia-stabilized zirconia (ScSZ), or samaria-doped ceria (SDC), and gadolinia-doped ceria (GDC).

In some embodiments, the porous ceramic tubular cathode is configured vertically. In alternative embodiments, the porous ceramic tubular cathode is configured horizontally. In some embodiments, the porous ceramic cathode is configured both vertically and horizontally. An embodiment of the device further includes a reactive metal carbon capture and sequestration unit. In an embodiment of the device, the cathode has an electronic conductivity of 10 $(\Omega\cdot cm)^{-1}$ to 100 $(\Omega\cdot cm)^{-1}$ at 700° C.

An embodiment of the device further includes at least one cell connected to the device through electrical leads. In an embodiment of the device, the cell is connected at high temperature to reduce energy losses in the electrical leads. An embodiment of the device further includes a slag layer for absorbing electropositive impurities.

BRIEF DESCRIPTION OF DRAWINGS

FIG. 2A shows a cathode system that includes one or more large coarsely porous ceramic blocks allowing internal air flow. The ceramic blocks have vertical passages coated with porous cathode material and dense solid electrolyte. Upon insertion into the DCFC, the vertical passages fill with liquid anode alloy, and during operation, $CO/CO_2$ bubbles formed inside the passages promote upward gas lift stirring. FIG. 2B shows a cross section of the ceramic block. The air flows into the coarse porous support, the oxygen diffuses through the fine porous cathode into the dense electrolyte and forms carbon monoxide and carbon dioxide bubbles in the liquid metal anode.

FIG. 9A shows parallel disposition of fuel cell tubes which results in lower bubbles uniting with upper bubbles. FIG. 9B shows alternate disposition of fuel cell tubes which results in space between the tubes thereby allowing the bubbles to rise smoothly.

FIG. 10A shows diameter of bubbles (mm) plotted against the contact angle (degrees). FIG. 10B shows diameter of bubbles (cm/s) plotted against the contact angle (degrees).

FIG. 10A shows diameter of bubbles (mm) plotted against the contact angle (degrees). FIG. 10B shows diameter of bubbles (cm/s) plotted against the contact angle (degrees).

FIG. 10A shows diameter of bubbles (mm) plotted against the contact angle (degrees). FIG. 10B shows diameter of bubbles (cm/s) plotted against the contact angle (degrees).

FIG. 26A shows a dry cathode coating. FIG. 26B shows a dry electrolyte coating.

FIG. 43A-FIG. 43E are a set of SEM micrographs of cross-section of Cell 1. FIG. 43A is a low-magnification view showing all 3 layers and thickness of support. FIG. 43B shows 3 layers distinctly, and thicknesses of cathode and electrolyte. FIG. 43C is a high-magnification view showing low porosity in electrolyte. FIG. 43D is a high-magnification view showing porosity in the cathode. FIG. 43E is a high-magnification view showing porosity in the support.

FIG. 44A-FIG. 44E are a set of SEM micrographs of cross-section of Cell 3. FIG. 44A is a low-magnification view showing all 3 layers and thickness of support. FIG. 44B shows 3 layers distinctly, and thicknesses of cathode and electrolyte. FIG. 44C is a high-magnification view showing low porosity in electrolyte. FIG. 44D is a high-magnification view showing porosity in the cathode. FIG. 44E is a high-magnification view showing porosity in the support.

FIG. 45A-FIG. 45E are a set of SEM micrographs of cross-section of Cell 6. FIG. 45A is a low-magnification view showing all 3 layers and thickness of support. FIG. 45B shows 3 layers distinctly, and thicknesses of cathode and electrolyte. FIG. 45C is a high-magnification view showing low porosity in electrolyte. FIG. 45D is a high-magnification view showing porosity in the cathode. FIG. 45E is a high-magnification view showing porosity in the support.

FIG. 46A-FIG. 46E are a set of SEM cross-section micrographs of a cathode-electrolyte structure which was operated at 1000° C. for about 1.5 hours. FIG. 46A shows the total thickness of the structure. FIG. 46B shows the electrolyte-cathode and cathode-support interfaces. FIG. 46C shows the outer edge of the electrolyte. FIG. 46D electrolyte-cathode interface. FIG. 46E shows the cathode-support interface.

FIG. 47A shows the total thickness of the structure. FIG. 47B shows the electrolyte-cathode and cathode-support interfaces. FIG. 47C shows the outer edge of the electrolyte. FIG. 47D electrolyte-cathode interface. FIG. 47E shows the cathode-support interface.

DETAILED DESCRIPTION

Figure 4:
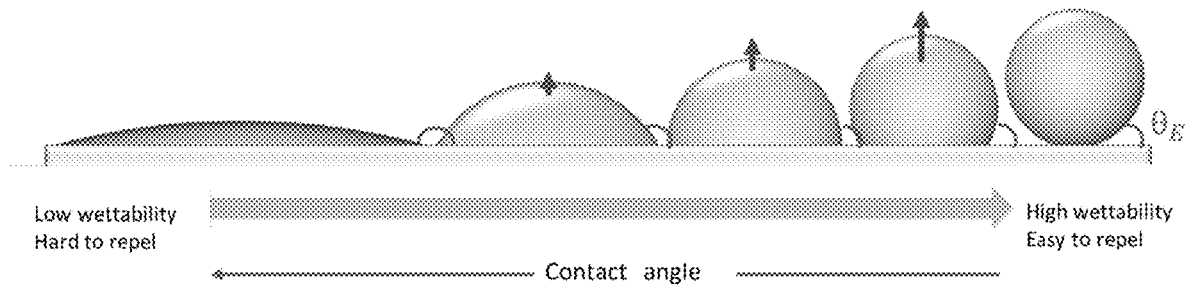
FIG. 4 is a schematic drawing showing relationship of contact angle and wettability. The smaller the contact angle, greater the wettability of the liquid against the gas and harder for the bubbles to repel and leave.
Figure 5:
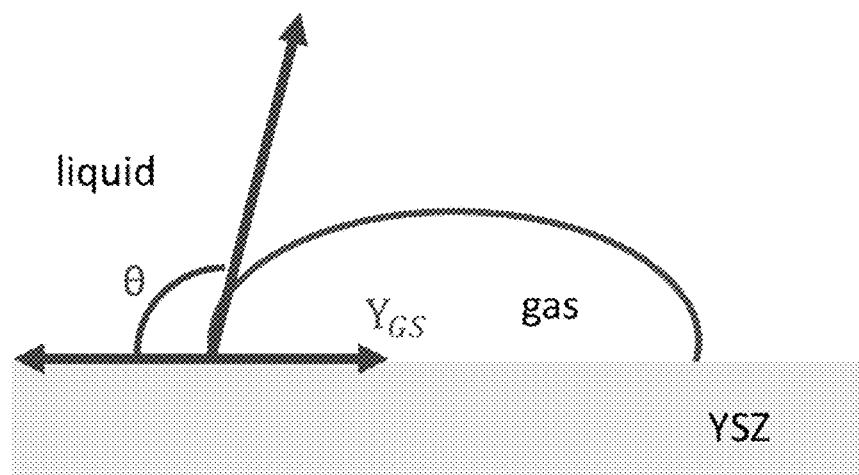
FIG. 5 is a schematic drawing showing the relationship between contact angle and surface tension. Ys is solid surface tension. YSZ is the liquid metal. YGs is the interfacial tension between gas and solid. YG is gas surface tension.
Figure 6:
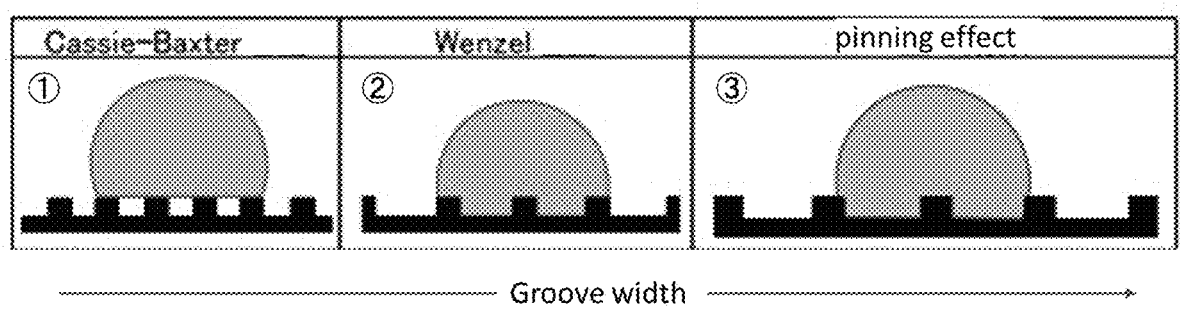
FIG. 6 is a schematic drawing showing relationship of groove width to water repellency.
Figure 7:
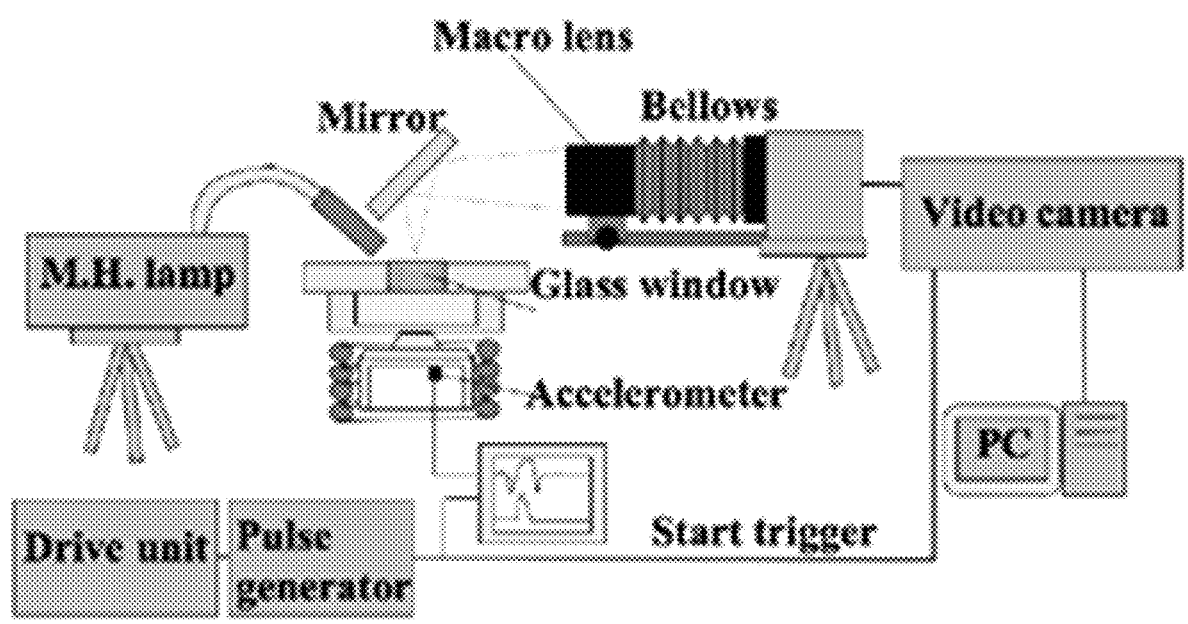
FIG. 7 is a schematic drawing of a test equipment for observing generating bubbles on a liquid surface.
Figure 8:
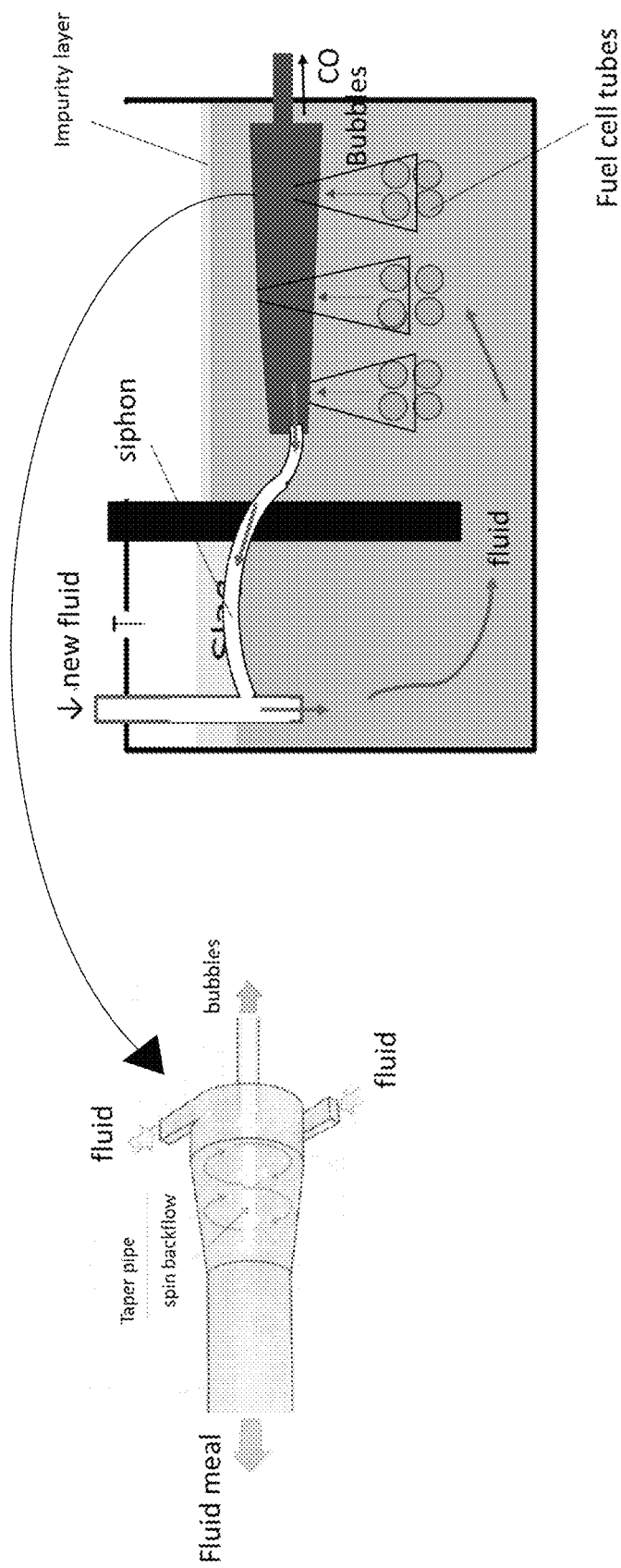
FIG. 8 is a schematic drawing showing rotating flow for moving the bubbles. The schematic shows that the fuel pipe is covered with a partition and connected to a tapered gas-liquid separator. Liquid metal is circulated by siphon resulting in flow of bubbles.
Figure 9B:
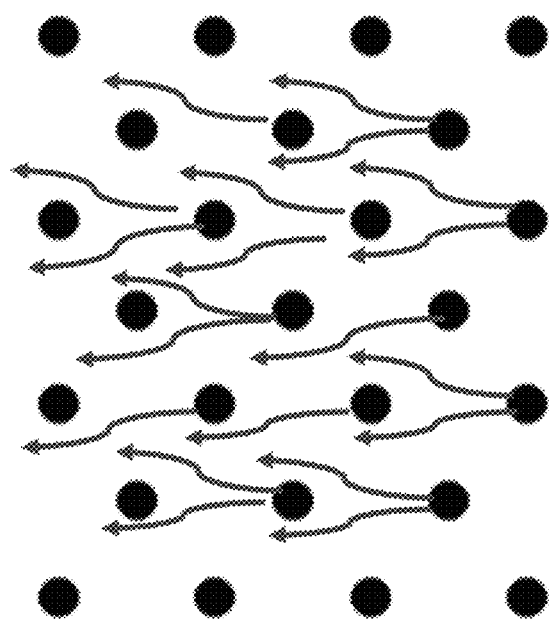
FIG. 9A-FIG. 9B is a set of schematic drawings showing bubbles and disposition of fuel cell tube.
Figure 9A:
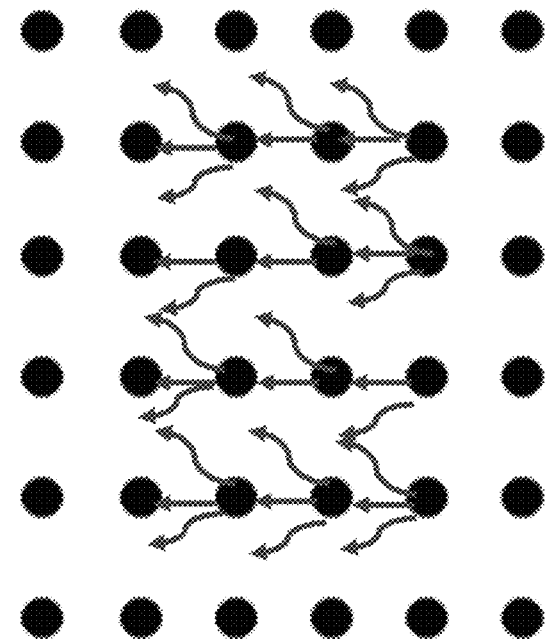
Figures 10A, 10B:
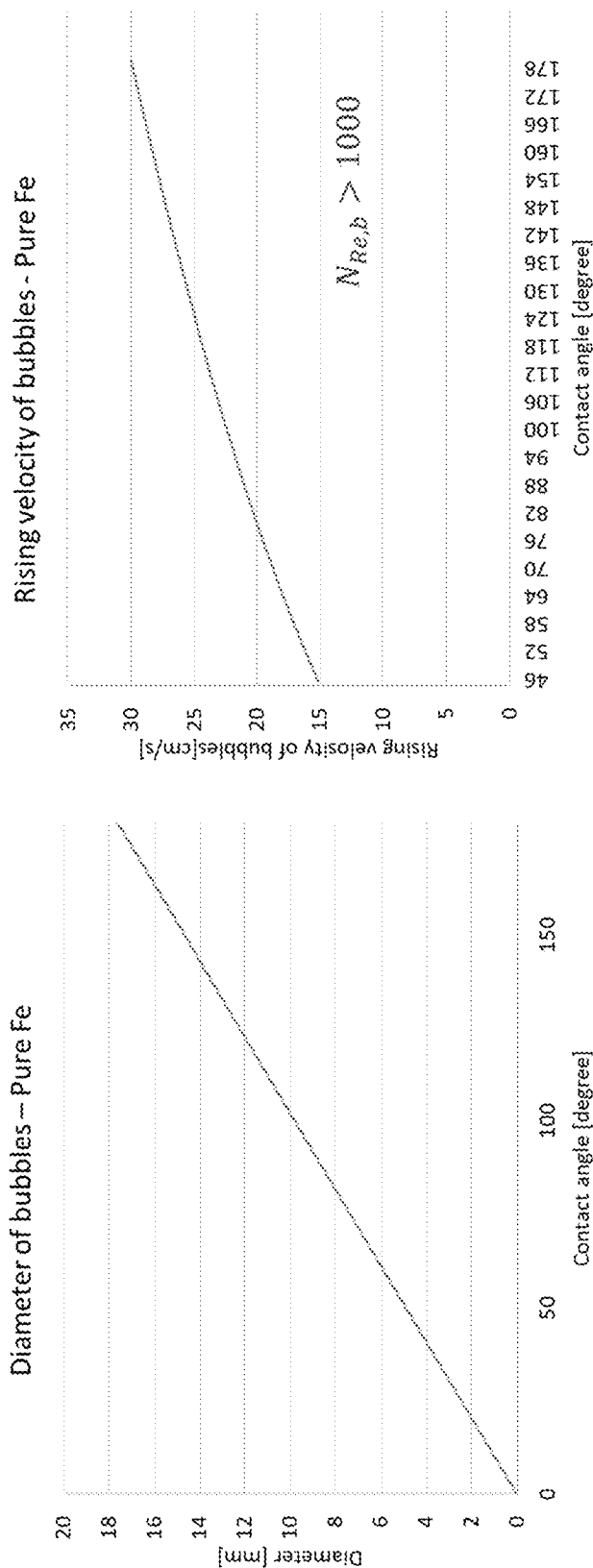
FIG. 10A-FIG. 10B is a set of graphs showing the diameter of bubbles and rising velocity of bubbles for pure Iron (Fe).
Figures 11A, 11B:
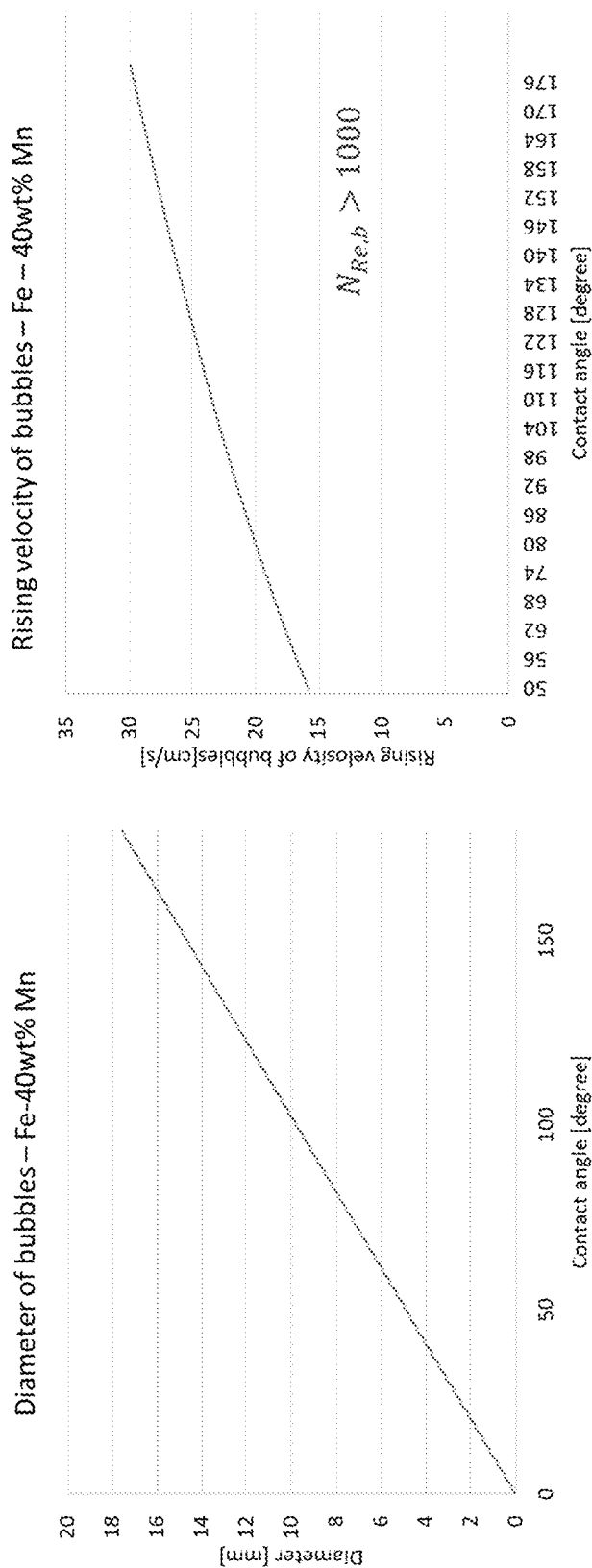
FIG. 11A-FIG. 11B is a set of graphs showing the diameter of bubbles and rising velocity of bubbles for an alloy of Iron (Fe)-40% wt Manganese (Mn).
Figures 12A, 12B:
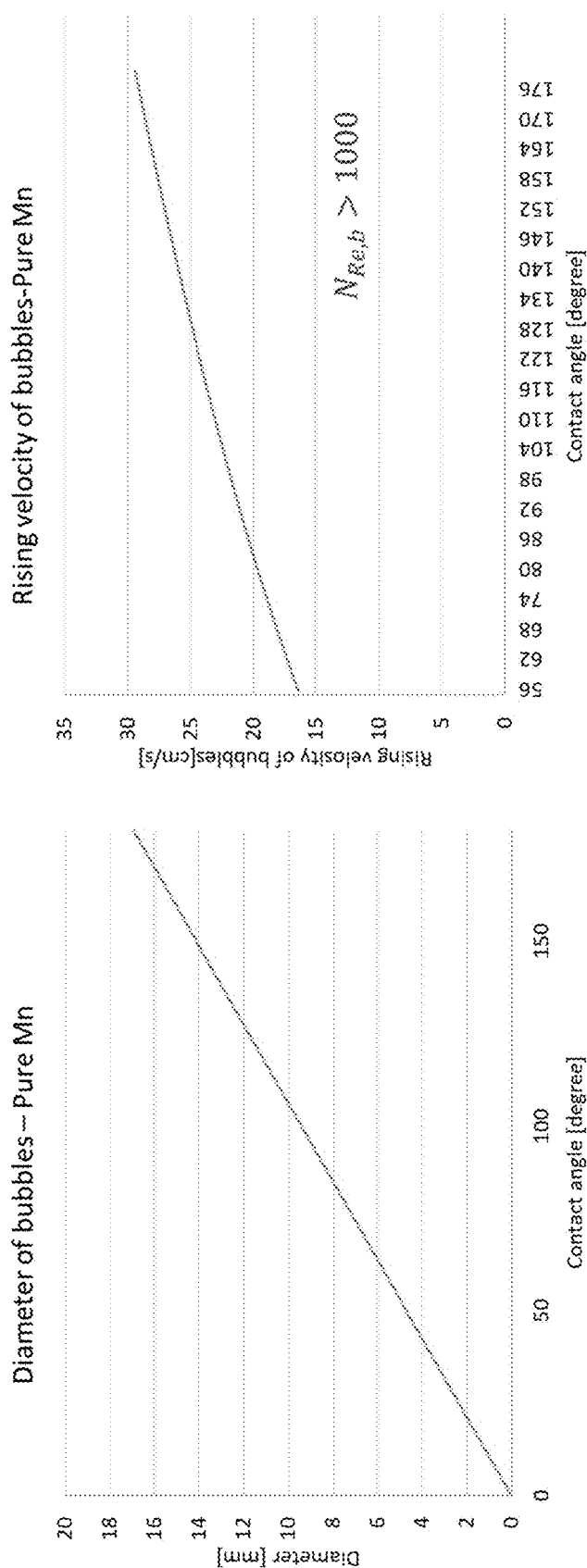
FIG. 12A-FIG. 12B is a set of graphs showing the diameter of bubbles and rising velocity of bubbles for pure Manganese (Mn).
Figure 13A:
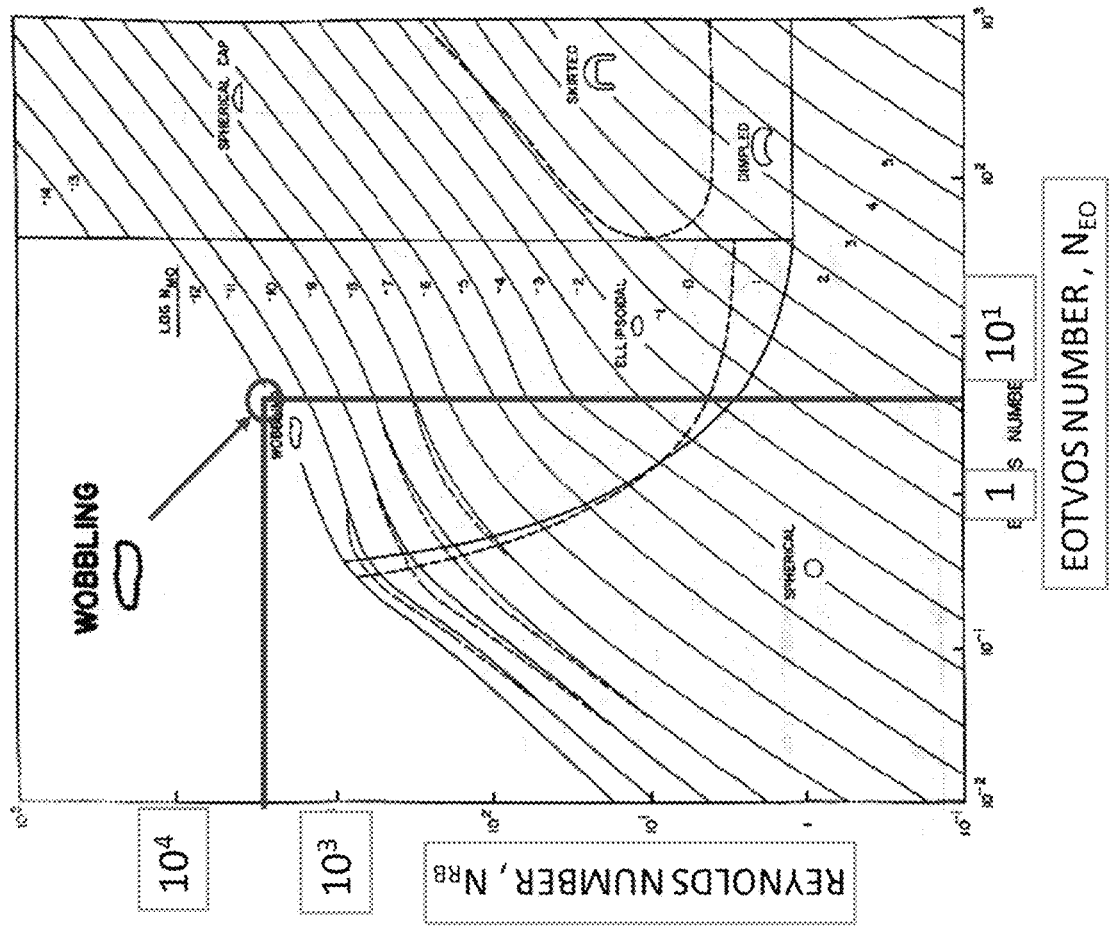
FIG. 13A-FIG. 13B is a graph showing Reynolds number ($N_{RB}$) plotted against Eotvos number ($N_{EO}$). The bubble formation is estimated using Eotvos number, $N_{EO}$. The $N_{EO}$ in FIG. 13A is low and therefore, the bubble is wobbling. The $N_{EO}$ in FIG. 13B is high and therefore, the bubble is a spherical cap.
Figure 13B:
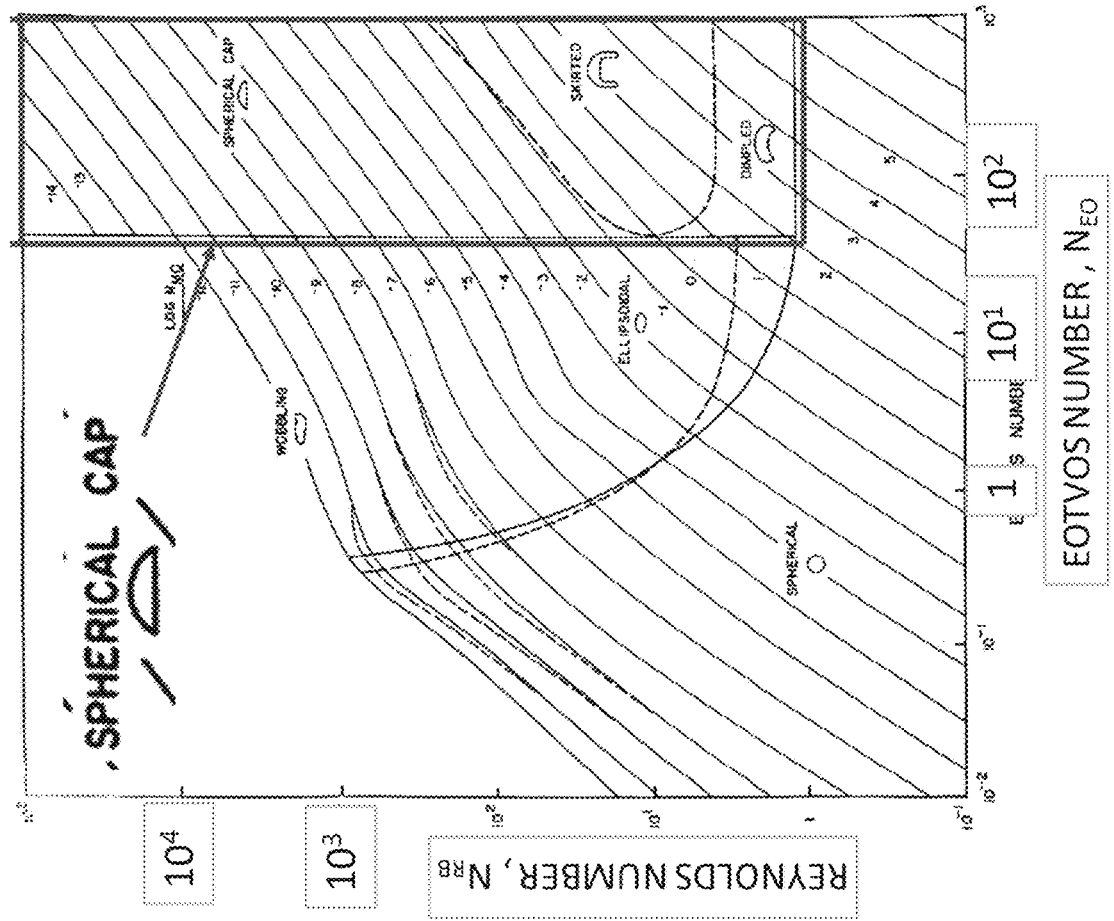
Figure 14:
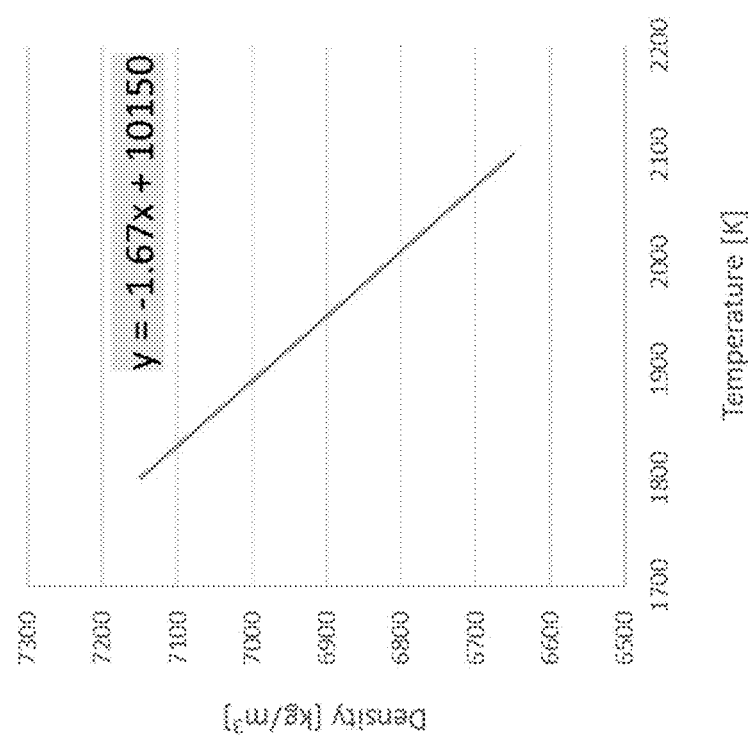
FIG. 14 is a graph showing density ($kg/m^3$) of iron in liquid state plotted against temperature (K).
Figure 15:
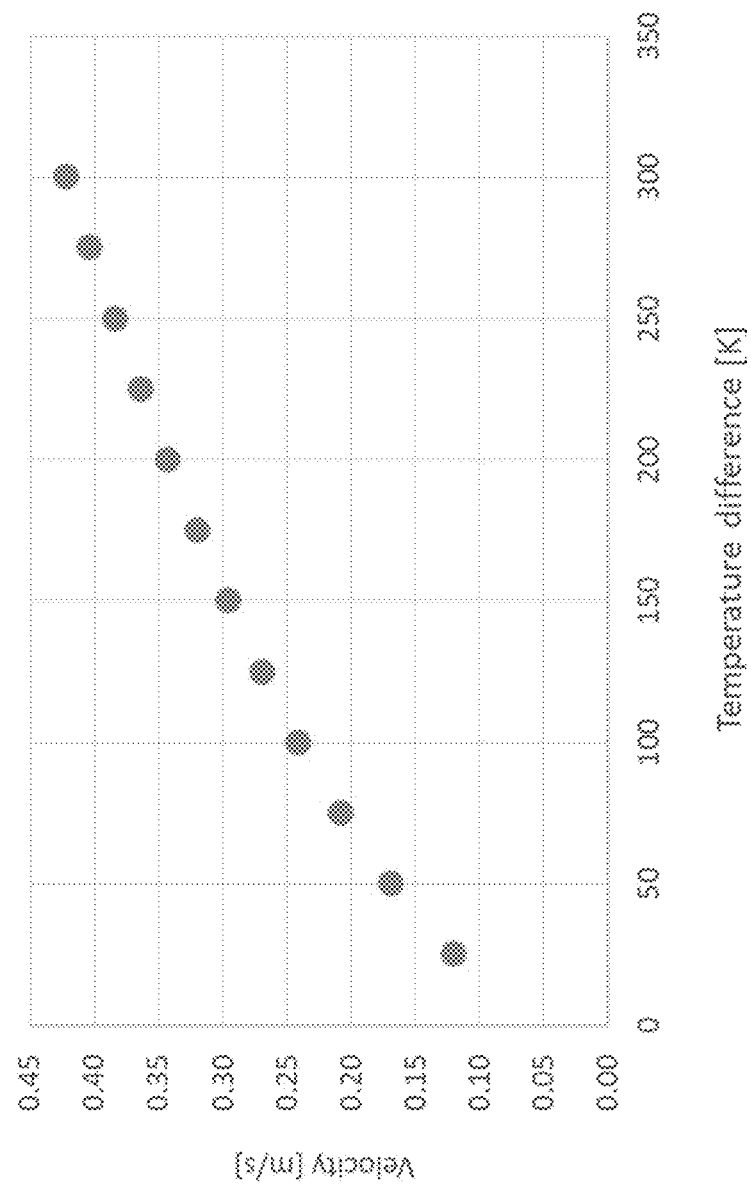
FIG. 15 is a graph showing the velocity (m/s) of bubbles in liquid iron plotted against temperature difference (K).

A direct carbon fuel cell (DCFC) is described herein which employs a molten iron alloy for low eutectic melting temperatures (around 850° C.) for high carbon solubility. The molten alloy includes iron, carbon, and in some embodiments includes manganese, silicon, nickel, molybdenum, and tin. The alloy has a low melting temperature for electrolytic operation to transport carbon ions and is viable with materials similar to those employed in steelmaking. The porous ceramic structure receives the oxygen at a porous cathode for diffusion through an electrolyte to the liquid alloy, in which the liquid alloy defines the anode, and tubes in the structure direct CO and $CO_2$ bubbles. The bubbles form in the liquid alloy from ionic reactions of the dissolved carbon. The fuel cell provides a method of generating electricity by heating an alloy including iron and carbon to a melting point to form a liquid alloy and circulating the liquid alloy through a tubular structure defined by a porous ceramic in communication with an oxygen source. In some embodiments, the oxygen source includes a flow of ambient air, and the alloy is a eutectic mixture including at least iron and dissolved carbon, typically having a relatively low melting point around 850° C., and thus suitable for use with materials found in steelmaking. The porous ceramic structure receives the oxygen at a porous cathode for diffusion through an electrolyte to the liquid alloy, in which the liquid alloy defines the anode, and tubes in the structure direct CO and $CO_2$ bubbles. The bubbles form in the liquid alloy from ionic reactions of the dissolved carbon in the liquid alloy and $O_2$ passage through the electrolyte. FIG. 4. The exhaust gases are thus limited to CO and $CO_2$, and the low melting temperature of the eutectic alloy allows for high carbon solubility.

In some embodiments, the porous ceramic structure includes vertical tubes for transporting molten metal such that the CO and $CO_2$ rise upward through the tubes. In other embodiments, horizontal tubes carry air/$O_2$ through the molten alloy such that the CO and $CO_2$ rises upwards around the horizontal tubes. The former configuration includes circulating the liquid alloy through vertical tubes in the porous ceramic, such that the tubes are lined with layers including the porous cathode and electrolyte for receiving the CO and $CO_2$ bubbles rising upwards in the vertical tubes. In the DCFC, a cathode system includes one or more large coarsely porous ceramic blocks having vertical passages thereby allowing internal air flow. The ceramic blocks are coated with porous cathode material and dense solid electrolyte. The vertical passages are filled with the liquid anode alloy, and during operation, $CO/CO_2$ bubbles formed inside the passages promote upward gas lift stirring. FIG. 2-FIG. 15.

In the latter structure, liquid alloy circulates around a network of horizontal tubes transporting oxygen, such that the tubes are defined by a layer of a porous cathode and a layer of electrolyte for receiving oxygen ions from the transported oxygen. CO and $CO_2$ bubbles are formed from the oxygen ions and rise through the liquid alloy around the horizontal tubes.

Several materials are considered coarse porous support material candidates suitable for transporting oxygen or ambient air. These are any refractory ceramic material with decent strength and stability in air, including: stabilized zirconia (e.g., calcia-stabilized zirconia, magnesia-stabilized zirconia, yttria-stabilized zirconia), plain magnesia/periclase, alumina, silica, or fire clays. Some embodiments include forming a slag layer on top of the liquid alloy and receiving impurities including ash and silicon into the slag layer as the liquid alloy circulates beneath it.

Liquid Metal Anode

The liquid metal anode includes Fe—Sn—C ternary alloys and further includes Mn. In some embodiments the alloy optionally includes Mo, and/or Si to reduce the liquidus temperature. Si reduces liquidus but also reduces carbon solubility, it is found in nearly all carbon fuels and therefore unavoidable. The Fe—Mn—Sn—Mo—Si—C system is observed to exhibit up to 7 wt % (26 mol %) carbon solubility with eutectic temperature as low as 960° C. without tin, and 232° C. with tin. Fe—Mn—C eutectic temperature is observed to be 1076° C. with 16.3 mol % C. The Fe—Mn—Mo—C eutectic temperature is observed to be 1036° C., i.e., 118° below the Fe—C eutectic, with 16.8 mol % C solubility. In the liquid alloy anode near the electrolyte, oxygen from the electrolyte and carbon in the anode inter-diffuse and react to create $CO/CO_2$ bubbles, which rise and stir the liquid.

A liquid metal anode having configuration is observed to have high electronic conductivity similar to other liquid metals and much higher than carbonates. Further, the liquid allot anode has high carbon solubility with fast carbon diffusion, for much faster reaction kinetics than tin or antimony—nearly removing anode overpotential and potentially reaching 3-6 $W/cm^2$. Because the liquid alloy anode has lower viscosity compared to carbonates strong gas lift stirring is observed which is comparable to basic oxygen furnace steelmaking, and high power density in a very large cell. By adding Sn, Mn, optionally Mo and Si, the eutectic temperature is observed to be hundreds of degrees below the Fe—C eutectic used in a gasifier-type DCFC device, allowing one fuel cell to produce $CO_2$ and approach 100% theoretical energy efficiency. Further, because of rapid fuel dissolution kinetics, facilitating fuel flexibility fuel pulverizing is most likely not required. The liquid alloy anode is compatible with oxide-conducting solid electrolytes and steelmaking refractories. Further, if the solid electrolyte cracks, the liquid alloys surface tension may block infiltration, and the surface oxide which forms could prevent short-circuiting, particularly if it is a low-conductivity oxide such as silica or a silicate material.

The alloy system thus combines the biggest advantages, and avoids the drawbacks, of all DCFC anode approaches. In some embodiments, liquid slag in contact with the anode absorbs and concentrates solid ash impurities such as $Al_2O_3$, CaO, MgO as well as silicon, sulfur and phosphorous. A basic slag composition with high silica capacity removes most silicon from the liquid metal anode, improving carbon solubility, however, could reduce the ability of the alloy to form silicate seals at electrolyte cracks.

Figure 1:
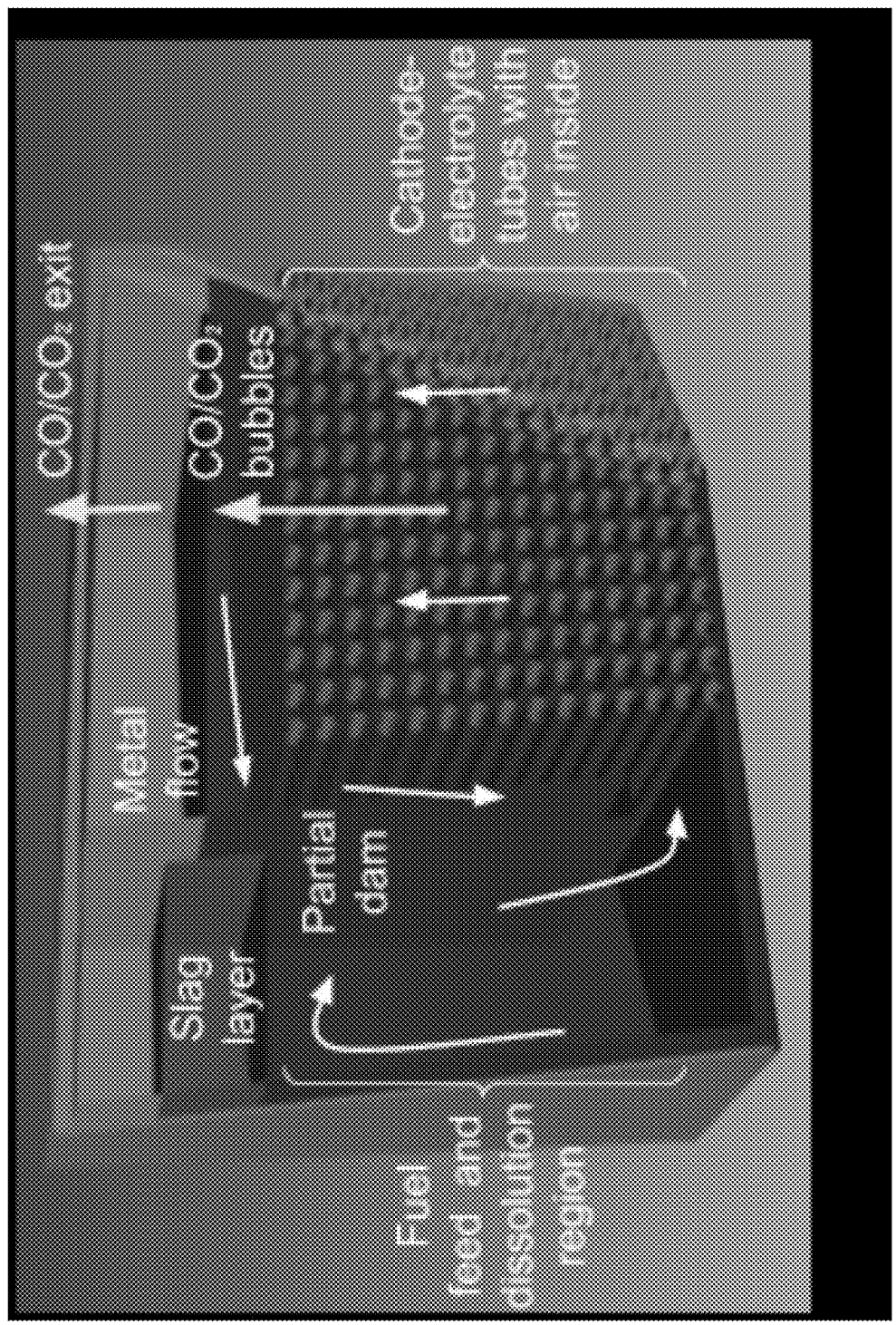
FIG. 1 is a schematic drawing showing material flow in a tubular DCFC. The drawing shows a horizontal tubular cathode-electrolyte configuration. A partial dam separates the fuel feeding section from the electrochemical reaction site. Fuel can be introduced from above by lance or blown in from the side or bottom using a carrier gas, with carbon fuel dissolving into the liquid metal contacting the electrolyte surface. Impurities present within the solid fuel, such as ash and oxides, form a slag layer at the top of the feed section and could be periodically removed. Closed-end cathode tubes with a dip-coated electrolyte layer are submerged in the anode alloy, avoiding leakage between component interfaces often experienced with planar arrangements. Air is introduced through the center of the cathode tube and oxygen ions diffuse through the solid oxide electrolyte to react with carbon in the liquid anode. As $CO/CO_2$ forms, bubbles develop which ascend to the surface when their buoyancy force exceeds the pressure exerted on them by the liquid anode.

In some embodiments slag is periodically removed from the system. In some embodiments, a partial dam keeps the slag layer away from the $CO/CO_2$ bubbles while liquid metal flows underneath, as shown in FIG. 1. In some embodiments, carbon fuel is dropped onto the liquid metal from above. In some embodiments, a non-submerged or submerged lance feeds solid carbon fuel by blowing it in using a carrier gas. In some embodiments, carbon fuel is blown in from a tuyere in the bottom or side of the vessel using a carrier gas. In some embodiments the carrier gas includes $CO_2$ and/or CO. In some embodiments the carrier gas includes argon and/or hydrogen and/or nitrogen. In some embodiments excess carbon fuel, above its solubility, is present in the liquid metal anode as solid carbon to maintain carbon saturation.

Potential cathode-electrolyte configurations include the horizontal tubular system shown in FIG. 1, and/or inverted closed-end tubes rising from the bottom of the cell, and/or one or more ceramic blocks with vertical tubes cut through them. These tubes and/or blocks can be hollow or filled with a large-pore ceramic material such as zirconia or alumina which provides structural support while permitting air flow. The tubes and/or blocks are coated with porous cathode material, then with electrolyte. Immersing the liquid anode-electrolyte-refractory containment triple line below the liquid anode surface eliminates the need for a gas-tight seal, as is required for SOFCs with gaseous fuels, because high liquid anode alloy surface tension seals electrolyte-refractory joints. It also separates the slag on top of the liquid alloy anode from the electrolyte-refractory joint submerged in it, otherwise the slag could potentially wet the electrolyte-refractory joint and penetrate it.

Figure 2B:
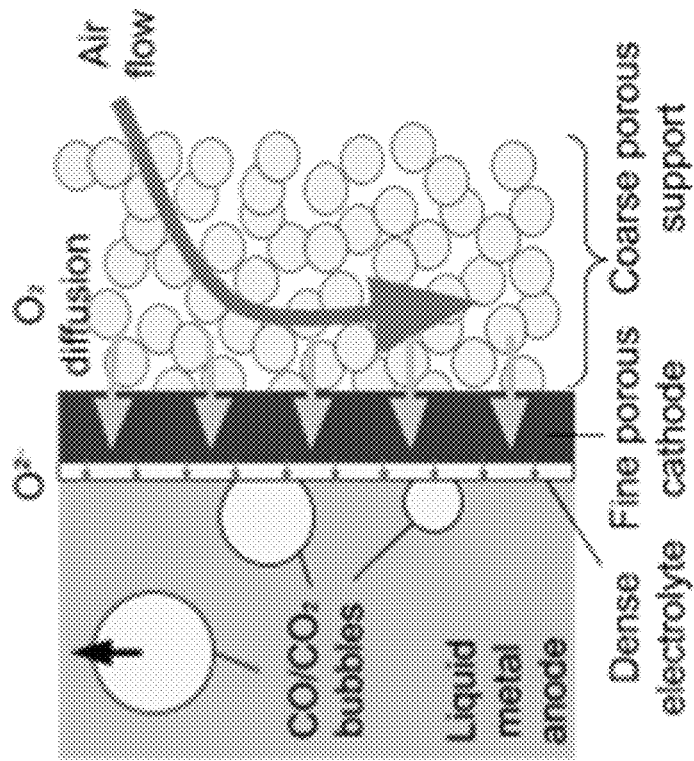
FIG. 2A-FIG. 2B are a set of schematic drawings showing ceramic block cathode/electrolyte system with cylindrical or conical passages for metal flow and structure detail.
Figure 2A:
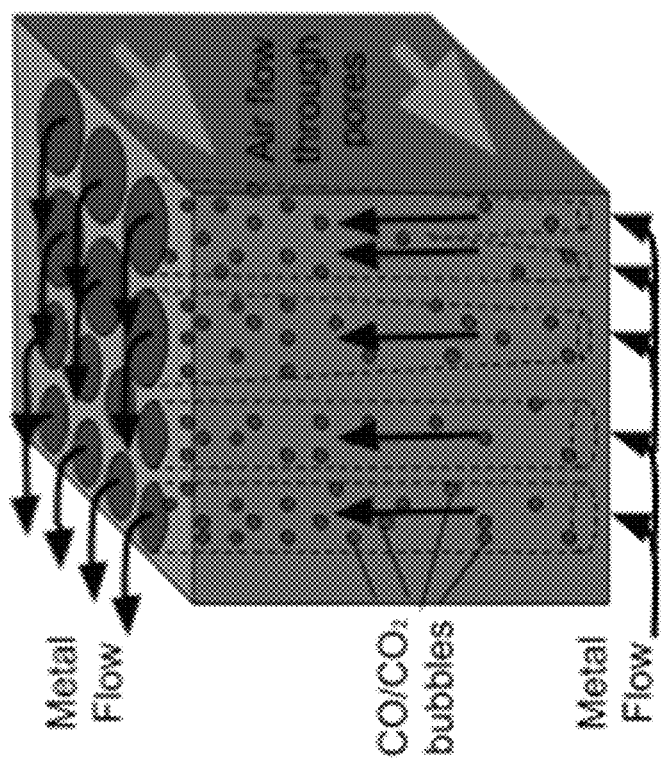
Figure 3:
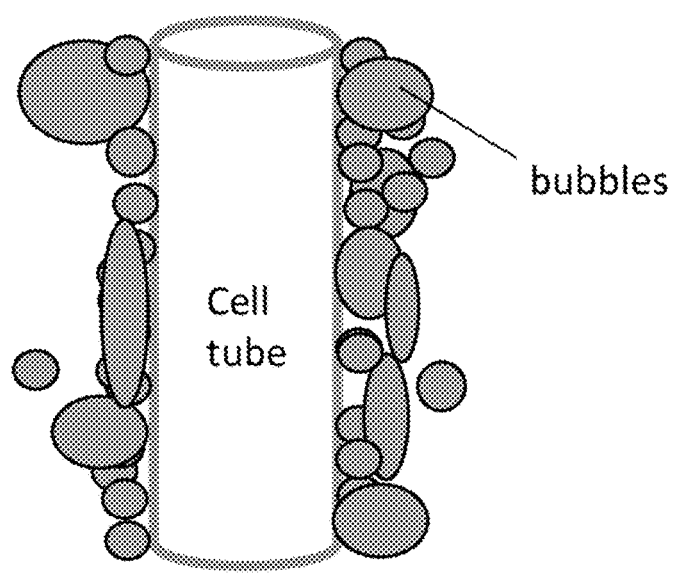
FIG. 3 is a schematic drawing showing bubble generation in the electrolyte liquid metal such that the bubbles stick and cover the electrode.

In some embodiments, to improve robustness and reduce manufacturing cost, the cathode system consists of one or more large coarsely porous ceramic blocks allowing internal air flow, with vertical passages cut through it, and coated with porous cathode material and dense solid electrolyte as shown in FIG. 2A-FIG. 2B. Upon insertion into the DCFC, the vertical passages fill with liquid anode alloy, and during operation, $CO/CO_2$ bubbles formed inside the passages promote upward gas lift stirring. FIG. 3. In manufacturing the ceramic block, solid pieces of carbon or other material(s) which burn out are incorporated into the ceramic to create coarse pores in the body, or even elongated passages through it, to promote air flow. In some embodiments, the coarse pores are created by first sintering the ceramic-carbon green body in a vacuum or reducing environment, for example including hydrogen, CO or methane gas, to densify the ceramic materials while preserving the carbon, and then adding air or oxygen to burn out the carbon and fully oxidizing the structure. This configuration has several additional potential benefits such as: smaller number of cathode-electrolyte bodies with large surface area reduces the number and length of electrolyte-containment joints; reducing the number of components thereby reduces the manufacturing cost of a cell; and geometric flexibility in the blocks allows various vertical passage geometries, such as tubes, cones, or networks of multiple small tubes at the bottom feeding larger tubes toward the top, as could be helpful to facilitate high rates of gas bubble generation and removal from the electrolyte surface, along with gas lift stirring of the liquid metal.

In some embodiments, the fuel cell electrolyte includes SOFC electrolyte materials such as yttria- or scandia-stabilized zirconia (YSZ, ScSZ), or samaria- or gadolinia-doped ceria (SDC, GDC). In some embodiments, the fuel cell cathode includes SOFC cathode materials such as strontium-doped lanthanum manganite $La_{0.8}Sr_{0.2}MnO_3$ (LSM), strontium-doped lanthanum cobaltite $La_{0.8}Sr_{0.2}CoO_3$ (LSC), or similar perovskite materials with electronic conductivity 10 to 100 $(\Omega \cdot cm)^{-1}$ at 700° C. At 750° C., theoretical open circuit potential $E_{th}$ is 1.0 V for the reaction $C+O_2 \rightarrow CO_2$ at 0.21 atm $O_2$ (i.e. air at 1 atm total pressure). Resistance of a 40 μm thick samaria-doped ceria $(Sm_{0.15}Ce_{0.85}O_{1.925-\delta}$ a.k.a. SDC 15) electrolyte at this temperature is 0.067 $\Omega \cdot cm^2$, leading to maximum possible current density over 15 $A/cm^2$. Considering only electrolyte resistance and assuming 100% $CO_2$ production, estimated maximum power density would be 3.87 $W/cm^2$ at 50% energy efficiency, or the cell could operate at 2 $W/cm^2$ with 85% energy efficiency.

Electrolyte resistance is lower at higher temperature, but the reaction would produce more CO instead of $CO_2$, reducing energy efficiency. Some SOFCs use electrolytes as thin as 10 μm, in this case such a thin electrolyte could potentially increase power density up to four-fold. Favorable DCFC operation pressure is 0.1-10 atm on the anode side. Higher anode pressure increases the equilibrium $CO_2/CO$ ratio particularly in the 650-800° C. temperature range and facilitates CCS. It slightly reduces $E_{th}$ in the DCFC, for example by about 3% at 700° C., unless accompanied by higher air pressure at the cathode.

Emissions should have negligible solid particulates. Because carbon dissolves and remains in the liquid anode until reacting with oxygen, there is minimal soot; electronegative fuel impurities also stay in the anode. Further, an optional slag layer floating on the metal anode in the fuel insertion region absorbs electropositive impurities such as CaO, MgO, $Al_2O_3$, and some silicon as $SiO_2$. Depending on the fuel, this slag can include $CaF_2$ and various oxides, and can be selected for high sulfur, phosphorous, arsenic, and silicon absorption capacity. Therefore, the slag, replaces a large train of unit operations around gas scrubbing in normal power plants, and produces a stable, vitrified slag, instead of coal plant dust.

Multiple cells are electrically connected in series at high temperature to reduce energy losses through the leads. In a single lead, a large-area conductor has low electrical resistance, however, loses heat fast, and vice versa. Thermal energy loss is $Q=kA\ \Delta T/L$, and electrical energy loss is $P=IV=I^2L/\sigma A$, so the Wiedmann-Franz constant $k \geq k\ el = L_e$ σT creates a constraint $PQ \geq I^2 LT\ \Delta T$ where $L_e$ is the Wiedmann-Franz constant $2.45 \times 10^{-8}\ V^2/K^2$. The lowest possible total loss P+Q is at P=Q with each given by $P=Q=I\sqrt{L_e}T\ \Delta T$. The best lead material has thermal conductivity is as close as possible to 100% electronic (i.e., negligible phonon conductivity), illustratively a highly conductive metal, illustratively copper or nickel. At T=750° C.=1023 K and ΔT=725 K, this loss P+Q/I=0.27 V, for two leads this is 0.54 V, which is greater than voltage output from a single cell at maximum power density. If multiple cells are connected in series, e.g., 10 cells, then total series voltage at maximum power density is 5 V, of which 11% is lost in the leads. Low-resistance connections between the cells not only reduce electrical losses, but also promote temperature uniformity between them, including the cells on the ends of the series which connect to the end leads. In some embodiments, a reactive metal such as Mg, Ca or a rare earth which oxidizes in CO or $CO_2$ is placed in the cell. As $CO_2$ and CO are produced by the DCFC, the reactive metal reacts to form metal oxide and carbon, and carbon dissolves back into the anode alloy, keeping the carbon in the system. In some embodiments, the refractory lining comprises MgO and/or CaO which are stable in contact with the reactive metal. Because Mg and Ca densities are below that of the liquid anode alloy, and they are immiscible with Fe, Mo and C, they float on the anode, and do not contact or react with the electrolyte components, illustratively zirconia or ceria, which lie fully submerged below the anode alloy surface. With the reactive metal, this overall device functions like a metal-air battery with overall reaction: $2Mg+O_2 \rightarrow 2\ MgO$, or Ca and CaO, etc. When the reactive metal fuel is partially or fully consumed, $CO/CO_2$ gas pressure increases, providing a measurable indicator for shutting off the cell. One method of shutting off the cell would be to disconnect one or both of its electrical leads, which would stop the reaction and prevent further gas pressure increase in the anode area. Embodiments incorporating reactive metal fuel are potentially useful in zero-emissions transportation vehicles (ships, trains, buses, aircraft) in which CCS is not practical.

The novel anode chemistry was designed by high-throughput CALPHAD and includes Fe—Mn—Ni—Sn—Mo—Si—C alloy and melts at 800-840° C. with ≥10 mol % (2.5 wt %) carbon solubility. At 800° C. and 10 bar pressure, $CO_2$:CO ratio is about 55:45 and theoretical efficiency is 75-80%. At 5 mol % ΔC between the bulk liquid alloy and solid electrolyte surface, carbon diffusion across a 0.1 mm boundary layer yields 18 $A/cm^2$ current density. Therefore, the anode polarization is low. With 50 μm ScSZ electrolyte the anode polarization reaches 5 $W/cm^2$ with 45% efficiency or 3 $W/cm^2$ with 62-65% overall efficiency. The CCS plant includes a water separation unit for example a temperature swing and a compressor.

This highly efficient, power-dense, robust and simple DCFC dramatically reduces costs of generation with CCS, especially at low-capacity factor (CF).

TABLE I

Comparison of novel DCFC system to presently used DCFC systems

| Attribute | State of art value | Proposed value | Description/Justification |
| --- | --- | --- | --- |
| Power generator type | n/a | n/a | Direct Carbon Fuel Cell |
| CCS plant technology | n/a | n/a | Water separation and compression |
| Capital cost (90% CF) | $4,279/kW | $1,400/kW | Flow sheet simplicity |
| Fixed O&M cost | 3.19¢/kWh | 3.19¢/kWh | Assume same as IGCC for now |

TABLE I-continued

Comparison of novel DCFC system to presently used DCFC systems

| Attribute | State of art value | Proposed value | Description/Justification |
|---|---|---|---|
| Variable O&M cost | 4.57¢/kWh | 2.74¢/kWh | Efficiency ratio, CCS simplicity |
| Power generator heat rate | 10,000 BTU/kWh$^3$ | ~6,000 BTU/kWh$^3$ | High fuel cell efficiency (assume 57% average) |
| Flexibility enabler | n/a | n/a | Air flow control, internal heating |
| Capture rate | 90% | 95%+ | Ease of $CO_2$ separation |

This system scales down at high efficiency to 640-1060 kW cells each occupying 4 m$^3$ as shown in FIG. 1 (6-10 MW series of 10 cells with high-T interconnects); maximum scale is 30-100 MW cells. A "warm" state is achieved by adding excess carbon to the anode followed by short-circuiting a cell series and feeding air slowly as excess carbon dissolves. The resulting levelized cost of electricity is 7.330/kWh at 90% CF and 10.20/kWh at 50% CF, which is best-in-class for solid fuel power plants with or without CCS, but with flexibility needed to follow demand with high renewables.

In an embodiment of the DCFC a closed-end tubular cathode/electrolyte arrangement with an outside diameter of approximately 20 mm to 25 mm is used. The arrangement includes a 1-2 mm thick current collector support tube with 30% to 40% porosity surrounded by a 30 µm to 50 µm thick cathode and a 30 µm to 80 µm thick solid oxide electrolyte. Examples for materials for construction of the current collector are silver, nickel, or steel alloy foam. Cathode materials include LSM, lanthanum iron oxide (LSF), lanthanum nickel oxide (LNO), or lanthanum strontium cobalt ferrite (LSCF). Materials for the electrolyte include zirconia doped with yttria or scandia (YSZ or ScSZ), or a ceria-based electrolyte doped with samaria or gadolina (SDC or GDC).

In some embodiments, the liquid metal anode is an Fe-based alloy to achieve high carbon solubility and a low enough melting temperature for favorable electrochemical cell operation. The liquid alloy anode is characterized by having low liquidus (melting) temperature by incorporating alloying elements; having high carbon solubility with rapid carbon diffusion; having high electronic conductivity relative to molten carbonates; and is compatible with solid oxide electrolytes and steelmaking refractories Anode Alloy Development The key requirements of the liquid metal anode are a low liquidus temperature and high carbon solubility. Fe exhibits high carbon solubility and is abundantly available at relatively low cost. Therefore, Fe is a great candidate for the DCFC anode alloy design. The eutectic composition of an alloy corresponds to the lowest temperature at which a mixture of substances completely melts or solidifies. Steel, an alloy of Fe and C, has a eutectic composition of 4.3 wt % C around 1150° C. Using the Fe—C eutectic composition in a DCFC would require an operating temperature around 1200° C. which is far too high for desirable electrochemical reactions and overall cell efficiency. Therefore, additional alloying elements were investigated to incorporate into the Fe—C system to lower liquidus temperature. Sn has a melting point of 232° C. and has been investigated for use with solid oxide electrolytes. However, Sn has low carbon solubility, which is one of the requirements of the anode. Fe—Sn—C data is nearly absent from literature and thermodynamic databases as Sn in steel segregates to grain boundaries which has a detrimental effect on mechanical properties. The eutectic composition Fe—Sn is at approximately 30 wt. % Sn.

Low melting point alloys in the Fe—Cr—Mn—Mo—C system were examined using Thermo-Calc software for the calculation of phase diagrams (CALPHAD) based on thermodynamic data. By projecting liquidus lines onto temperature-composition planes, it was observed that a eutectic composition of Fe-3.99 C-21.4 Mn-10.4 Mo has a liquidus temperature of 1036° C. This composition allows a decrease in liquidus temperature of over 100° C. from the Fe—C eutectic while maintaining 93% of the carbon solubility, making Mn and Mo alloying elements of great interest to this DCFC anode alloy.

Si is commonly alloyed with steel to increase strength and improve magnetic properties. It an important alloying element in cast iron as over approximately 1 wt. % Si forces carbon out of the solution creating the characteristic graphitic microstructure present in grey cast iron. By adding Si to the Fe—Mn—C system results in a liquidus temperature of 1000° C. but reduces C solubility to 0.73 wt. %. Due to the presence of Si in nearly all steels, some percentage of Si is present in the anode alloy.

Figure 16:
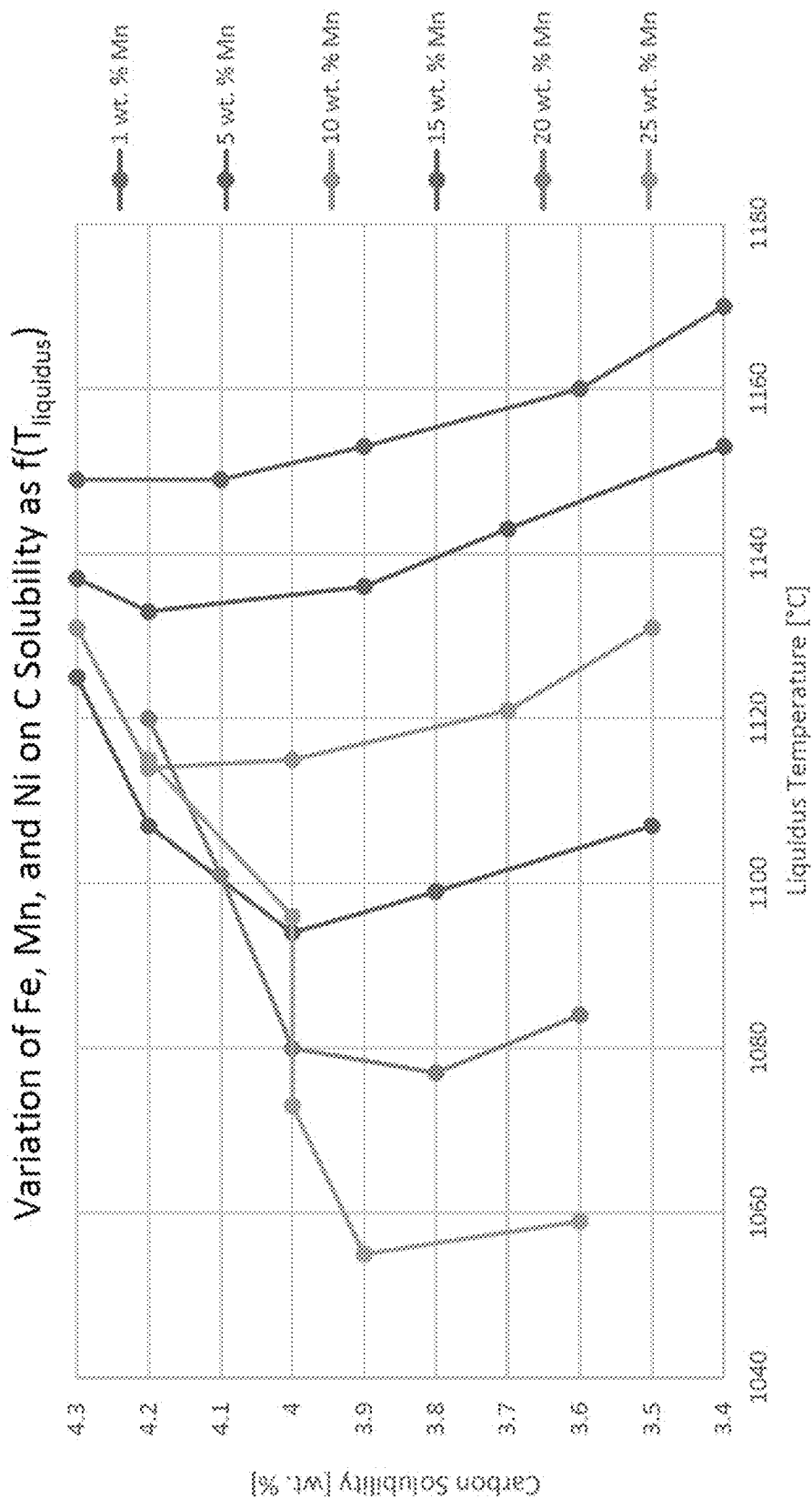
FIG. 16 is a graph showing the comparison of liquidus temperature on carbon solubility in Fe—Mn—Ni—C system.
Figure 17:
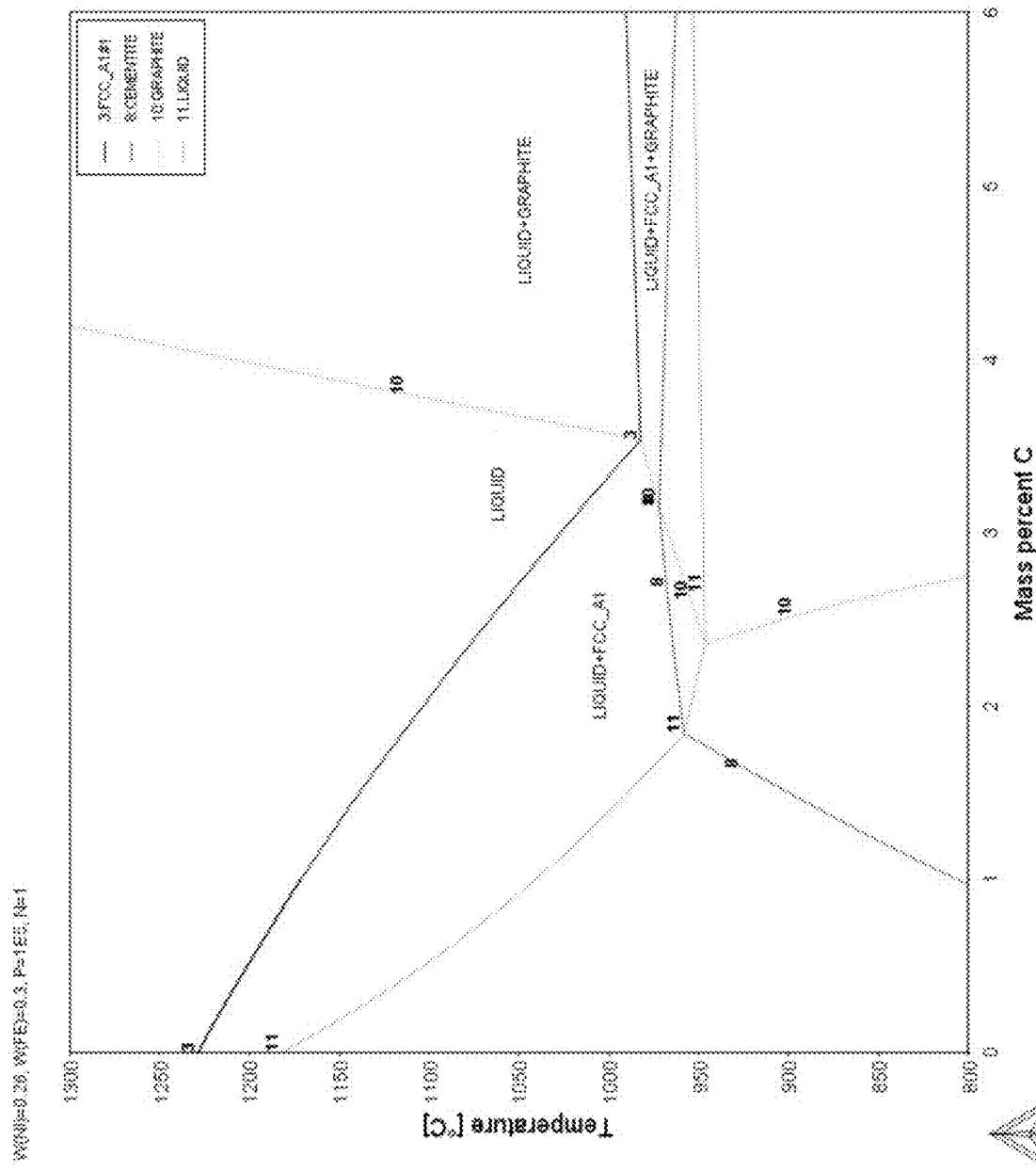
FIG. 17 is a phase diagram for 40 Mn-30.5 Fe-26 Ni—C showing eutectic point at 3.5 wt. % C with a liquidus temperature of 982° C.
Figure 18:
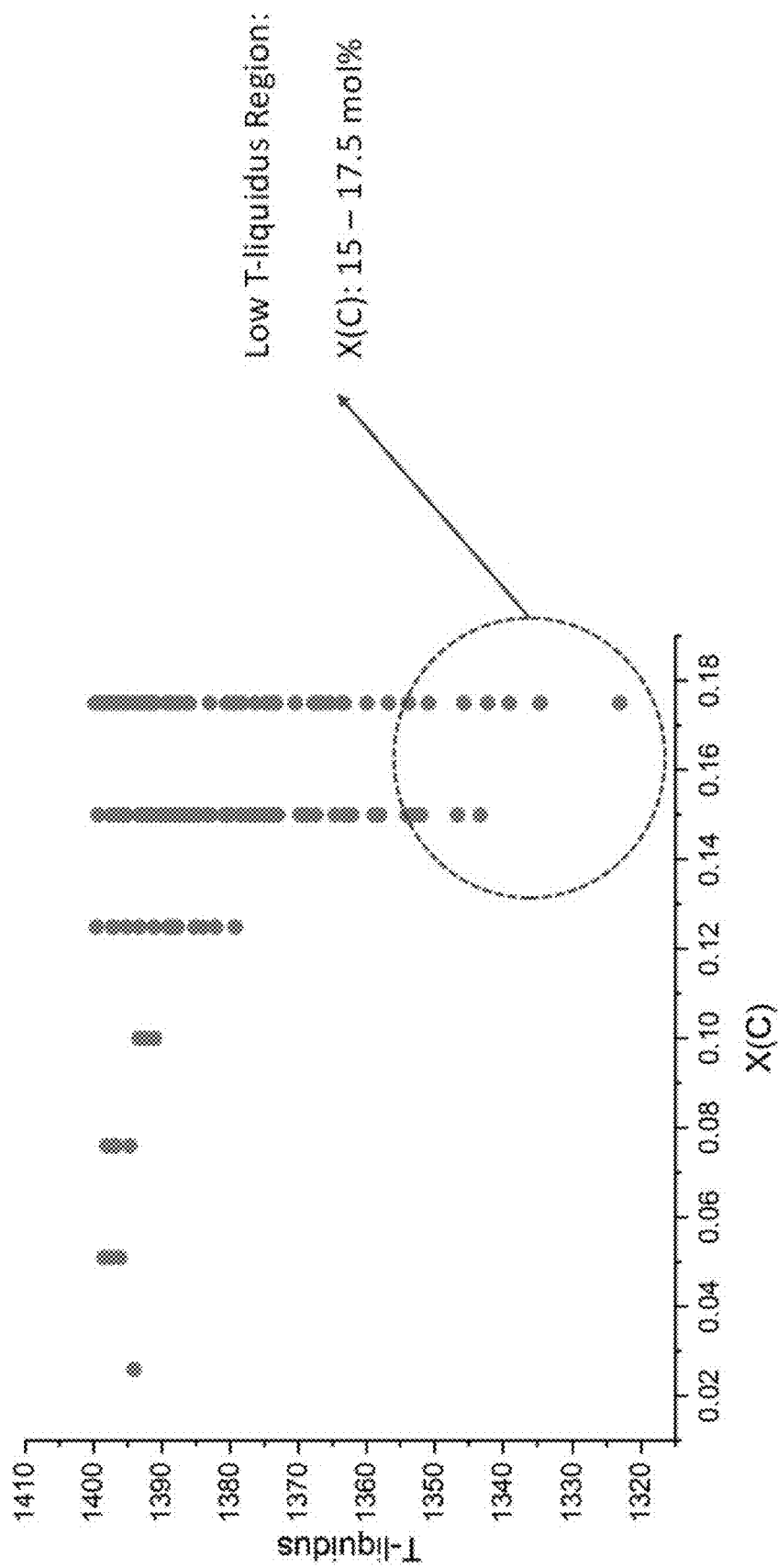
FIG. 18 is a graph showing results from first round (2.5 mol. % increments) of high throughput calculations for the Fe—Mn—Ni—C system with Mn, Ni, and C below 20 mol %. The y-axis is in Kelvin and x-axis is in units of mol. %.
Figure 23:
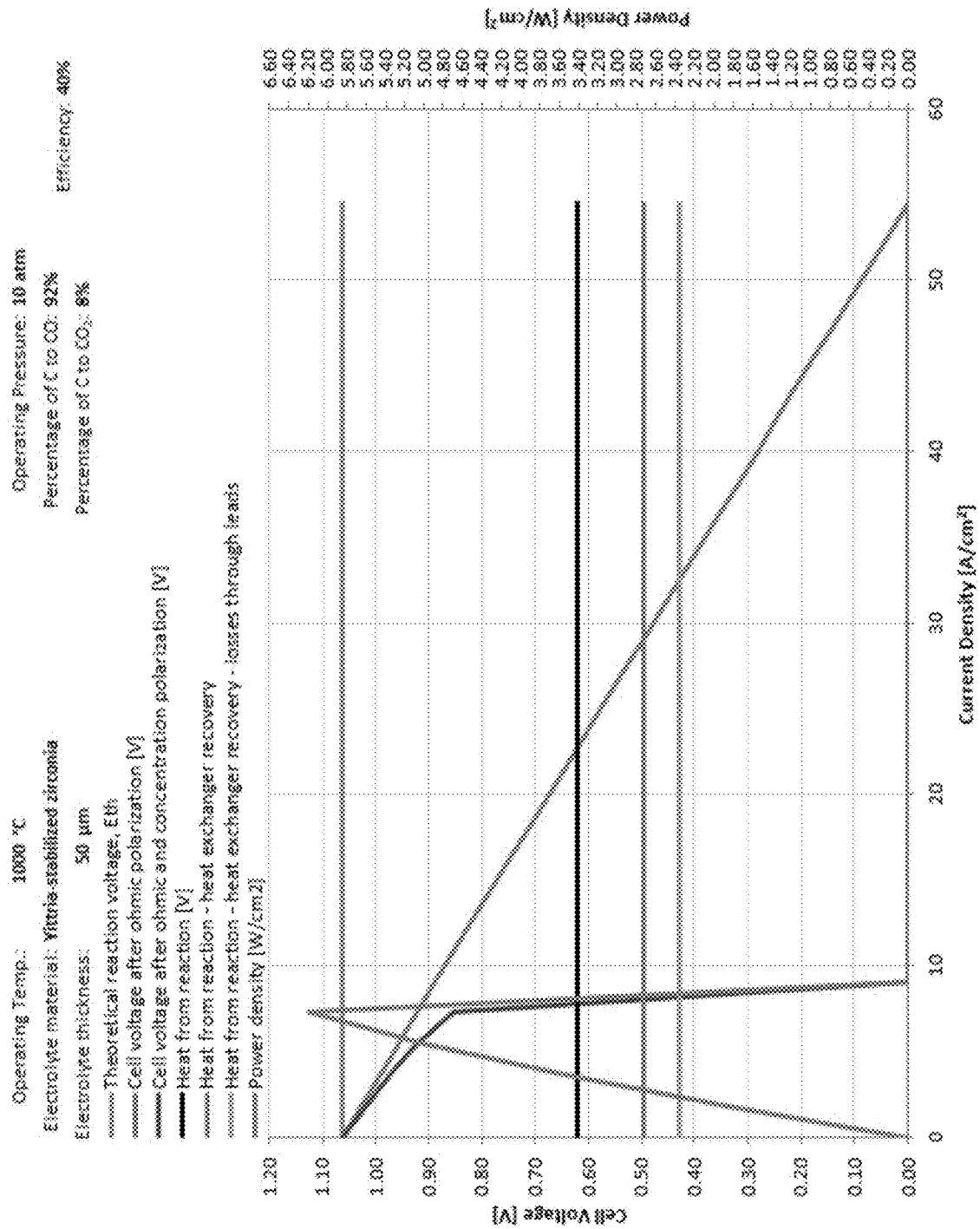
FIG. 23 is a graph showing a modified DCFC Evans diagram operating at 1000° C. with a maximum operating power density of 5 W/cm2.

Ni is often alloyed with Fe to increase toughness, hardness, and corrosion resistance. Ni is about half the cost of Mo, $0.014/g vs. $0.027/g, and as such is an attractive alternative alloying element for this liquid anode. The liquidus temperatures of the Fe—Mn—Ni—C were examined by varying Mn and Ni content by increments of 5 wt. % to understand the influence of varying the composition of these elements on the overall liquidus temperature. An initial run of 30 compositions using the TCFE9 Thermo-Calc database resulted in the composition 56.1 Fe-25 Mn-15 Ni-3.9 C that showed a liquidus temperature of 1055° C. A plot showing liquidus temperatures vs. carbon solubility of these 30 compositions is shown in FIG. 16. The data show that using over 20 wt. % Mn and Ni in the system had advantageous results in reducing the liquidus temperature and retaining high (over 80% of that present in the Fe—C eutectic) carbon solubility. Further using 30 wt. % and 40 wt. % Mn with varying levels of Ni and Fe were observed to have lower liquidus temperatures. Compositions using 40 wt. % Mn with over 26 wt. % Ni were observed to have a sharp decrease in carbon solubility. Therefore, alloy with low liquidus temperature and high carbon solubility was observed for composition of 40 Mn-30.5 Fe-26 Ni-3.5 C having a liquidus temperature of 982° C. as shown in FIG. 17. The data show that the best candidates to alloy with Fe and C in the anode were observed to be: Mn, Mo, Ni, and Sn. High throughput calculations of the Fe—Mn—Ni—Si—C system were performed. FIG. 18. Using step size of 2.5 mol. %, 6280 combinations of alloys were tested from 0-20 mol. % of Mn, Ni, Si, and C. The best candidate alloy was observed to be 52.3 Fe-22.6 Mn-20.9 Ni-4.2 C which had a liquidus temperature of 1050° C. The carbon solubility as a function of liquidus temperature from these combinations is visualized in FIG. 23. A second round of high throughput calculations were performed using with a step size of 0.5 mol % to find similar compositions with lower liquidus temperatures. 5441 additional compositions were generated, with the optimal composition containing 51.7 Fe-20.3 Mn-24 Ni-4 C showing a liquidus temperature of 1031° C.

With the knowledge gathered from this research, four anode alloys were examined in an experimental high-temperature apparatus mimicking the proposed DCFC design. Approximately 900 g of each alloy was measured and placed in an alumina crucible, then melted using a Sentro-Tech ST-1600C-445 induction box furnace at a temperature of 1500° C. for 1.5 hours under atmospheric conditions. To prepare the slurries, components were weighed and mixed overnight by ball milling with 4 mm diameter alumina media.

TABLE II

Anode alloys for DCFC

| Alloy No. | Alloy system | Calculated composition | | | | | | | Calculated liquidus ° C. |
|---|---|---|---|---|---|---|---|---|---|
| | | Fe | Mn | Ni | Sn | Mo | Si | C | |
| 1 | Fe—Mn— | 66 | 10 | — | — | 20 | — | 4 | 1036 |
| 2 | Fe—Mn— | 37.5 | 30 | — | 30 | — | — | 2.5 | — |
| 3 | Fe—Mn— | 30 | 40.5 | 26 | — | — | — | 3.5 | 982 |
| 4 | Fe—Mn— | 12.9 | 76 | — | — | — | 10 | 1.1 | 1000 |

Mass Balance

An attractive characteristic of DCFCs is their ability to operate on a variety of carbonaceous fuels. In some embodiments of the DCFC design, impurities from the fuel are expected to be present in the anode alloy as a slag layer or dissolved in the amorphous liquid phase. To better understand the amount of impurities that may accumulate in a commercial version of this cell, a 22-element mass balance was created for 13 different types of carbonaceous solid fuels. Fuel composition was obtained for fuels such as coal, to biomass, to off-specification building materials and charcoal.

TABLE III

Compositions of solid carbonaceous fuels

| Fuel | Ash (wt. %) | Pure elements (wt. % of total) | | | | | |
|---|---|---|---|---|---|---|---|
| | | C | H | N | S | O | Cl |
| Coal | 12.5 | 70.08 | 4.79 | 1.51 | 0.59 | 10.52 | 0.01 |
| Pine chips | 5.95 | 49.66 | 5.67 | 0.51 | 0.08 | 38.07 | 0.06 |
| Corn straw | 7.65 | 44.73 | 5.87 | 0.6 | 0.07 | 40.44 | 0.64 |
| Rape straw | 4.65 | 46.17 | 6.12 | 0.46 | 0.10 | 42.47 | 0.03 |
| Biomass Mix | 12.49 | 49.59 | 5.79 | 2.43 | 0.74 | 28.87 | 0.09 |
| Pressure ground wood | 31.79 | 48.31 | 7.63 | 1.03 | 0 | 11.19 | 0.05 |
| B-Wood | 1.85 | 50.37 | 6.93 | 1.03 | 0 | 39.75 | 0.07 |
| Palm kernels | 5.14 | 48.23 | 6.19 | 2.61 | 0.26 | 37.36 | 0.21 |
| Olive Res. | 7.17 | 54.12 | 5.36 | 1.28 | 0.21 | 31.66 | 0.20 |
| Pepper plant | 14.44 | 36.11 | 4.26 | 2.72 | 0.49 | 41.86 | 0.13 |
| Chicken litter | 37.79 | 37.38 | 4.19 | 3.76 | 0.74 | 15.64 | 0.50 |
| Meat and Bonemeal (MBM) | 23.95 | 43.07 | 6.04 | 9.16 | 1.27 | 15.64 | 0.87 |
| Charcoal | 4.27 | 57.3 | 3.16 | 0 | 1.53 | 0.00 | 0.10 |

CO/CO$_2$ Formation Ratio as a Function of Temperature

The mass balance starts by determining the amount of carbon available for the electrochemical reaction. On a per unit mass basis, fuel added to the system was multiplied by the wt. % carbon reported for the fuel type. The amounts of CO and CO$_2$ can be calculated accurately by considering the formation of CO and CO$_2$ as a function of temperature. The direct and indirect carbon oxidation reactions that occur in a DCFC are as follows:

$$C + O_2 \rightarrow CO + 2e- \quad [1]$$

$$CO + O_2 \rightarrow CO_2 + 2e- \quad [2]$$

$$C + CO_2 \rightarrow 2CO \quad [3]$$

$$2CO + 2O_2 \rightarrow 2CO_2 + 4e- \quad [4]$$

At atmospheric pressure the ratio of CO/CO$_2$ is equal to around 690° C. Above this temperature, CO formation in [1] is favored, which is undesirable in a DCFC because only two electrons are exchanged per molecule of carbon fuel rather than four as shown in [6].

$$O2 + 4e- \rightarrow 2O2- \quad [5]$$

$$2O2- + C \rightarrow CO2 + 4e- \quad [6]$$

Additionally, CO produced can react with carbon in the anode via the chemical (rather than electrochemical) reaction, known as the reverse Boudouard reaction. This is detrimental to fuel cell performance since it uses carbon in the anode without contributing to cell voltage. The best way to avoid losses associated with CO formation is to operate the cell below the temperature at which equation [3] becomes energetically favorable about 700° C. For an electrochemical cell operating above this temperature, CO$_2$ generated from equations [6], [1], [2], and [4] can be purged from the anode chamber to mitigate performance losses from equation [3]. Considered as a partially reacted fuel, CO that leaves the cell with CO$_2$ exhaust could be used in a downstream SOFC to improve system efficiency.

Figure 19:
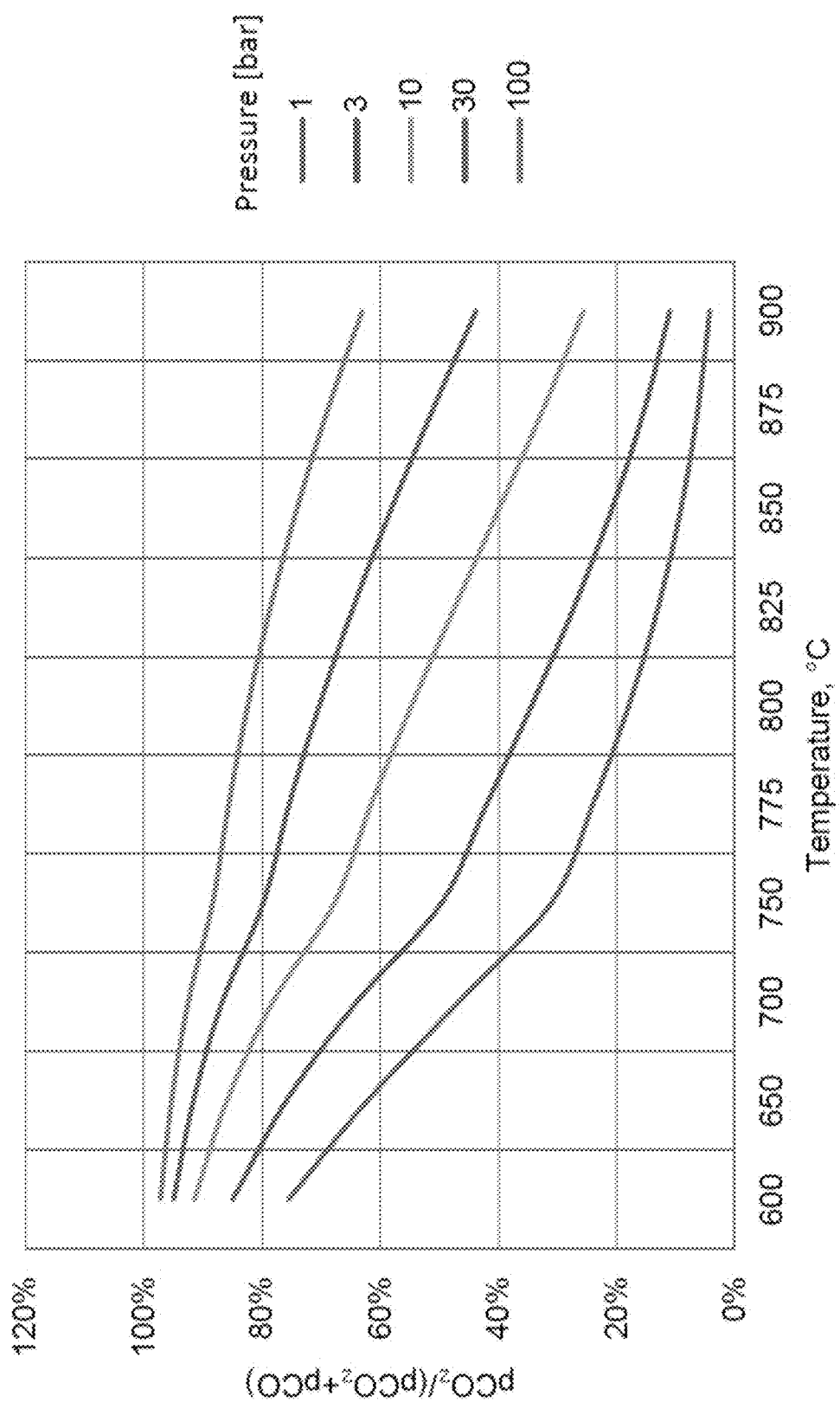
FIG. 19 is a graph showing $CO_2$ gas fraction in equilibrium with carbon and CO at various pressures.

CO/CO$_2$ equilibrium ratio as a function of temperature was calculated based on Gibbs Free Energy (ΔG) of each reaction. The CO$_2$ reaction is desirable in the DCFC because four electrons are exchanged per mole of carbon reactant compared to two electrons in the CO reaction. By increasing pressure, the temperature at which CO/CO$_2$ evolution is in equilibrium is elevated almost 100° C. shown in FIG. 19.

Calculating Products from Reactions within the DCFC

With the CO/CO$_2$ equilibrium data, mass of each product evolved at a specific DCFC operating temperature considering the mass of carbon available, Cm, in a specific fuel type.

$$Cm = mfuel \text{ introduced} * wt. \% \ C \text{ in fuel} \quad [7]$$

$$CO = \frac{\% \ CO_{evolved} C_m}{M_C / M_{CO}} \quad [8]$$

$$CO_2 = \frac{\% \ CO_{2 \ evolved} C_m}{M_C / M_{CO_2}} \quad [9]$$

Where Mi is the molar mass of species i. The approach used to calculate CO and CO$_2$ produced from carbon wt. % in the fuel was also used to calculate oxides of aluminum (Al$_2$O$_3$), calcium (CaO), sulfur (SO$_2$), and silicon (SiO$_2$). For this mass balance it was estimated that 80% of these elements within the fuel would react to produce slag (oxides) with the remaining 20% dispersed in the anode. Total mass of oxygen required for the system was calculated using the formula below:

$$O_m, \text{total} = \Sigma O_{Req. \ for \ oxides} - O_m \quad [20]$$

Total air required for the reactions was calculated by dividing $O_m$, total by the wt. % of oxygen gas in air at 1 atm and multiplying by a factor (e.g. 50%) to account for only a fraction of the oxygen introduced actually taking part in the formation of oxides. Remaining oxygen exits the cathode tube in a nitrogen-rich gas stream.

Effects of impurities in the fuels accumulating within the liquid anode alloy include an increase in liquidus temperature and a reduction in carbon solubility, both of which are detrimental to overall DCFC performance. Of all the metals present in these fuel sources, Fe was considered to have the biggest impact on the alloy liquidus temperature due to its high melting point (1536° C.). Al and Ca have liquidus temperatures below (660° C. and 842° C., respectively) the anode alloy, while the amount of Mn present was negligible. Accumulation of Fe causes the anode alloy liquidus temperature to increase, forcing the cell to operate at a higher temperature with associated performance penalties.

$$(\text{wt. \%})_{additional\ Fe\ in\ alloy} = \text{wt. \%}_{Fe\ in\ fuel}\left(\frac{m_{fuel\ added}}{m_{alloy,total}}\right) \quad [11]$$

where: $m_{alloy,total} = m_{fuel\ added} + m_{anode\ alloy}$

Increasing Si content reduced carbon solubility within the Mn—Fe—Si—C system. Amount of Si dissolved in the anode alloy was determined by:

$$\text{wt. \%}_{Si\ in\ fuel\ dissolved\ in\ alloy} = 1 - (\text{wt. \%}_{Si\ in\ fuel} * \text{\% Si to slag}) \quad [12]$$

$$\text{wt. \%}_{Si\ in\ alloy} = \text{wt. \%}_{Si\ in\ fuel\ dissolved\ in\ alloy}\left(\frac{m_{fuel\ added}}{m_{alloy,total}}\right) \quad [13]$$

$$m_{alloy\ removed} = \text{wt. \%}_{contamined} m_{alloy,total} \quad [14]$$

if: $\text{wt. \%}_{Si\ in\ fuel\ dissolved\ in\ alloy} > \text{wt. \%}_{Fe\ in\ fuel}$, $\text{wt. \%}_{contaminated} = \text{wt. \%}_{Si\ in\ alloy}$ if: $\text{wt. \%}_{Si\ in\ fuel\ dissolved\ in\ alloy} < \text{wt. \%}_{Fe\ in\ fuel}$, $\text{wt. \%}_{contamined} = \text{wt. \%}_{additional\ Fe\ in\ alloy}$ Make-up elements required were determined by the composition of the anode alloy and amount removed. Carbon from the incoming fuel is used to replenish the mass of carbon removed with the contaminated alloy, with [7] becoming:

$$C_m = (m_{fuel\ introduced} * \text{wt. \%}_{C\ in\ fuel}) - (m_{alloy\ removed} * \text{wt. \%}_{C\ in\ alloy}) \quad [15]$$

Figure 20:
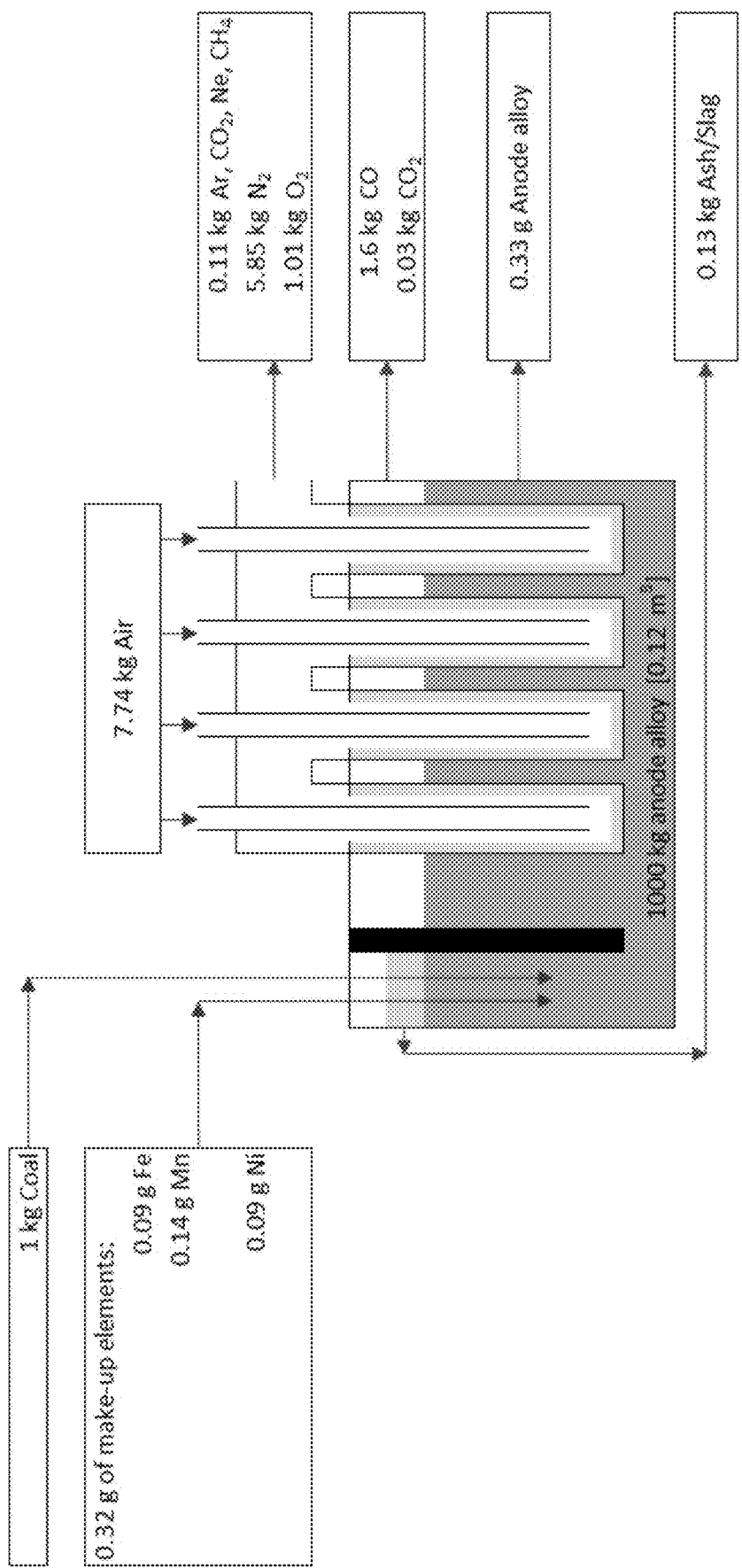
FIG. 20 is a schematic drawing of a flow diagram of DCFC with tubular cathode/electrolyte architecture for mass balance in steady-state operation at 1000° C. using an anode alloy comprised of 30 Fe-40.5 Mn-26 Ni-3.5 C. Oxygen present in the exhaust gas stream corresponds to a 50% utilization factor (i.e. twice the required oxygen was introduced). Total mass of make-up elements does not equal mass of anode alloy removed. The 0.01 g difference is replenished from part of the carbon delivered by the incoming coal fuel, with the remainder being used for $CO/CO_2$ production.

The resulting flow diagram for a commercial DCFC is shown in FIG. 20. The values shown are for steady state operation. In some embodiments, the anode alloy and slag is removed periodically with fuel and make-up elements introduced via loss-in-weight feeders at corresponding interval to keep the mass of the system in equilibrium.

Figure 21:
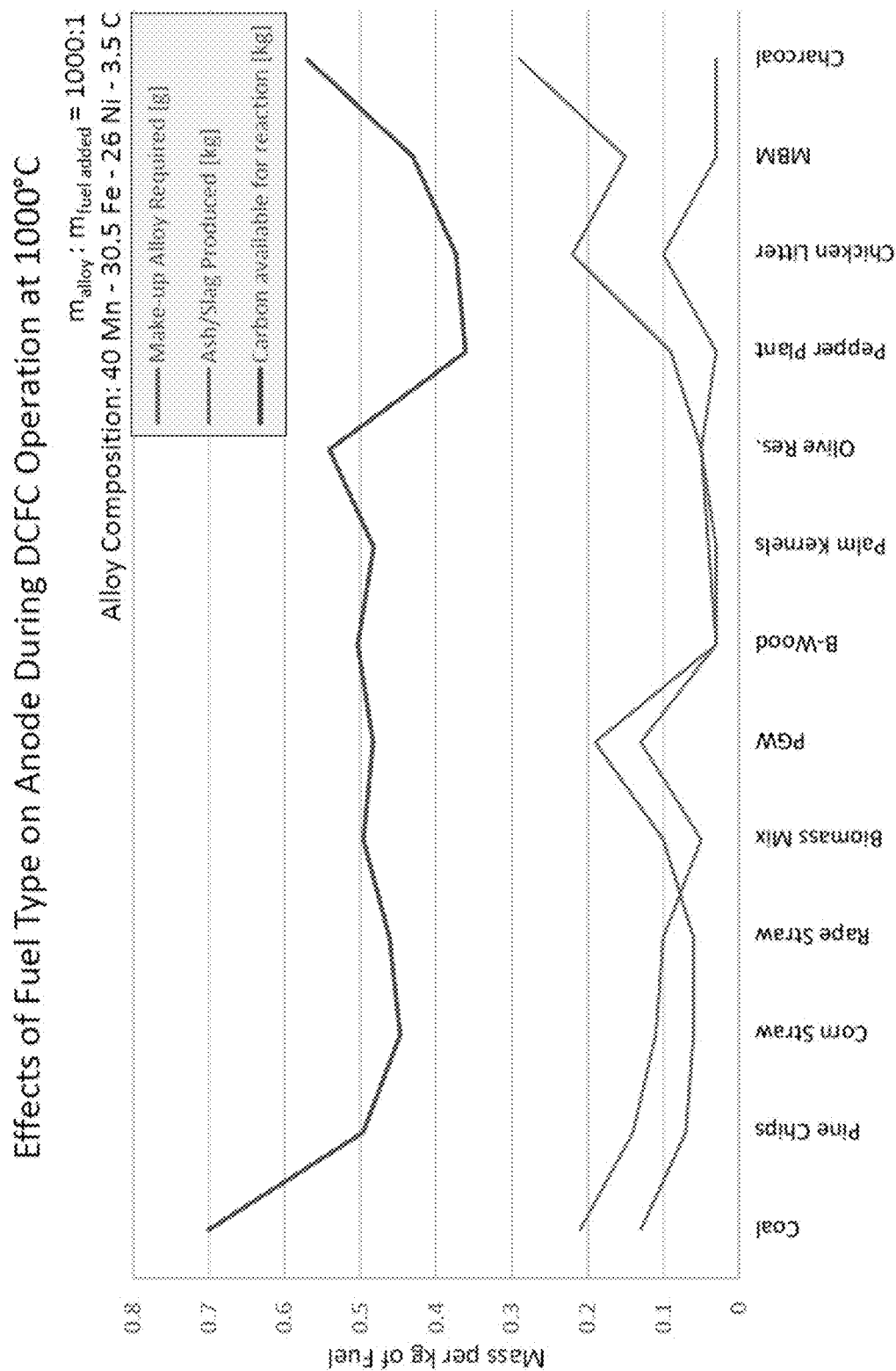
FIG. 21 is a graph showing analysis of carbonaceous fuel types for suitability with the 40 Mn-30.5 Fe-26 Ni-3.5 C liquid anode alloy. Alloy make-up mass is in g, not kg.

With the mass balance complete, fuel types are ranked based on their suitability for the device. The most economical carbonaceous fuel is one that offers the highest carbon content with the smallest amount of impurities. Higher carbon content allows for more reactant to enter the cell and reduces storage volume and transfer cost per unit mass of fuel. Impurities in the feed contribute to slag buildup in the feed chamber and contaminated anode alloy, both of which should be reduced as much as possible. FIG. 21 shows an analysis of the carbon content, ash/slag produced, and make-up alloy required using each fuel type with the 40 Mn-30.5 Fe-26 Ni-3.5 C alloy. Therefore, B-grade wood, palm kernels, and olive residue are the best fuel choices for this alloy, providing the best ratio of carbon content to impurities per unit mass.

Energy Balance

To forecast the performance of this design, an energy balance was performed. First, enthalpy (H) and entropy (S) for each species was determined via the Shomate Equation with constants obtained from the National Institute of Standards and Technology (NIST) Chemistry WebBook, SRD 69. The data were used to calculate available free energy (G) of a species from 25° C. to 1300° C. at a specified pressure via the following equation:

$$G(p,T) = H - TS \quad [16]$$

With these data obtained for C, O, CO, and $CO_2$, change in Gibbs free energy ($\Delta G$) was calculated using [19], [19a], and [19b] for each of the following reactions below:

$$C + O_2 \rightarrow CO_2 \quad [17]$$

$$C + \tfrac{1}{2}O_2 \rightarrow CO \quad [18]$$

$$\Delta G = \Delta H - T\Delta S \quad [19]$$

$$\Delta H = \text{mol.}_{prod.} H_{prod.} - (\Sigma \text{mol·}i\ Hi) \quad [19a]$$

$$\Delta S = \text{mol.}_{prod.} S_{prod.} - (\Sigma \text{mol·}i\ Si) \quad [19b]$$

Theoretical voltage of each reaction was calculated across the temperature range using the Nernst equation, which correlates the reduction potential of an electrochemical reaction to electromotive force, E, with units of volts. E is related to $\Delta G$ under standard conditions by:

$$\Delta G^0 = -nFE^0 \quad [20]$$

Where n is the number of electrons transferred in the reaction (2 for CO and 4 for $CO_2$) and F is the Faraday constant, equal to ~96485 C/mol. Given that the DCFC experiences non-standard conditions due to increased pressure and temperature to improve performance, these conditions are accounted for in the calculation of $\Delta G$ for the DCFC energy balance.

$$\Delta G = \Delta G0 + RT \ln(Q) \quad [21]$$

Substituting expression from [20] for $\Delta G$ in [21] and solving for E results in:

$$E_{th} = E^\circ - \frac{RT}{nF}\ln(Q) \quad [22]$$

With Q being the reaction quotient, a value that relates quantities of products and reactants in the overall reaction. Here Q was calculated using the partial pressure of oxygen gas from the incoming air and partial pressure of CO or $CO_2$ produced as a function of DCFC operating temperature per the reverse Boudouard reaction.

$$Q_{Product} = \frac{pO_2}{pProduct(T)} \quad [23]$$

Due to the wide range of temperatures that promote both CO and $CO_2$ production, total theoretical cell voltage was calculated by multiplying the theoretical voltage of each product by its fraction evolved, shown in [24].

$$E_{th,total} = (E_{th,CO} * \text{\% CO evloved}) + (E_{th,CO2} * \text{\% CO2 evloved}) \quad [24]$$

Current density and power density were then determined using theoretical voltage values for the CO and $CO_2$ reactions and properties of the solid electrolyte. Conductivity and resistance values for three potential solid oxide electrolyte materials (YSZ, ScSZ, and SDC) were incorporated into the energy balance. Overall resistance of the electrolyte was calculated via dividing thickness by resistance per unit area:

$$r_{el.} = \frac{t_{electrolyte}}{k_{electrolyte}} \quad [25]$$

Current density is the quotient of Eth and rel. as shown below.

$$j = \frac{E_{th,total}}{r_{el.}} = \left[\frac{A}{cm^2}\right] \quad [26]$$

Power density, Pe, was calculated using $E_{th,\,total}$, j, and number of electrons transferred per mole of oxygen.

$$P_e = \frac{E_{th,total} j}{n} \quad [27]$$

Losses in an Electrochemical Reaction

Actual cell voltage is lower than the theoretical value due to losses present in the cell, including ohmic, concentration, and activation polarization (Kakac et al. 2007).

$$V_{actual} = E_{th,total} - \text{losses} \quad [28]$$

Ohmic polarization accounts for the resistance encountered by electrons as they move through the fuel cell's electrodes. This can be expressed as:

$$\eta_{ohm.} = j(ASR_{ohm.}) \quad [29]$$

Where $ASR_{ohm}$ is the area-specific resistance of the cell, and includes ionic resistance of the electrolyte, electronic resistance of the electrodes, and some contact resistance associated with the interfaces between cell components.

Examining the electrolyte interfaces at a micro scale there exists a gradient in reactants on the anode and cathode sides. As reactants are combined and carried away (via buoyant force), the concentration of reactants at the electrolyte interface decreases. In a steady state condition, more reactants are continually transported from the bulk to the electrolyte reaction interface, moving from a region of high concentration in the bulk to the lower concentration at the interface. Concentration polarization accounts for this reduction in the concentration of reactants at the electrolyte surface as the reaction proceeds and was calculated using the equation [30]

$$\eta_{con.} = \frac{RT}{nF}\left(1 - \frac{1}{n}\right)\ln\left(\frac{j_L}{j_L - j}\right) \quad [30]$$

Where $j_L$ is the limiting current density. This is defined as the minimum flux (the amount of a species flowing through an area, in this case the electrolyte surface) of carbon from the anode and oxygen ions from the cathode to the surface.

For the anode, the limiting current density was calculated by:

$$j_{L,anode} = nFJ = nF\left(\frac{D_{C\,in\,maj.}\rho_{mol.,C}}{L}\right) \quad [31]$$

Where D is the diffusivity of C in the major constituent of the alloy and ΔC is the molar density of C in the liquid alloy. The boundary layer thickness, L, was estimated to be 100 μm in the liquid anode.

For the cathode, limiting current density was calculated using:

$$j_{L,cathode} = nFJ = nF\left(\frac{\rho_{mol.,O_2} D_{O_2\,in\,N_2}}{t_{cathode}}\right) \quad [32]$$

Activation polarization accounts for the portion of energy required to overcome an activation barrier which allows the electron-exchanging reaction to occur. This energy comes from a portion of the reaction voltage generated, decreasing actual cell voltage. The activation polarization is defined as:

$$\eta_{act.} = \frac{2RT}{F}\ln\left[\frac{1}{2}\left(\left(\frac{i}{i_o}\right) + \sqrt{\left(\frac{i}{i_o}\right)^2 + 4}\right)\right] \quad [33]$$

Where $i_0$ is the exchange current density, a measure of the electrocatalytic activity at the triple phase boundary (the electrolyte-liquid anode interface where $O_2-$ reacts with C to produce $CO_2$) and quantifies the rates of reactions at the anode and cathode. Exchange current density is determined by curve fitting empirical voltage data as a function of current density. Without such data, ηact. was omitted from this energy balance.

Other Losses

Voltage calculated refers to that produced by the anode, cathode and electrolyte arrangement in a single cell. To achieve a desired voltage, many cells can be connected by electrical leads. Using terminology taken from planar fuel cell arrangements, this setup is called a fuel cell stack. Thermal energy lost through the leads can be mitigated by using a material with low thermal conductivity, but the same material will also have low electrical conductivity since thermal and electrical conductivity are coupled through the Wiedmann-Franz law. The voltage drop per lead can be calculated from the minimum total energy lost due to resistance and thermal energy shown below.

$$V_{el} = 2\sqrt{L_{el}T\Delta T}$$

where: T=operating temperature $$\Delta T = T - T_{ambient} \quad [34]$$

Some heat from the DCFC is required to raise the temperature of reactants as they enter the device. Heat [kJ/mol] required for incoming air and present in the cathode air exhaust was converted to volts via [20] using the expression below:

$$V_{gas,in} = \frac{(mol._{air,introduced}/mol._{O_2\,in\,air})C_{p,air}\Delta T}{nF} \quad [35]$$

$$V_{gas,out} = V_{gas,in}(mol._{air,exhaust}/mol._{O_2\,in\,exhaust}) \quad [36]$$

The amount of heat lost by the cell is reduced by using waste heat from the exhaust gas to heat incoming air. Industrial heat exchangers used in such applications are referred to as economizers and reach heat transfer efficiencies, ε, up to 90% (Lindeburg, 2020). Using this factor, total heat lost due to the incoming ambient air stream is:

$$V_{air} = V_{gas,in} - (1-\varepsilon)V_{gas,out} \quad [37]$$

Energy required to heat incoming solid fuels are similarly reduced by using the $CO/CO_2$ exhaust gas stream in a heat exchanger. During operation, heat radiated from the DCFC unit to the surrounding air also contributes to thermal losses. These losses are negligible compared to the thermal and electrical losses calculated and therefore were omitted from the analysis.

Overall cell efficiency was calculated by subtracting thermal losses from the heat produced, ΔH, from the $CO/CO_2$ reaction at a specified operating temperature.

$$\text{Efficiency} = \frac{\Delta H_{total} - V_{el} - V_{air}}{nF} \quad [38]$$

Modified DCFC Evans Diagram

Figure 22:
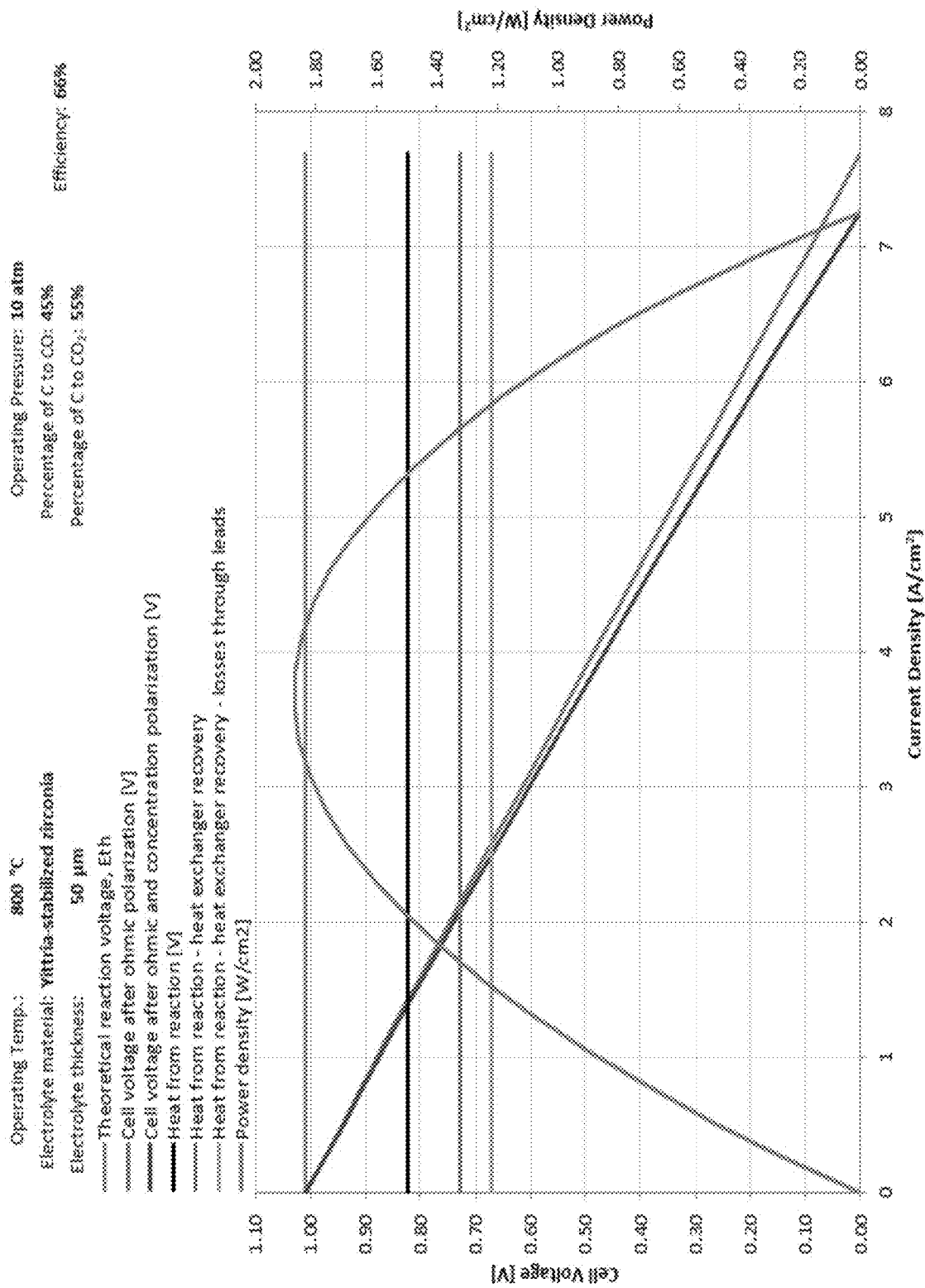
FIG. 22 is a graph showing a modified DCFC Evans diagram with dashboard representing target values of operation. Peak calculated power density using a YSZ electrolyte in these conditions is 1.87 W/cm2. The cell is operated between points A and B due to thermal and electrical losses, resulting in a maximum power density of 1.37 W/cm2. Under the same conditions a ScSZ electrolyte results in a power density of 3.25 W/cm2.

A plot showing the relationship between electric potential and current density is called an Evans diagram. Such a plot is often adapted to show performance of a fuel cell by including power density values as a function of current density on a second vertical axis. Using this format, values obtained from the energy balance are presented for the proposed DCFC operating at 800° C. in FIG. 22, with operation at 1000° C. shown in FIG. 23. Performance characteristics are dependent on a number of variables, with their values listed in the dashboard at the top of the plot. As current density varies from its minimum to maximum (the limiting value dictated by the anode, cathode or electrolyte), actual cell voltage decreases to zero. Since power density is the product of voltage and current density, it exhibits a parabolic shape with its highest value corresponding to the ideal cell operating condition.

Zeta Potential Characterization

Two types of zeta potential testing were performed: pH sweeps and surfactant concentration sweeps. For both methods, a 2% wt dispersion of analyte powder in deionized (DI) water was prepared, and then sonicated for 5 minutes and about 12 kJ of energy with a Misonix S-4000 Sonicator. The sonicated dispersion was transferred to a Colloidal Dynamics ZetaProbe. For pH sweeps, the basic titrant was a 0.5M KOH solution and the acidic titrant was a 0.5M HNO3 solution. For surfactant concentration sweeps, the titrant was a 10 wt % solution of Dolapix CE-64 in DI water.

Rheology Characterization

A Discovery HR-1 rotational rheometer from TA Instruments was used for the rheology. It was equipped with a 2° cone and plate geometry. The method included a constant shear rate of 1 s-1. This low shear rate was selected to represent the shear on the drying slurry due to gravity and is common for ceramic slip characterization. The test lasted either 1 or 2 minutes.

Slip Casting

Figure 24:
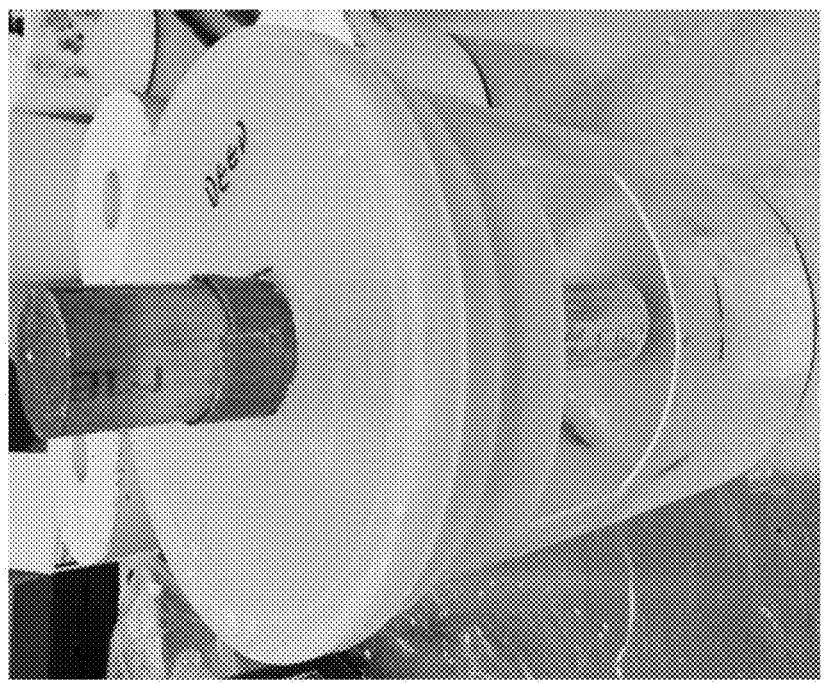
FIG. 24 is a photograph of a setup for creating slip casting molds. The plaster was poured around the suspended rod, and once dry, the rod was removed.

Pottery plaster #1 was purchased from the United States Gypsum Company. Plaster and DI water were mixed in a mass ratio of 10 to 7. The plaster was poured into a plastic container case mold and a 1" diameter aluminum rod was suspended in the plaster as it dried as shown FIG. 24. Once the plaster dried, the rod was removed, leaving a negative space into which the slip was poured for casting.

Figure 25:
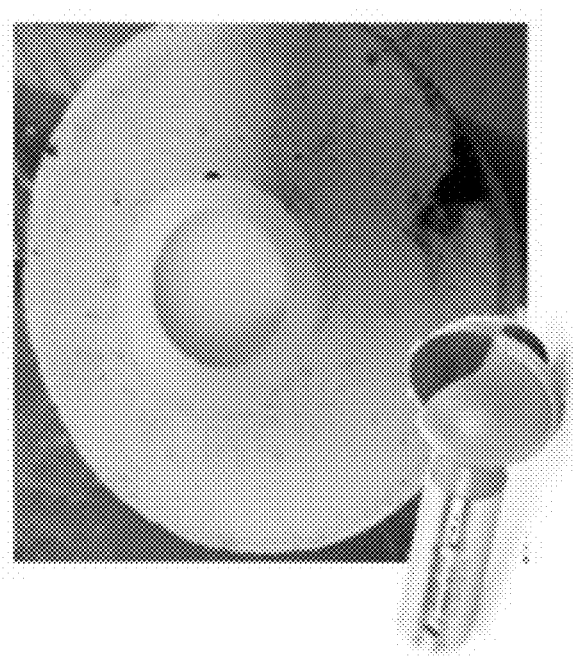
FIG. 25 is a photograph of a hemispherical-bottomed mold, and the ball-end router tool used to create it.

In an alternative embodiment, the plaster was prepared in the same way and then poured into smaller case molds and allowed to dry. Then, a shallow tube was drilled into the plaster with a ball-end router tool, which is shown in FIG. 25. This method has the advantage of creating a cavity with a hemispherical bottom which minimizes stress concentrations due to shrinking while drying and sintering, compared to flat-bottomed cylindrical molds. A shallow bevel was cut around the edge of the hole with a utility knife so that the cast part would have a flange from which it could be hung during the dip coating process. During casting, the cavity was constantly refilled with slip as the water was absorbed into the mold. The casted part was left to dry in the mold overnight or until it had dried enough to pull away from the mold and be easily removed.

Casting time was on the order of minutes but was varied as a parameter of study. A successful cast did not crack, released well from the mold, and had sufficient green strength for further processing.

Cast slip was not recycled because it was found that recycled slip cracked in the mold when recast. This is likely due to the faster drying rate of cast slip due to its higher solids content. The increased solids content is the result of the water being drawn out by the mold during casting, before the excess slip is recycled back into the container for re-use.

Porosity Characterization by Archimedes Method

Density of fired parts was measured by the Archimedes method. In this method, the dry weight $w_{dry}$ of a fired part is measured, and then the part is dipped in a tank of molten paraffin wax until it is well coated. The waxed weight $w_{waxed}$ is recorded. Then the coated sample is submerged in water and the submerged weight $w_{wet}$ is recorded as well. The density of the part ρ is calculated as $$\rho = \frac{w_{dry}}{w_{waxed} - w_{wet} - \left(\frac{w_{waxed} - w_{dry}}{\rho_{wax}}\right)} \quad [39]$$

The porosity of the part, p, may then be calculated as $$p = 1 - \frac{\rho}{\rho_{theoretical}} \quad [40]$$

Dip Coating of Cathode and Electrolyte

The cast LCM support, once removed from its mold, was first thoroughly dried in an Across International CF-1700 muffle furnace at 50° C. for 30 minutes. This drying step increased the green strength of the cast.

While the cast was drying, the cathode and electrolyte coating baths were prepared. Initially, the coating bath was a 40 mL beaker. Later, to accommodate longer parts, a 250 mL graduated cylinder was used. The appropriate coating slurry was stirred and then transferred to the coating bath slowly to prevent air entrainment.

Figure 26B:
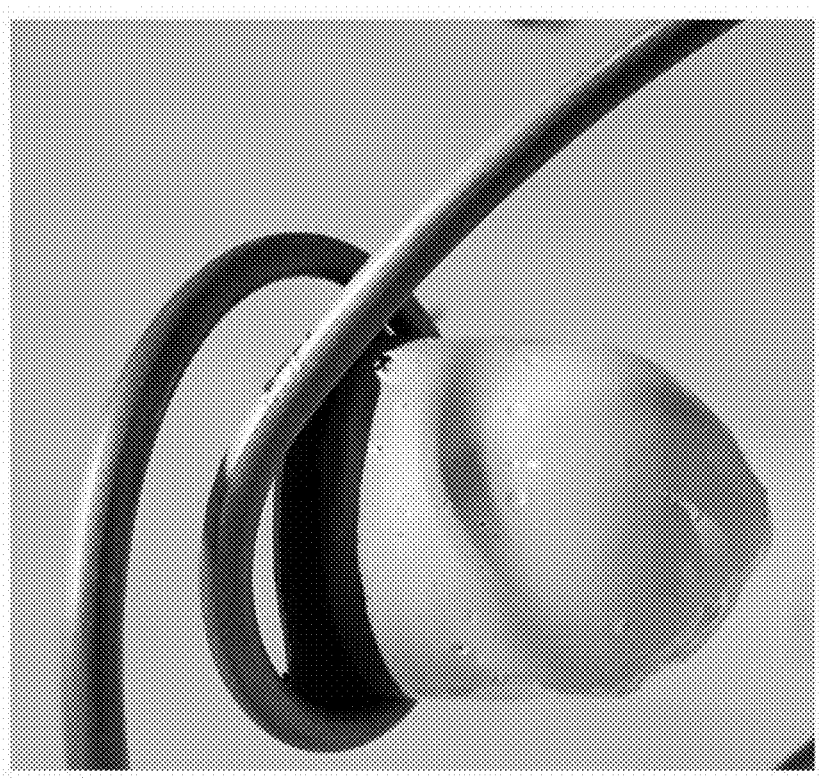
FIG. 26A-FIG. 26B are a set of photographs showing dip-coated samples resting in their holders.
Figure 26A:
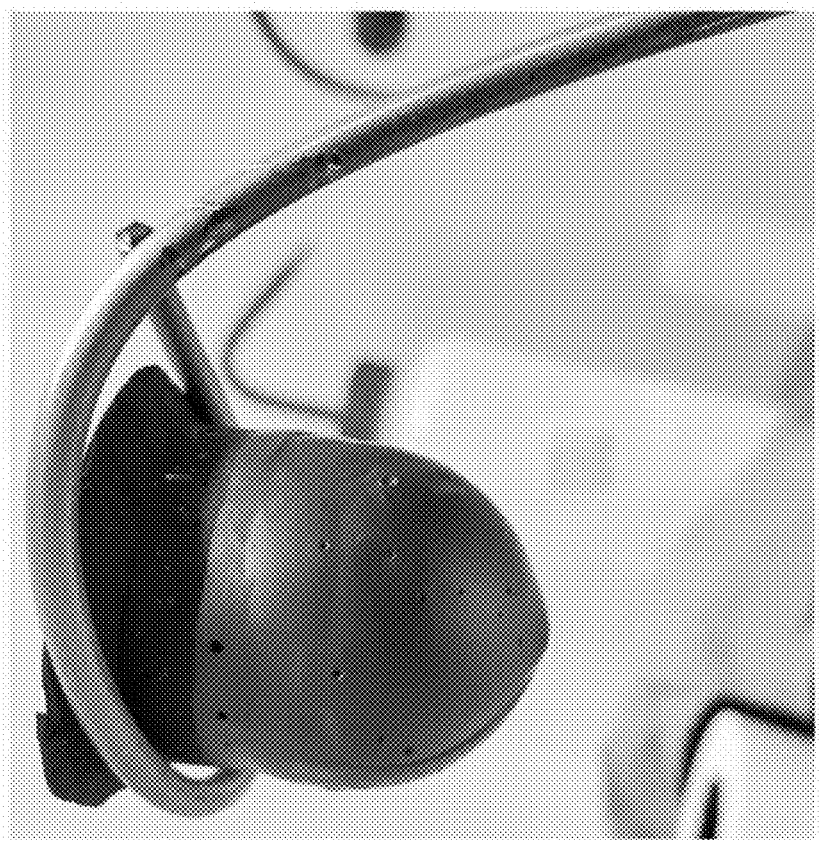

The dried support was held with tweezers, dipped into the coating bath, withdrawn, and then hung by its flange on a wire holder. The coated parts hanging in their holders are shown in FIG. 26A and FIG. 26B.

The wire holders were made by bending stainless steel wire into the appropriate shape. The part was left hanging on the holder until the most recent coating was dry to the touch.

Firing

An Across International CF-1700 muffle furnace equipped with a B type thermocouple was used for firing of all samples. Samples were lay-fired in the tray which is designed to maintain the roundness of the tube as it shrinks during sintering and produce a tube of uniform sintered diameter.

Figure 27:
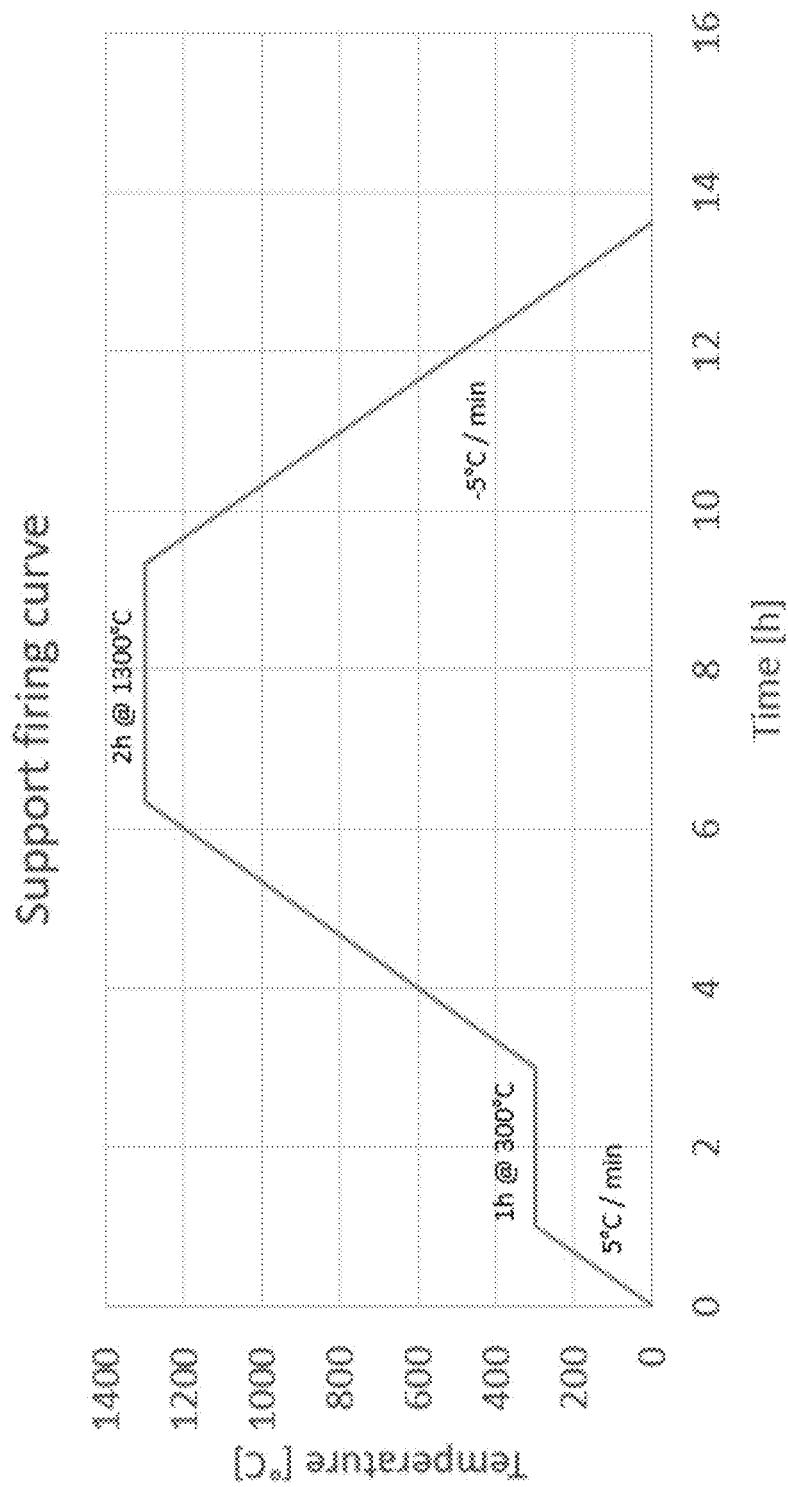
FIG. 27 is a graph of firing curve #1 which is used to fire a Ca-doped $LaMnO_3$ (LCM) support.
Figure 28:
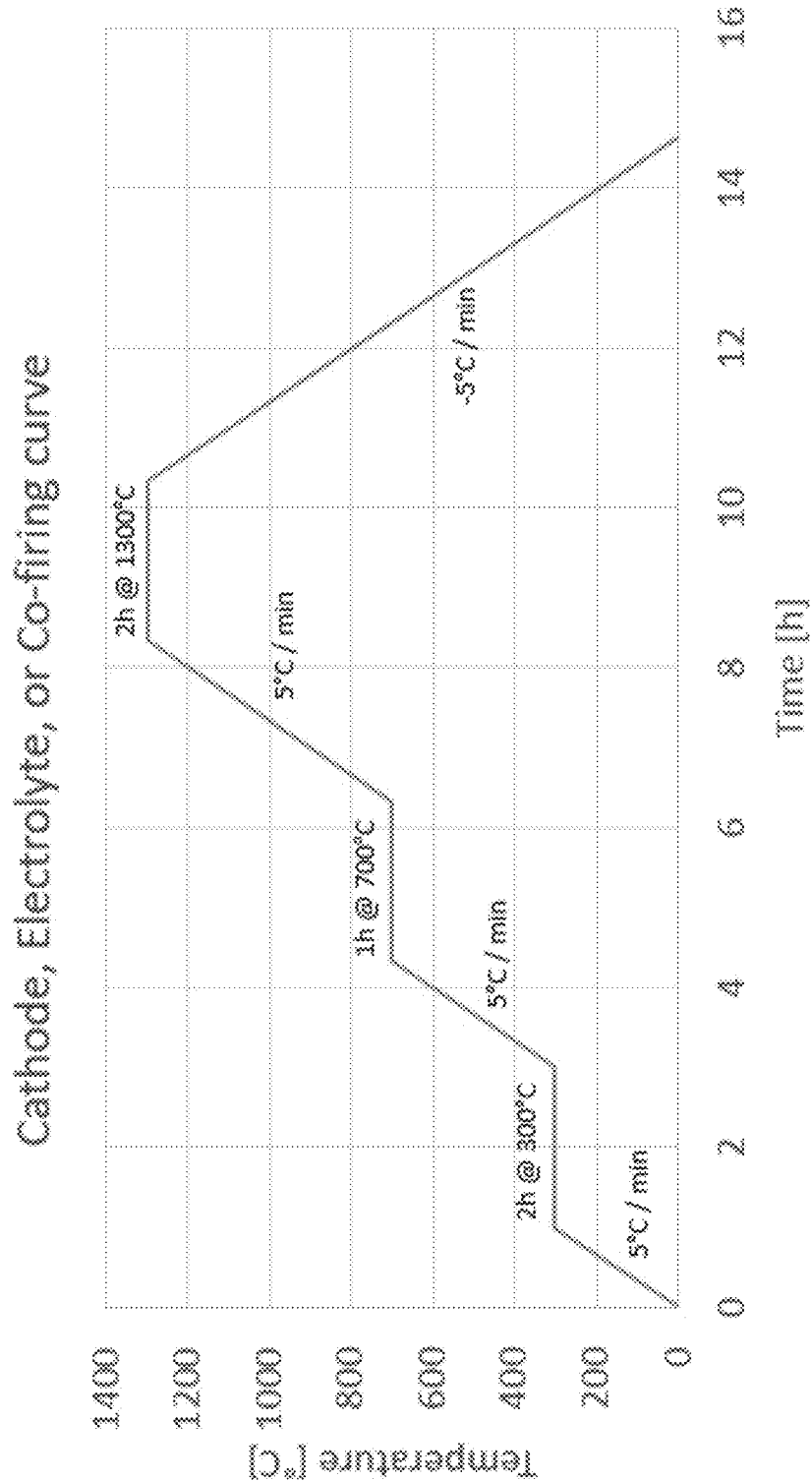
FIG. 28 is a graph of firing curve #2 which is used for sintering samples including a cathode layer.

Two firing programs were used, depicted in FIG. 27 and FIG. 28. Curve #1, depicted in FIG. 27, is used for sintering support samples only. The 2 hour hold at 300° C. is designed to burn out the cellulose pore former and the dispersant. Curve #2 adds a 1 hour hold at 700° C. to burn out the carbon black pore former in the cathode layer.

Both curves share a common 2 hour hold at 1300° C. to sinter the part. This temperature is selected to produce a fully densified electrolyte while preventing the support from over-sintering. In addition, a small amount of nanoalumina is used in the electrolyte layer as a sintering aid. Over-sintering of the support is not desirable because too much densification would result in closing the open porosity which is required to deliver oxygen to the cathode, where it is ionized.

SEM Imaging

Before imaging, the part is sectioned with an abrasive saw to produce a flat surface. Then, a mixture of 3 parts Buehler EpoxiCure 2 Epoxy Resin to 1 part Buehler EpoxiCure 2 Hardener is prepared. The sectioned part is mounted in a mold and the mold is filled with the epoxy mixture. The filled mold is held overnight under vacuum in a vacuum desiccator. The cured pucks are removed from the mold and polished with a Buehler AutoMet 250 polishing machine with an appropriate method and abrasives.

The polished samples are examined with a Hitachi TM3030 scanning electron microscope (SEM) operating at 15 kV acceleration voltage in backscatter detection mode.

Alloy Preparation

Alloy 1, described in Table II, was used as the anode. It was prepared by adding the component metals to a crucible and melting until combined. A 2000 g batch of components was prepared, mixed, and divided into four 500 g samples. Each sample was placed in a fireclay crucible surrounded by the heating elements of an Ambrell EasyHeat 8310 LI heater. Another fireclay crucible was placed, inverted, atop the one containing the sample. The top crucible had a port for the argon lance which delivered argon gas at a flow rate of about 4 L/min for the duration of the process. It also contained a viewport so that temperature could be measured by pyrometer. The alloy was heated to about 1400° C. for about 5 minutes. Once melted and cooled, the 500 g samples were cut into approximately cubic chunks, about 1 cm on a side, with an abrasive saw.

Apparatus Description and Preparation

Figure 29:
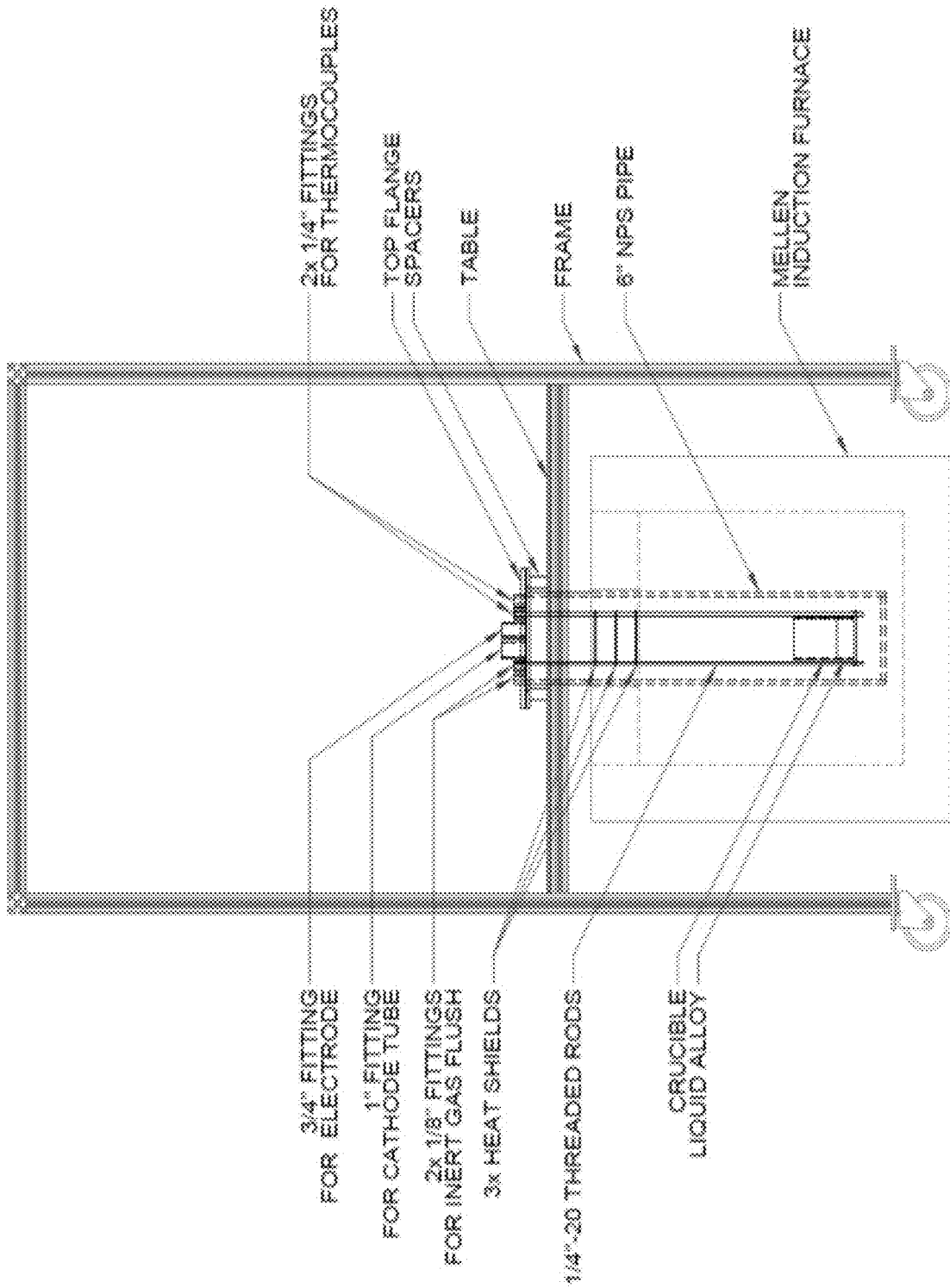
FIG. 29 is a schematic drawing of a high-temperature electrochemistry apparatus.

The apparatus was a Mellen induction furnace with a customized testing insert comprised principally of a platform suspended by threaded rods from a flange. The flange is removable and rests upon a steel pipe set vertically into the furnace. Through the flange are the necessary couplings for thermocouples, inert gas feed, electrolyte tube, and fuel/current collector rod. The apparatus is shown in FIG. 29.

Ceramabond 503 ceramic cement from Aremco was used to affix the cathode-electrolyte structure to the end of a 1" diameter open-ended mullite tube. The mullite tube is necessary to provide mechanical support to the cathode-electrolyte structure as it hangs from the flange in the furnace. This assembled structure was inserted through the flange and suspended about 1cm above the bottom of an alumina crucible which rested on the bottom plate of the testing insert. Through the other hole in the flange a graphite rod was inserted and hung similarly in the crucible. The graphite rod acted as both the fuel source and the anodic electrical contact. The chunks of anode alloy were piled around the cathode-electrolyte structure in the crucible. A length of Kanthal wire was inserted into the mullite tube until it made contact with the inside of the cathode-electrolyte structure. This served as the cathodic electrical contact. The testing insert was lowered into the furnace and sealed. Argon gas was injected into the furnace through the flange at a flow rate sufficient to maintain less than 0.5% oxygen in the testing chamber. Air was injected into the mullite tube through a nozzle to provide the cathode with oxygen atoms for ionization.

Apparatus Operation and Measurement

The furnace was heated to 950° C. at a rate of 10° C./min, and then to 1000° C. at a rate of 2° C./min. The open circuit voltage (OCV) was measured by handheld multimeter at the kanthal wire extending from the cathode and at the graphite rod extending from the anode.

Fabrication Process Overview

A simple description of the fabrication process for the cathode-electrolyte structure is: the support/current collector is slip casted, dried, the cathode is dip-coated, dried, the electrolyte is dip-coated, dried, and fired. While each step was developed with the preceding and following steps in mind, minor steps were added and removed as necessary for development. Notably, the firing and drying steps were moved and modified as development progressed.

Active Material Choice

LCM is used for the current collector to maximize electrical conductivity and minimize thermal expansion mismatch between the layers of the structure. A blend of LCM and YSZ is used in the cathode to create a shallow thermal expansion coefficient gradient between the current collector and electrolyte, again minimizing thermal expansion mismatch. YSZ is used in the electrolyte because it is widely used in solid-oxide fuel cell (SOFC) technology for its high oxygen ion conductivity. In addition to matching thermal expansion coefficients to prevent delamination during cell heat-up and operation, these materials have similar sintering shrinkages, allowing them to be co-fired. Further, minimal chemical interaction between layers is observed for LCM and YSZ in this configuration.

LCM powder with 5% A-site deficiency, 20% Ca dopant, and surface area of 5-8 m2/g was purchased from Nexceris as a custom order. A-site deficient LCM is selected because such deficiency lowers the sintering temperature, increasing co-firing compatibility with YSZ. YSZ powder containing 8 mol % yttria and having a surface area of 1-3 m2/g (part number 312008) was also obtained from Nexceris. YSZ with 8 mol % yttria is selected because it is fully doped, maximizing the oxygen ion vacancies and therefore the ion transport in the electrolyte.

Water was chosen as the solvent for all three slurries, because environmentally friendly solvent is always the better option. The LCM was first characterized by pH sweep and the results are given in FIG. 30. LCM in water does not reach a ZP of ±40 mV at any reasonable pH. This indicates that a surfactant was required to ensure stable dispersion of the LCM in water. Since LCM in water does not have a strong positive nor negative charge, either a cationic or anionic surfactant may be employed. The anionic dispersant Dolapix CE-64 from Zschimmer & Schwarz was selected.

Figure 30:
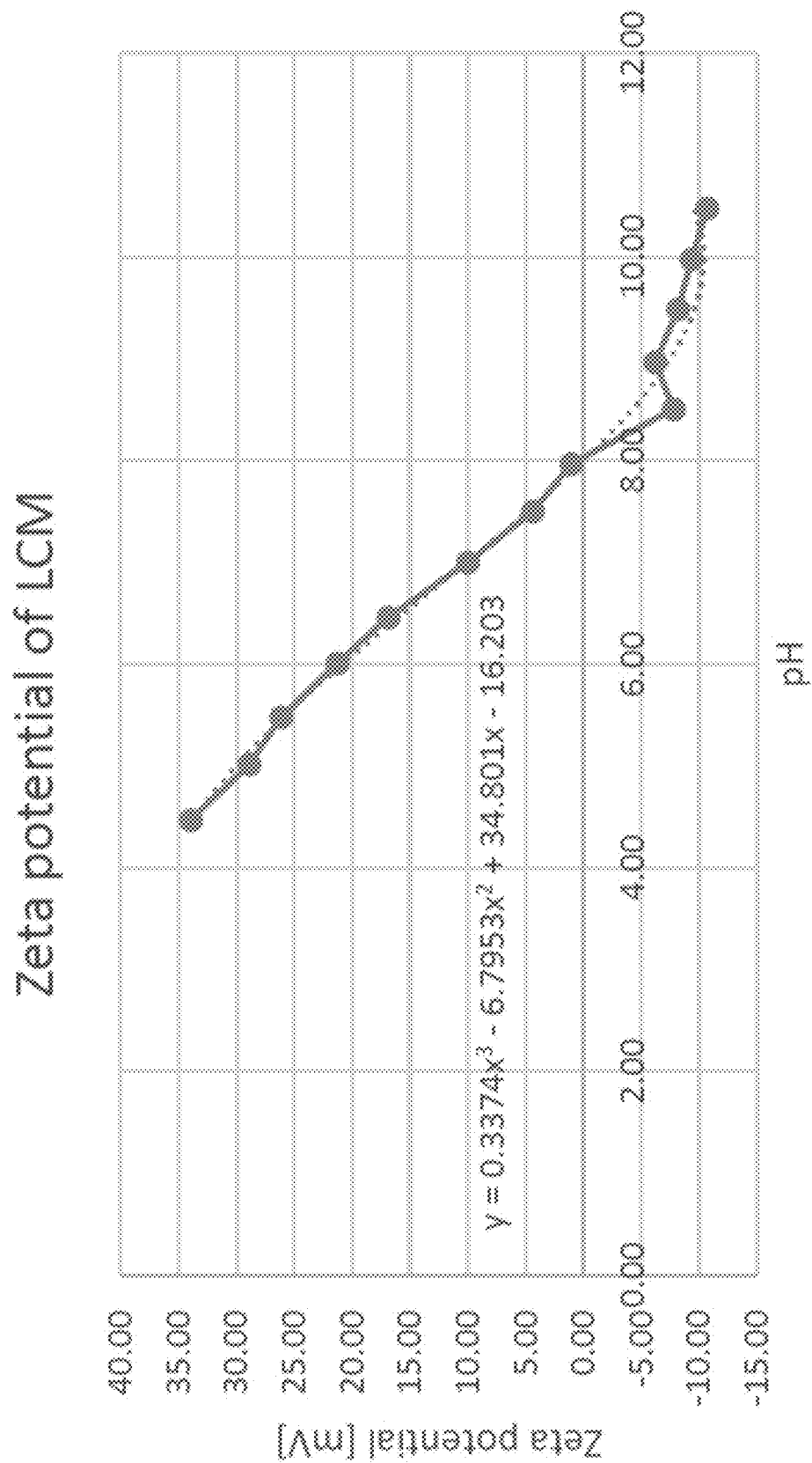
FIG. 30 is a graph showing Zeta potential of LCM over a range of pH.
Figure 31:
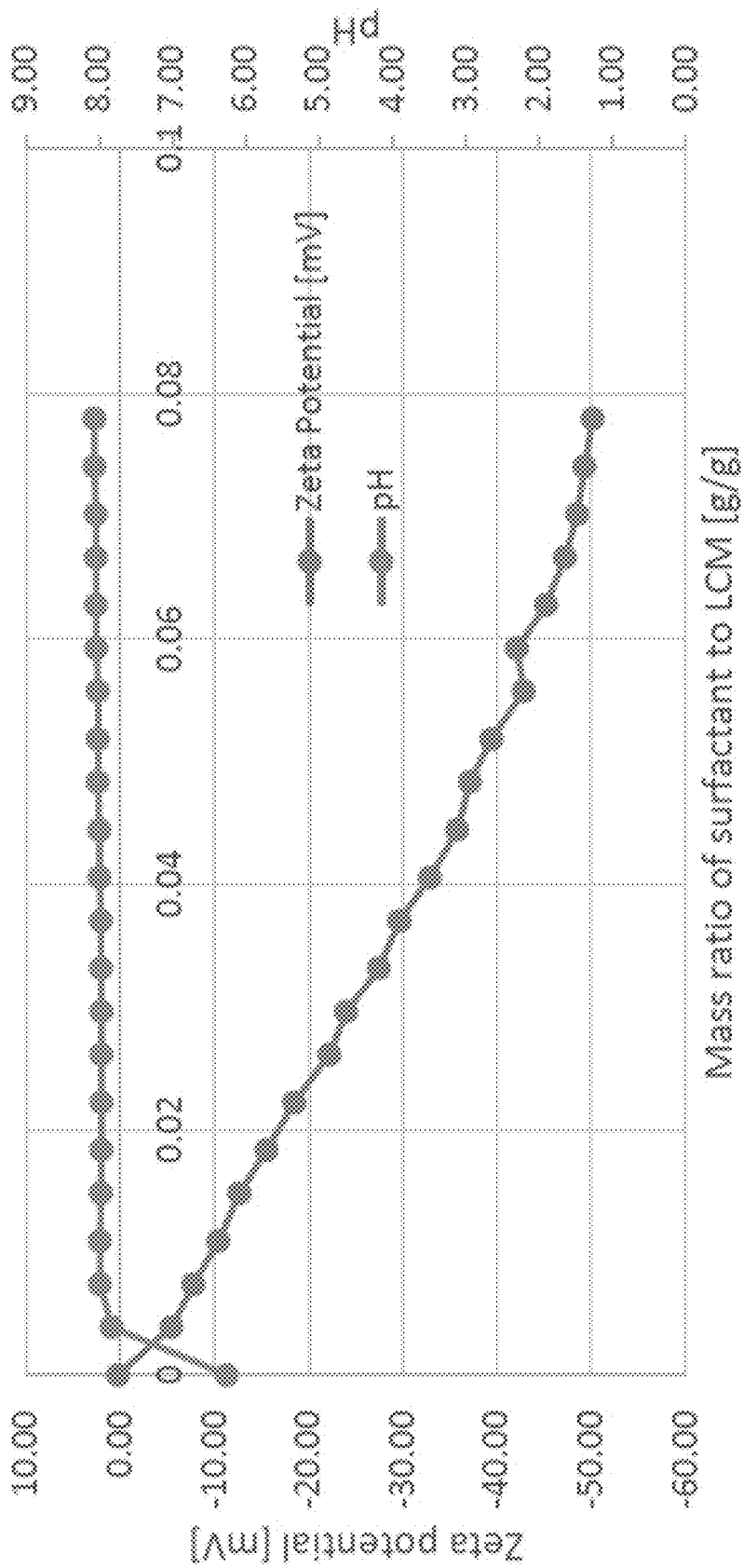
FIG. 31 is a graph showing the Zeta potential of LCM in DI water as concentration of Dolapix CE-64 is increased.
Figure 32:
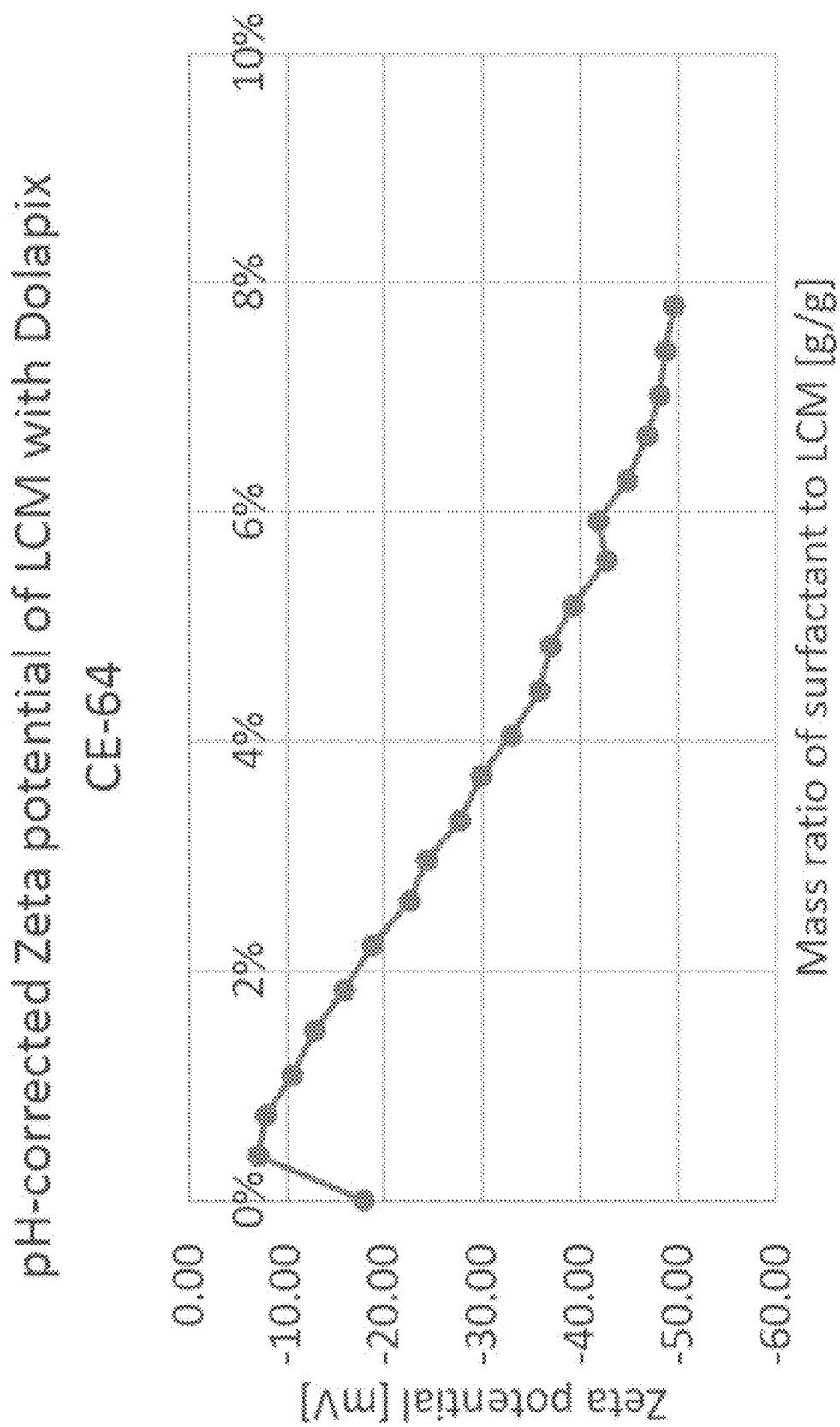
FIG. 32 is a graph showing the pH-corrected ZP of LCM with Dolapix CE-64 dispersant. A ZP of ±40 mV is considered to give good dispersion stability.
Figure 33:
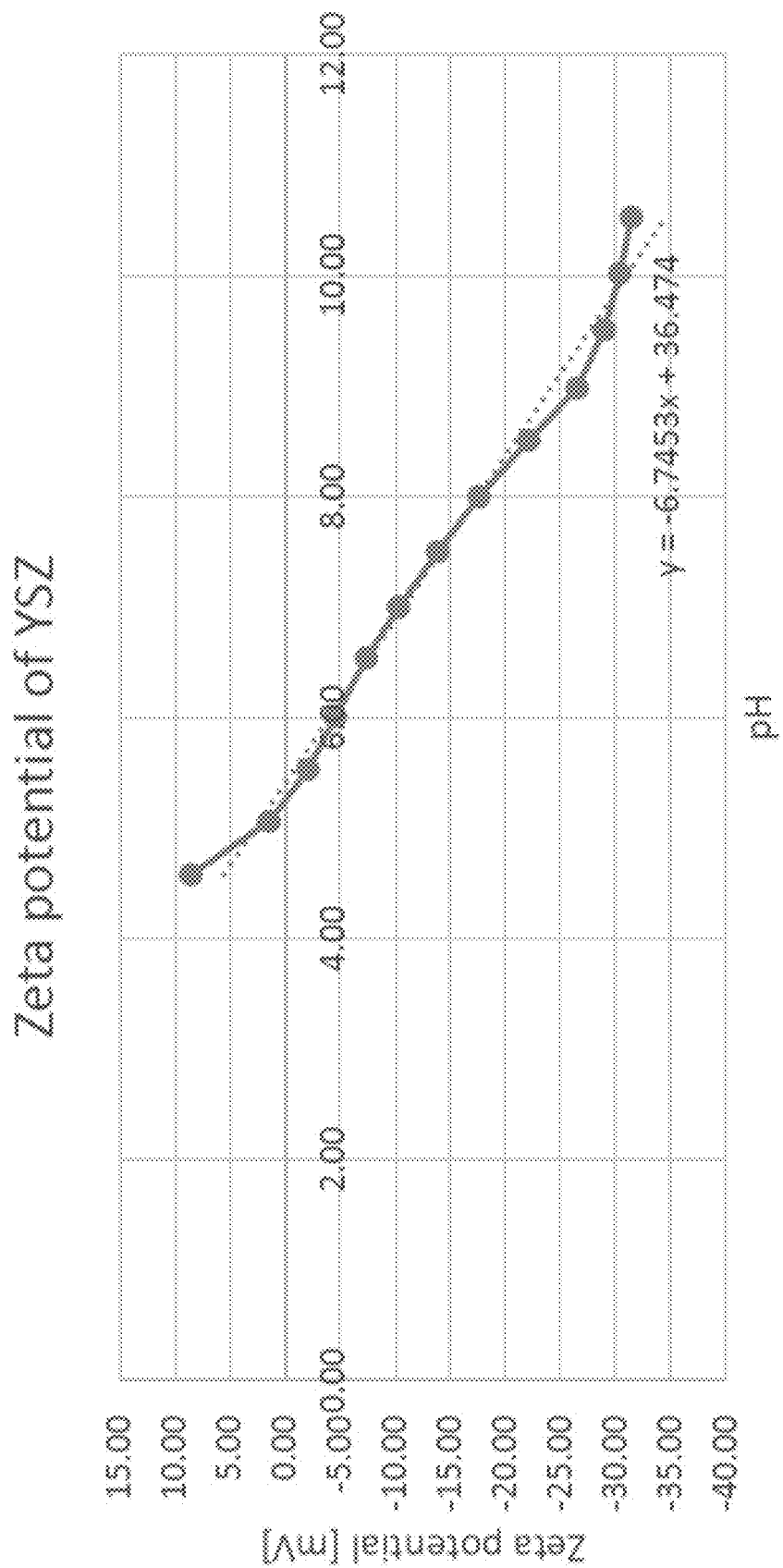
FIG. 33 is a graph showing the Zeta potential of YSZ in DI water as a function of pH.
Figure 34:
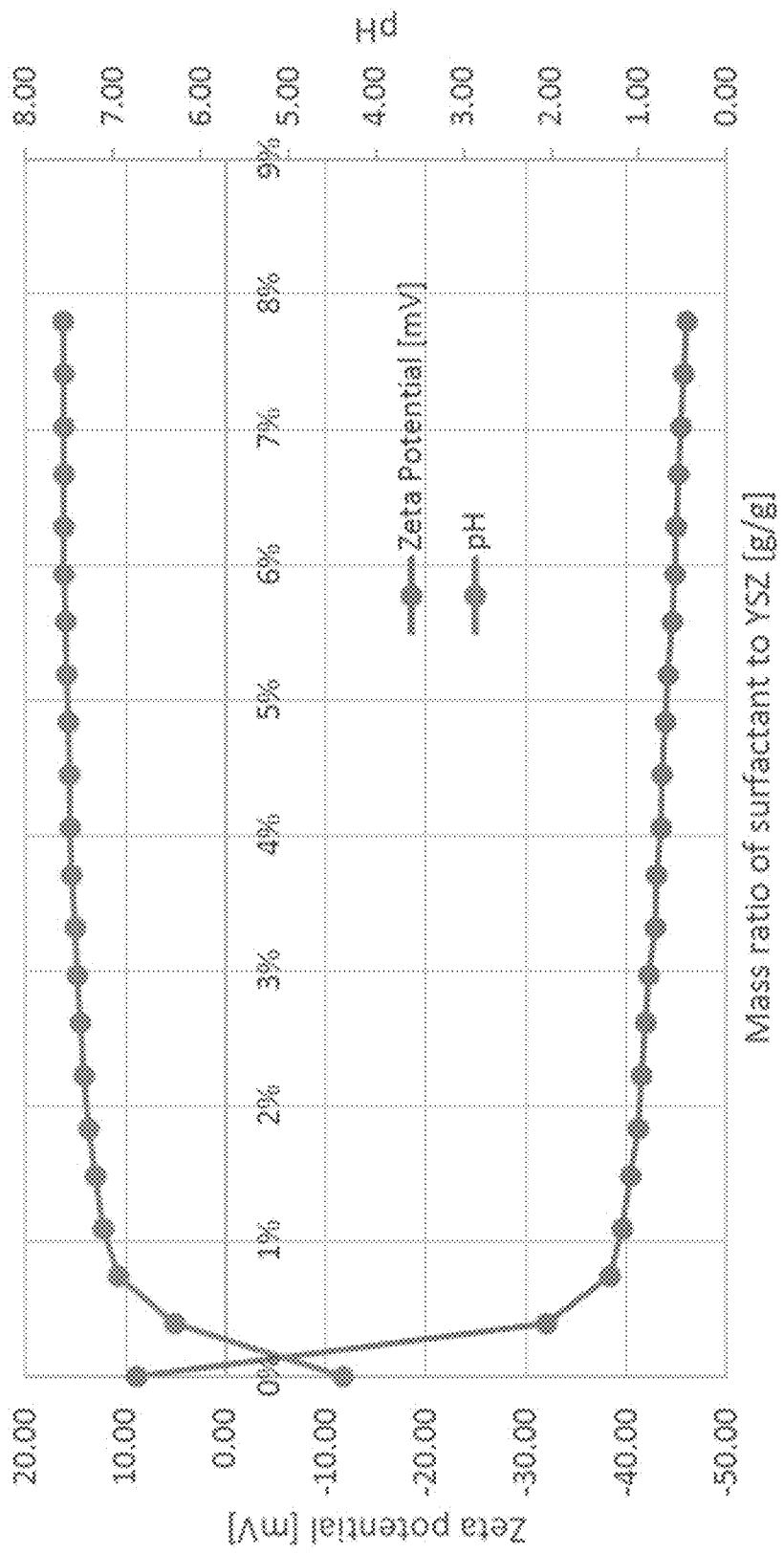
FIG. 34 is a graph showing the Zeta potential and pH of YSZ in DI water as Dolapix CE-64 concentration is increased.

Next, a new sample was characterized by surfactant concentration sweep. The data is plotted as a function of mass ratio of active surfactant material to LCM so that it may be used to guide formulation. These results are shown in FIG. 31, which confirms that Dolapix CE-64 is a strong anionic dispersant in this system. However, though it has a strong influence on ZP, pH was measured but not controlled. To account for this, the ZP vs pH data in FIG. 30 is used to adjust the data in FIG. 31 for pH. First, a polynomial line of best fit is fit to the ZP vs pH data. This model is used to calculate, for each point of the ZP vs surfactant mass ratio data, what the ZP would be at the relevant pH without any surfactant. Finally, the pH-corrected ZP of the LCM at various surfactant mass ratios is calculated as $\zeta_{corrected} = \zeta - \zeta_{equivalent\ pH}$ The corrected ZP is shown in FIG. 32. From these data, it is evident that a surfactant-to-powder mass ratio of 6% provides good electrostatic stabilization and prevent agglomeration, so this was taken as the target for formulation. The same process was followed for calculating the optimal dosage of surfactant in the YSZ electrolyte slurry. The zeta potential of YSZ as a function of pH, as a function of surfactant concentration, and as a pH corrected value are shown in FIG. 33, FIG. 34, and FIG. 35, respectively.

Figure 35:
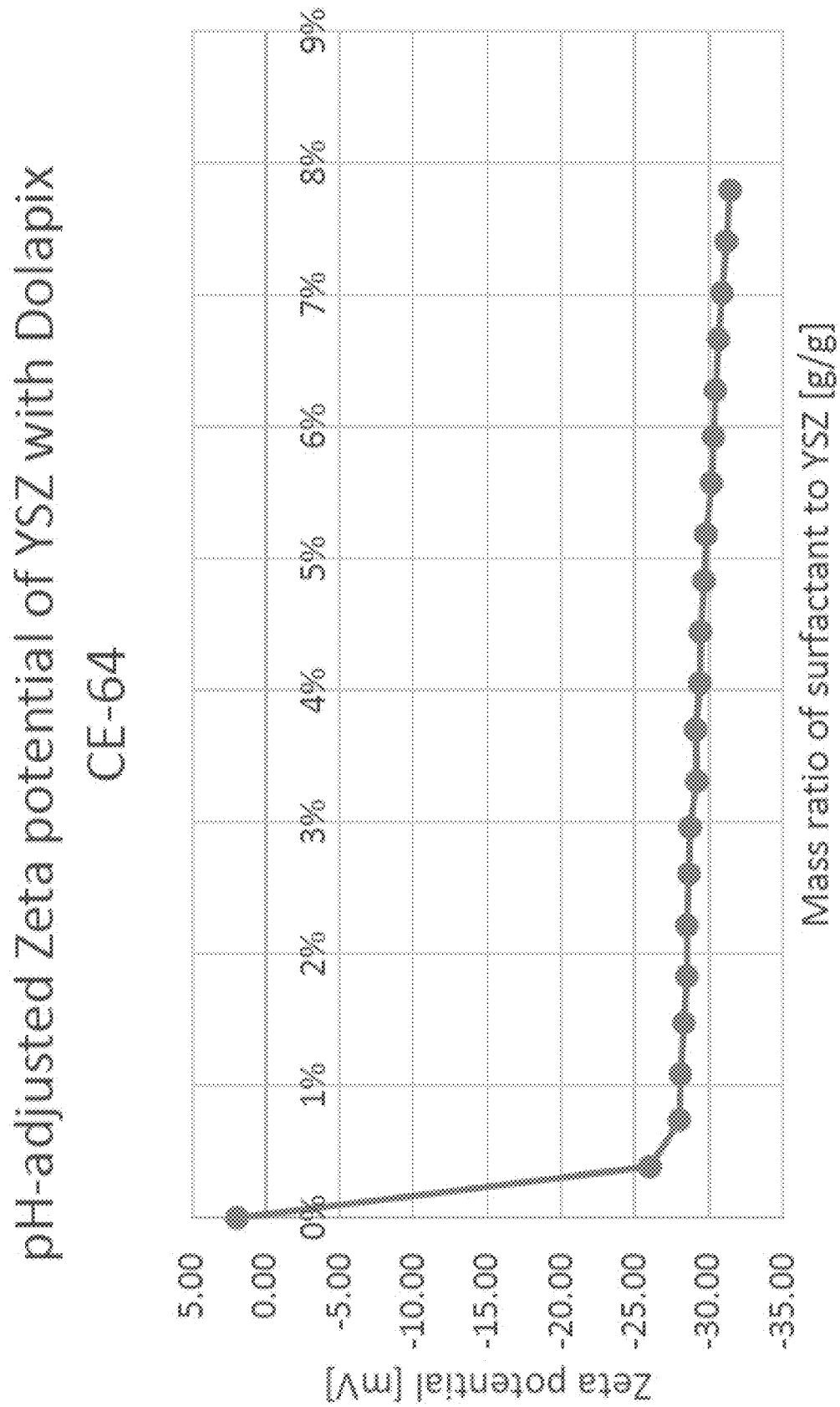
FIG. 35 is a graph showing the pH-corrected ZP of YSZ with Dolapix CE-64 dispersant. A ZP of ±40 mV gives good dispersion stability.

The curve in FIG. 35 shows that a ZP of −40 mV is not achievable with a reasonable amount of Dolapix CE-64 in this system. In addition, there is no significant benefit to increasing the surfactant-to-powder ratio beyond 1%, so this is taken as the target for formulation.

TABLE IV

General formulation of the LCM support.

| Material | Purpose | Amount |
| --- | --- | --- |
| LaCaMnO3 (LCM) | Active material | 20-40 wt % on total wet weight |
| Dolapix CE-64 | Dispersant | 6 wt % on weight of LCM |
| 20 μm cellulose | Pore former | 50 vol % on dry volume |
| PVA | Binder | 0-2 wt % on total wet weight |
| DI Water | Solvent | 50-70 wt % on total wet weight |

20 μm cellulose was chosen as the pore former to maximize gas flow through the support for good cell performance. The cellulose was obtained from Sigma Aldrich (part number 310697). PVA was used as the binder as it is commonly used in slip casting to give good green strength at low concentrations.

Too little binder gives poor green part strength, but too much binder increases viscosity to the point of processability issues. Therefore, the level must be carefully controlled. Samples with 0, 0.25, and 0.5 wt % binder on weight of active powder were formulated and cast. Samples were made with Lanthanum Strontium Manganite (LSM), instead of LCM, due to temporary unavailability of LCM. The LSM was also obtained from Nexceris (part number 121101) and has properties similar to LCM. It should also be noted that these samples did not contain pore former.

Figure 36:
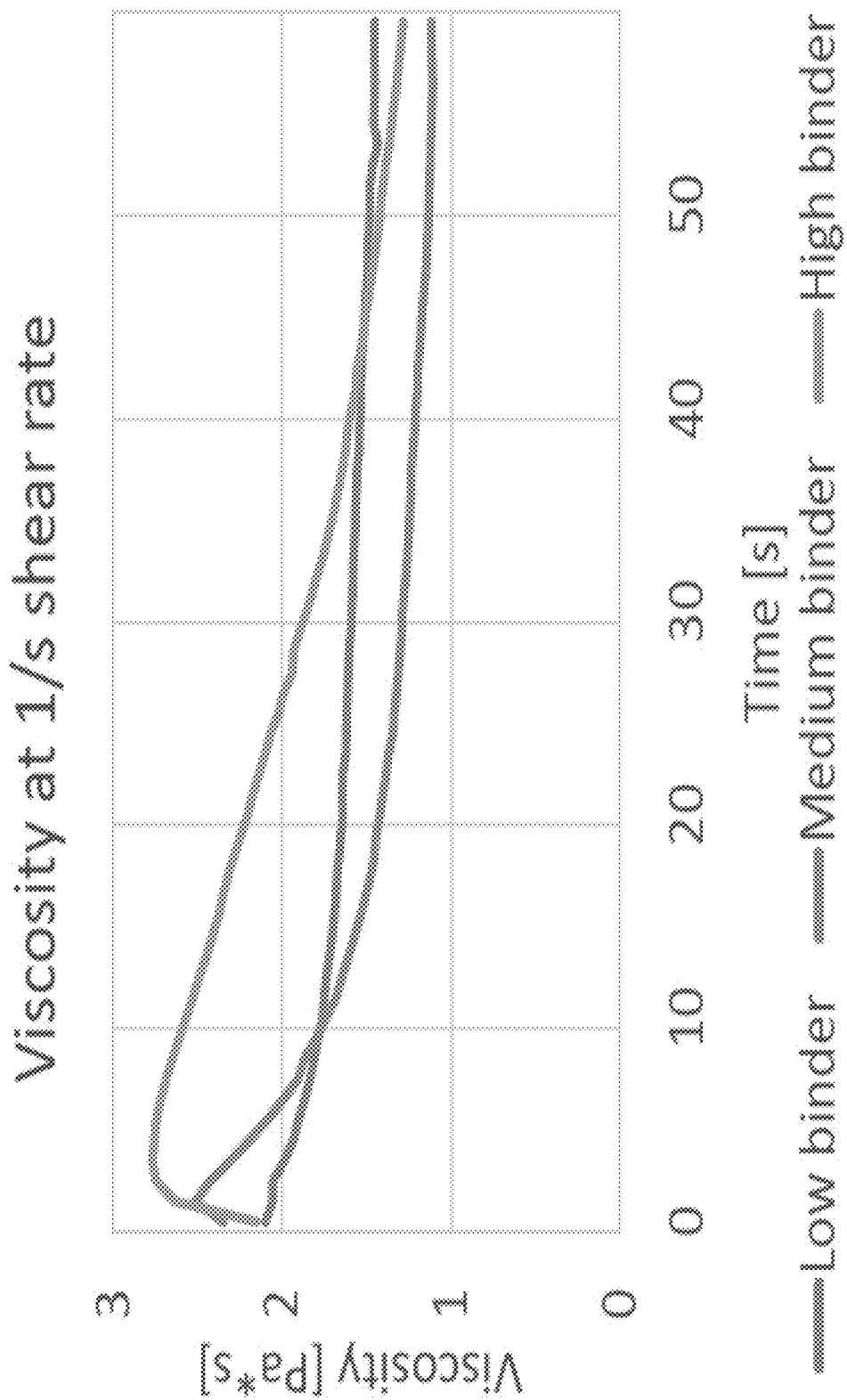
FIG. 36 is a graph showing the rheology of LSM samples with various binder amounts. The rheology was tested with 2° cone and plate geometry.

All samples released well and had adequate green strength. However, the low binder sample had noticeably thinner walls at the top than the bottom. This is an indication that the viscosity of the slurry was too low and that the cast slumped during drying. For each sample, the thickness of the walls was measured at the top and the bottom of the part and the difference divided by the height of the part was reported as taper. Low taper is desirable because uniform wall thickness is expected to lead to uniform cell performance. The rheology of each sample was measured, and the results are shown in FIG. 36.

Interestingly, the low binder sample displays higher viscosity than the medium binder sample over much of the time of the test. However, from the taper measurements, the low binder sample slumps more than the medium binder sample during drying. It is here envisioned that because samples dry quite quickly in the mold, only the rheology at very short times is relevant. The viscosity of the low binder sample is lower than that of the medium binder sample until the 10 second mark. The crossover in viscosity at 10 seconds is likely due to a thixotropic effect.

Therefore, for samples with no pore former, 0.25 wt % binder on weight of active powder is enough to give adequate viscosity to avoid slumping in the mold. This same level of binder gives adequate green strength.

The next set of samples were formulated to 77 dry volume % cellulose because it was expected that they would densify to the 50% target during firing. These samples were similarly sent through 1, 2, and 3 firing cycles. As expected, the samples densified to about two-thirds of the formulated porosity, reaching the target of 50%. The porosity did not change after multiple firing cycles. Unfortunately, the samples cracked in the mold during drying.

A target of 50% porosity was chosen. Samples formulated to 50% dry volume of cellulose were cast. They released well from the mold and had adequate green strength. These samples were sent through 1, 2, or 3 firing cycles to determine if multiple firing cycles would significantly alter the porosity. The data show that multiple firing cycles do not dramatically alter the porosity of the LCM support, but that only about two-thirds of the formulated porosity is achieved after firing.

Additionally, processing the slurry formulated to 77% porosity presented difficulty. Filtering out the mixing media was difficult due to the high viscosity. The 77% porosity sample's viscosity is approximately an order of magnitude higher. This high viscosity also led to problems during casting.

Nevertheless, in order to achieve the target porosity, 3 more samples were produced with higher binder to powder ratios. It was here envisioned that more binder in the dry cast would provide additional green strength, preventing cracking. Any additional green strength gained from the additional binder was not sufficient to prevent cracking.

With options for fabricating supports with 77% formulated porosity exhausted, a ladder study to determine the maximum formulated porosity was conducted. Samples were formulated to 50%, 58%, and 67% porosity and then cast. The sample formulated to 50 dry volume % pore former was the only one which did not crack in the mold.

The broken pieces of each sample were fired and their density was determined by the Archimedes method. The trend of achieving about two thirds of the formulated porosity after firing continued. As a result, 50% formulated porosity was accepted as the maximum for this work.

The initial formulation for the cathode slurry is given in Table VI. The final formulation of the LCM support is given in Table V. This formulation was used for the remaining examples.

TABLE V

The final formulation for the LCM support.

| | Wt % |
| --- | --- |
| LCM | 40.06% |
| Dolapix CE-64 | 4.01% |
| Cellulose | 3.69% |
| PVA | 0.80% |
| DI Water | 51.44% |

TABLE VI

The initial formulation for the cathode slurry.

| | Wt % |
|---|---|
| LCM | 17.51% |
| YSZ | 17.51% |
| Dolapix CE-64 | 2.89% |
| Carbon black | 14.49% |
| PVA | 0.93% |
| Water | 46.68% |

The weight ratio of LCM and YSZ is kept to 50-50 so that the thermal expansion and sintering shrinkage of the LCM support and the YSZ electrolyte remain compatible. The Dolapix dispersant was used at a concentration of 4 wt % on weight of active powder to account for the fact that the LCM requires 6% and the YSZ requires only 1%. The initial amount of PVA binder was 2 wt % on weight of water, which was the maximum recommended. The maximum was selected to give a high viscosity which will prevent settling in the slurry. The amount of carbon black was selected to give 40% porosity, as this level of porosity has been shown to give good performance in tubular SOFC cathodes.

Two grades of carbon black from Cabot, Regal 250R and ELFTEX 320, were tested in the cathode slurry. Both grades have an average primary particle size of 5 μm. The Regal 250R is powdered while the ELFTEX 320 is pelletized. The ELFTEX 320-containing slurry processed well. The slurry using Regal 250R was too viscous and did not mix well overnight in a ball mill. It was diluted and remixed per the formulation in Table VII.

TABLE VII

Formulation for the cathode slurry using Regal 250R carbon black.

| | Wt % |
|---|---|
| LCM | 13.68% |
| YSZ | 13.68% |
| Dolapix CE-64 | 2.26% |
| Carbon black | 11.32% |
| PVA | 0.73% |
| Water | 58.35% |

Small samples of both the remixed Regal 250R slurry and the ELFTEX 320 slurry were slip cast and fired, and their porosity was determined with the Archimedes method.

The fired porosity of the cathode samples was observed to be high compared to that of the LCM support. One possible explanation for this is that the YSZ is not fully sintering in the samples without nanoalumina sintering aid, even though YSZ densification is possible at 1300° C. To confirm this, a sample with 1 wt % nanoalumina on weight of YSZ was formulated and fired. Further densification was observed in this sample, though still the final porosity was higher than expected with the LCM. This is evidence that the firing program used is well-designed: with the help of a sintering aid, it can barely densify the YSZ components without removing desirable porosity from the LCM components. Lack of densification of the cathode is desirable because the performance of the cell does not depend upon the density of the YSZ in the cathode, as it does the YSZ in the electrolyte.

The final cathode formulation was tweaked to use less PVA binder to reduce viscosity, and to use Regal 250R as powdered carbon blacks are more common and available. The formulation is described in Table VIII.

TABLE VIII

Final cathode slurry formulation.

| | Wt % |
|---|---|
| LCM | 13.68% |
| YSZ | 13.68% |
| Dolapix CE-64 | 2.26% |
| Carbon black | 11.32% |
| PVA | 0.73% |
| Water | 58.35% |

TABLE IX

General formulation of the YSZ electrolyte slurry.

| | Wt % |
|---|---|
| YSZ | 30-60% |
| Dolapix CE-64 | 0.33% |
| PVA | 1.17% |
| Nanoalumina | 0.35% |
| Water | 68-38% |

The general form of the YSZ slurry is given in Table IX. The PVA binder amount was held at 2 wt % on weight of water to impart some viscosity. The nanoalumina was held at about 1 wt % on weight of YSZ. The purpose of the nanoalumina is to decrease the temperature at which the YSZ sinters. The nanoalumina powder was obtained from Sigma-Aldrich (part number 544833).

It is important to use a sintering aid in the YSZ formulation to fully densify the electrolyte without over-sintering the LCM support or the LCM/YSZ cathode. Over-sintering of the support or the cathode would be problematic because it would reduce the oxygen flow to the cathode, limiting the cell's performance.

Since electrolyte density is critical to cell performance as well as mechanical integrity, the porosity electrolyte material was characterized by the Archimedes method. Initially, small samples were slip cast as was done with the cathode slurry. However, the electrolyte slurry stuck to the plaster mold and could not be removed for characterization.

Next, the electrolyte slurry was tape-cast at a wet thickness of 0.005 in. Excess binder was added to the formulation to ensure that it would release from the polyethylene substrate. It was expected that if the fired porosity was less than or equal to the dry volume percentage of binder, it could be assumed that a formulation with less binder would sinter to full density. Unfortunately, the film wrinkled during sintering to the degree that Archimedes density measurement was impossible. The formulation used here is given in Table X.

TABLE X

Formulation used for tape-casting the electrolyte slurry.

| | Wt % |
|---|---|
| YSZ | 28.75% |
| Dolapix CE-64 | 1.44% |
| PVA | 8.21% |
| Water | 61.60% |

Figure 37:
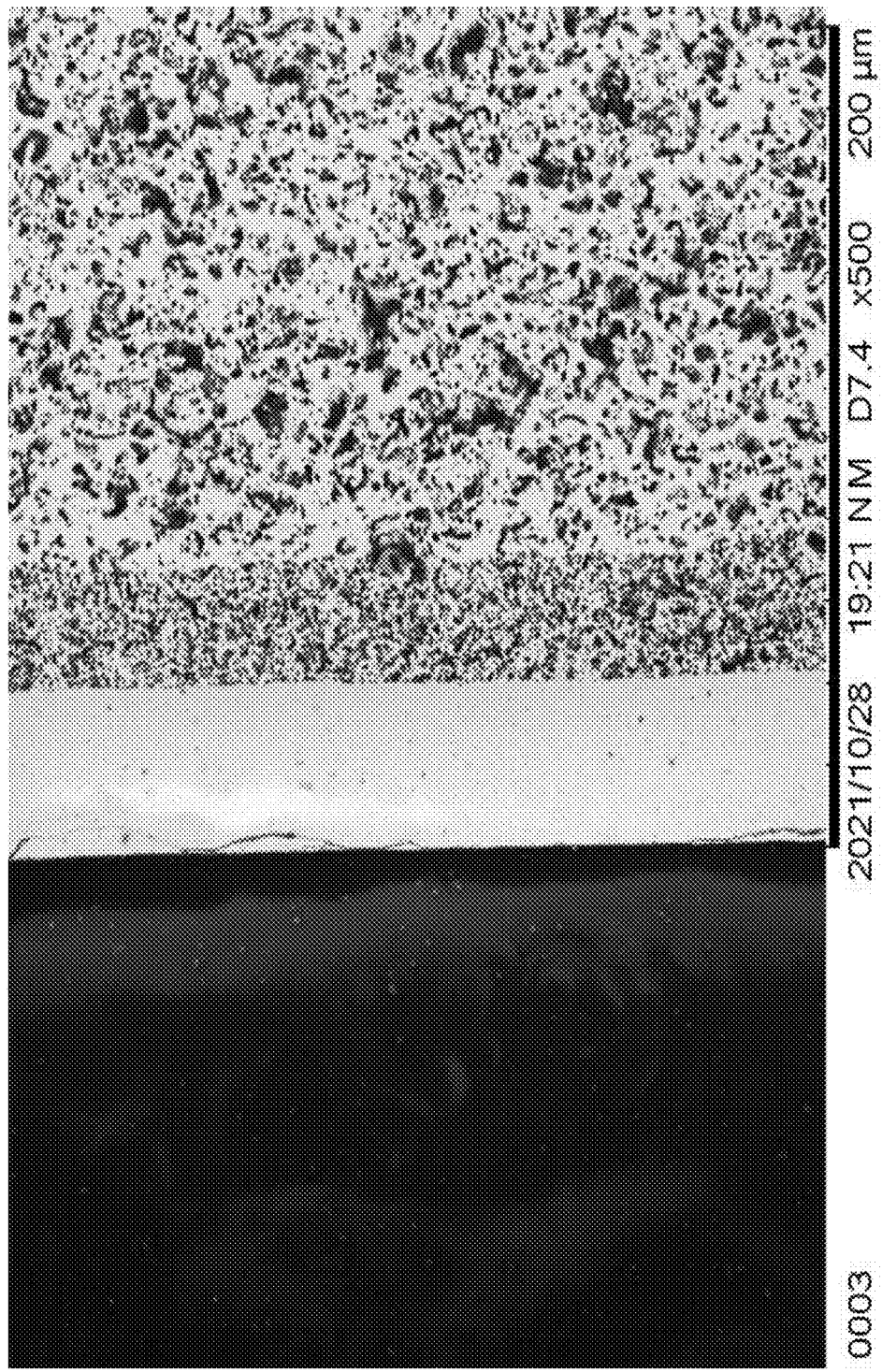
FIG. 37 is a SEM micrograph showing the thickness of the electrolyte to be about 40 μm.
Figure 38:
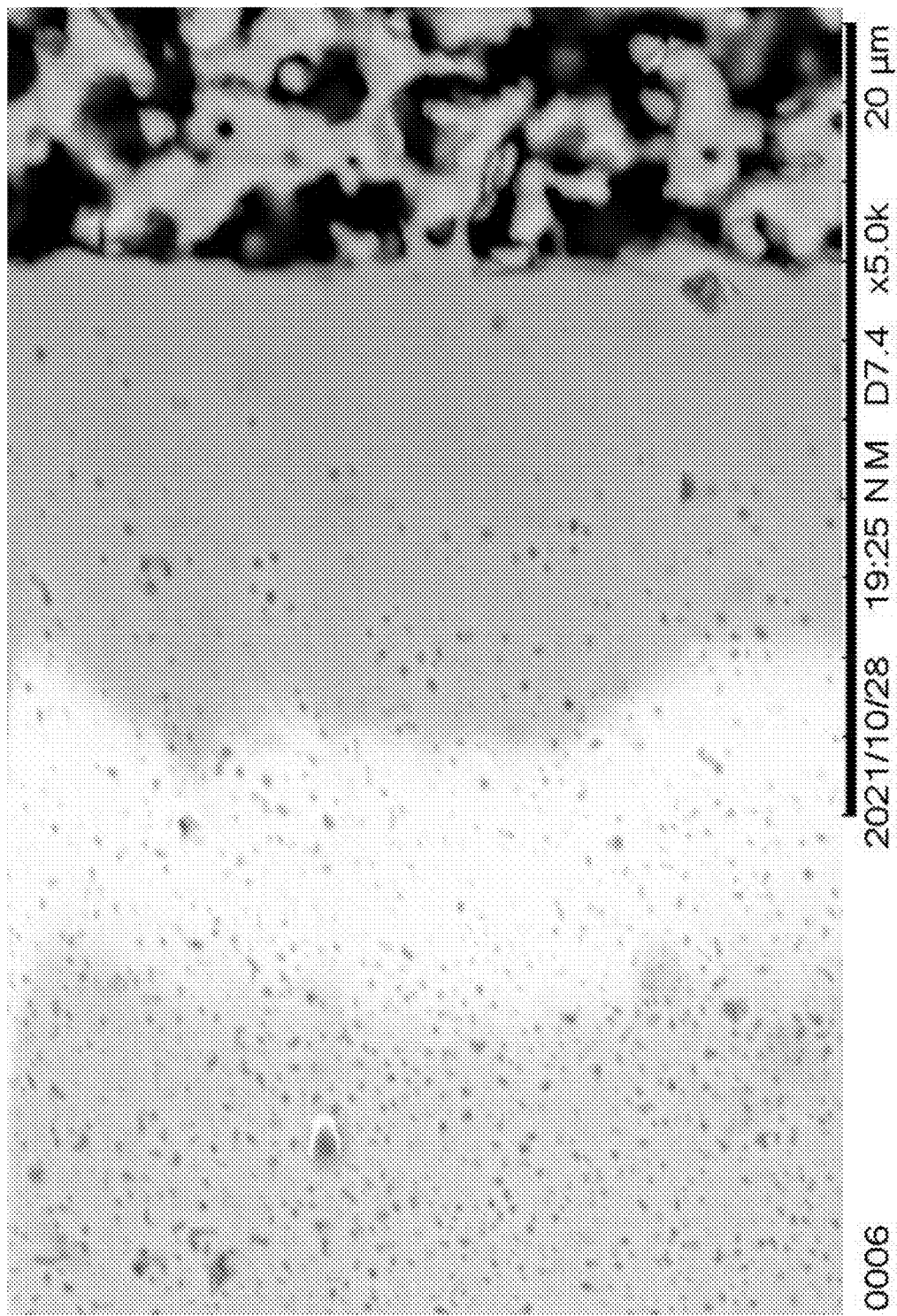
FIG. 38 is a SEM micrograph showing almost full density of the YSZ electrolyte layer.

The conclusion was that the electrolyte layer must be characterized in situ. To that end, a YSZ slurry at 14 vol % total solids was prepared. A support was casted, dried, and the cathode and electrolyte layers were dip coated onto it and dried. This electrolyte slurry produced a very thin coating, so it was dipped and dried twice. The resulting structure was fired and then imaged in cross-section in an SEM. The images gathered are shown in FIG. 37 and FIG. 38.

The target thickness for the electrolyte layer was 20 µm. FIG. 37 shows that with two dips of this electrolyte slurry a thickness of 40 µm was achieved. FIG. 38 shows the two distinct layers of YSZ and a band between them where the first coating, which had dried, mixed with the second coating when it was applied. It also shows that the electrolyte is almost fully dense after being sintered with firing program #2.

Figure 39:
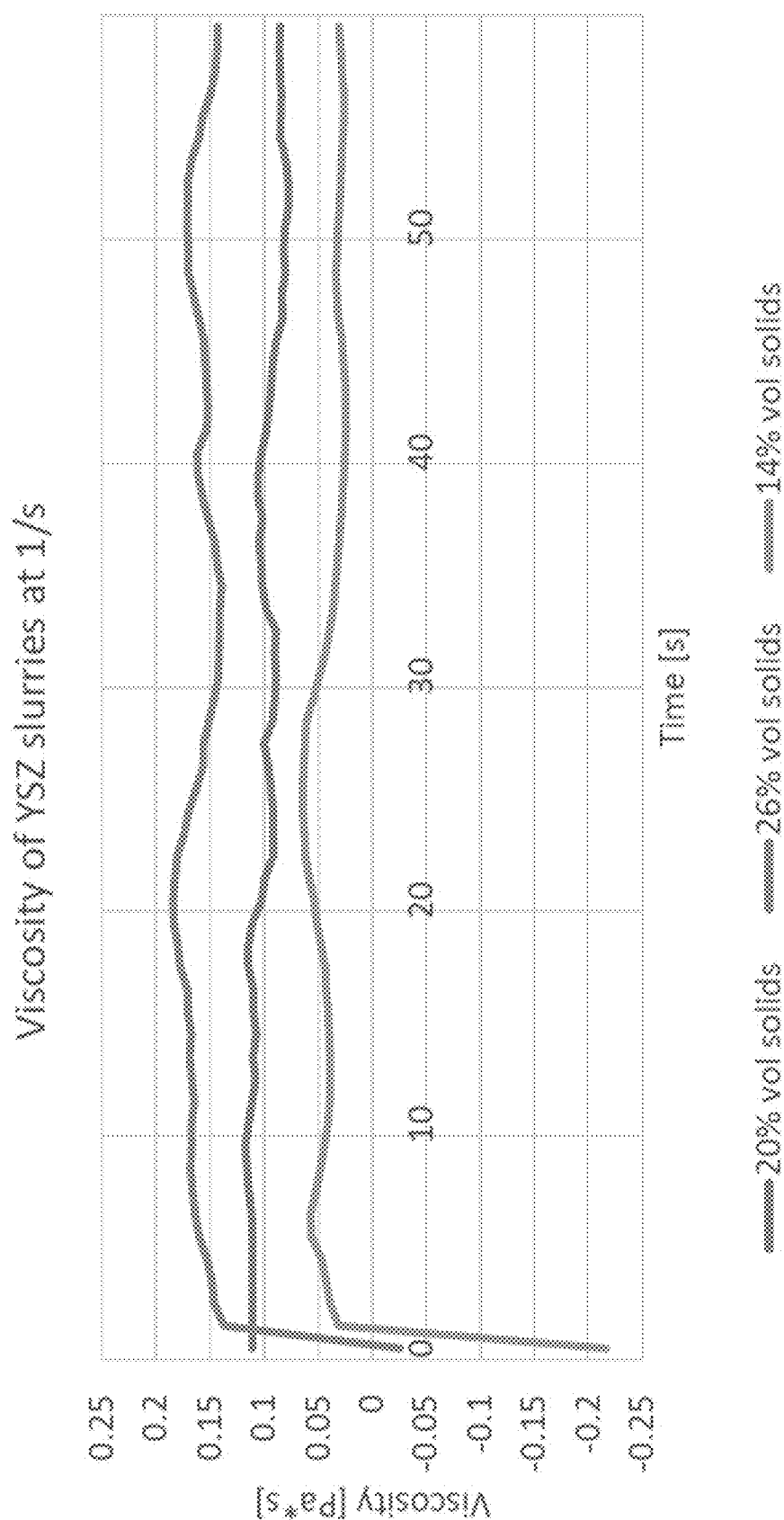
FIG. 39 is a graph showing rheology of YSZ slurries at various solids loadings. As expected, higher solids loading corresponds to higher viscosity.

One option is to use only one dip of this slurry to achieve a 20 µm thickness. However, the slurry settled quickly due to its low viscosity. The solids loading of the slurry was increased to produce a more stable slurry without dramatically increasing the thickness of the electrolyte. YSZ slurries with total solids loadings of 20 and 26 vol % were formulated. The rheologies of the YSZ slurries at 14, 20, and 26 vol % solids are shown in FIG. 39. The expected trend of viscosity increasing with solids loading is seen. Interestingly, no thixotropy is seen. Since viscosity increases with solids loading, wet film thickness will increase as well. Therefore, the increase in thickness of the dry electrolyte film is of the order 2, because a thicker wet layer is deposited, and the film loses less material upon drying.

Figure 40:
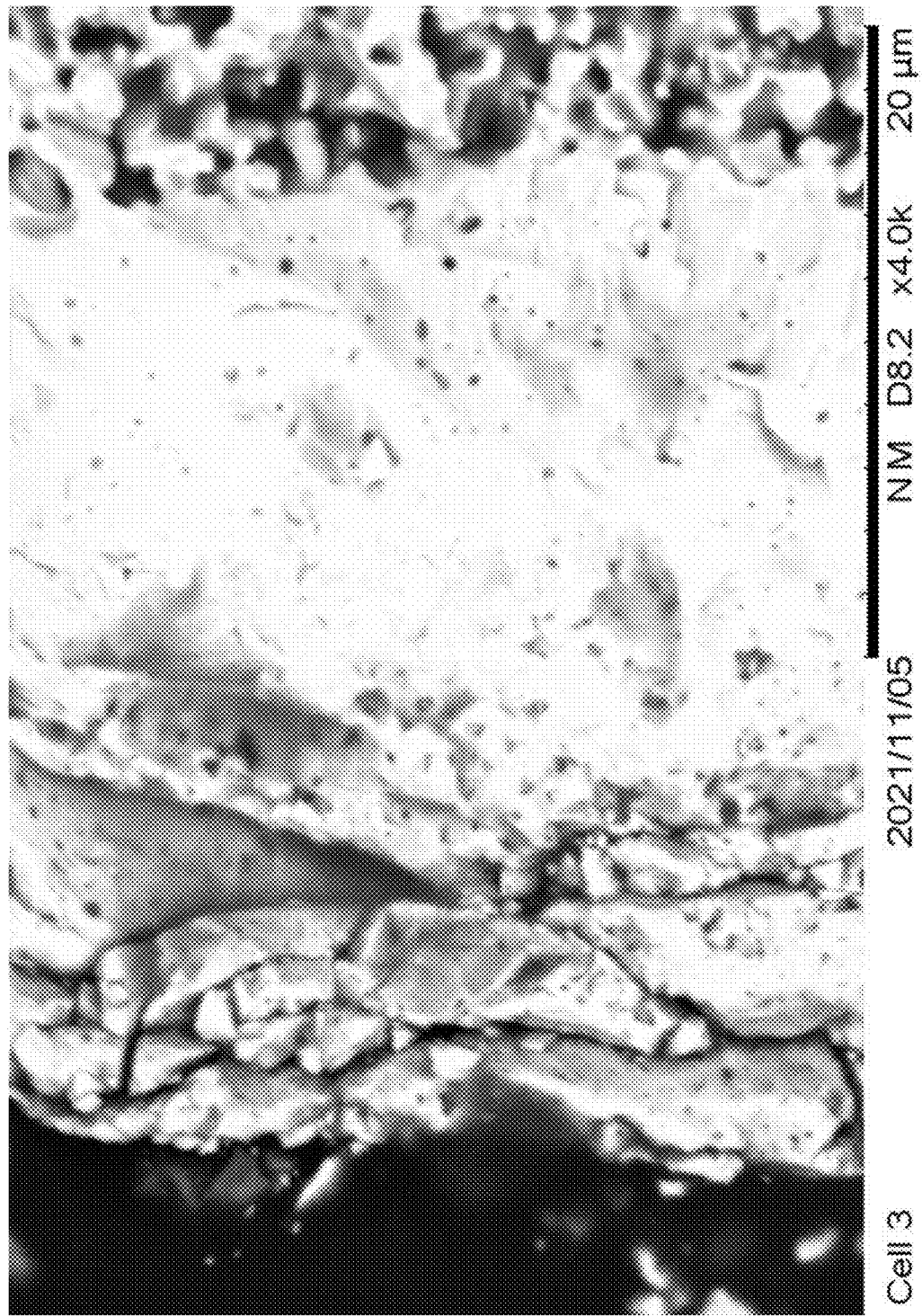
FIG. 40 is a SEM micrograph showing the thickness of the electrolyte layer to be about 30 μm.
Figure 41:
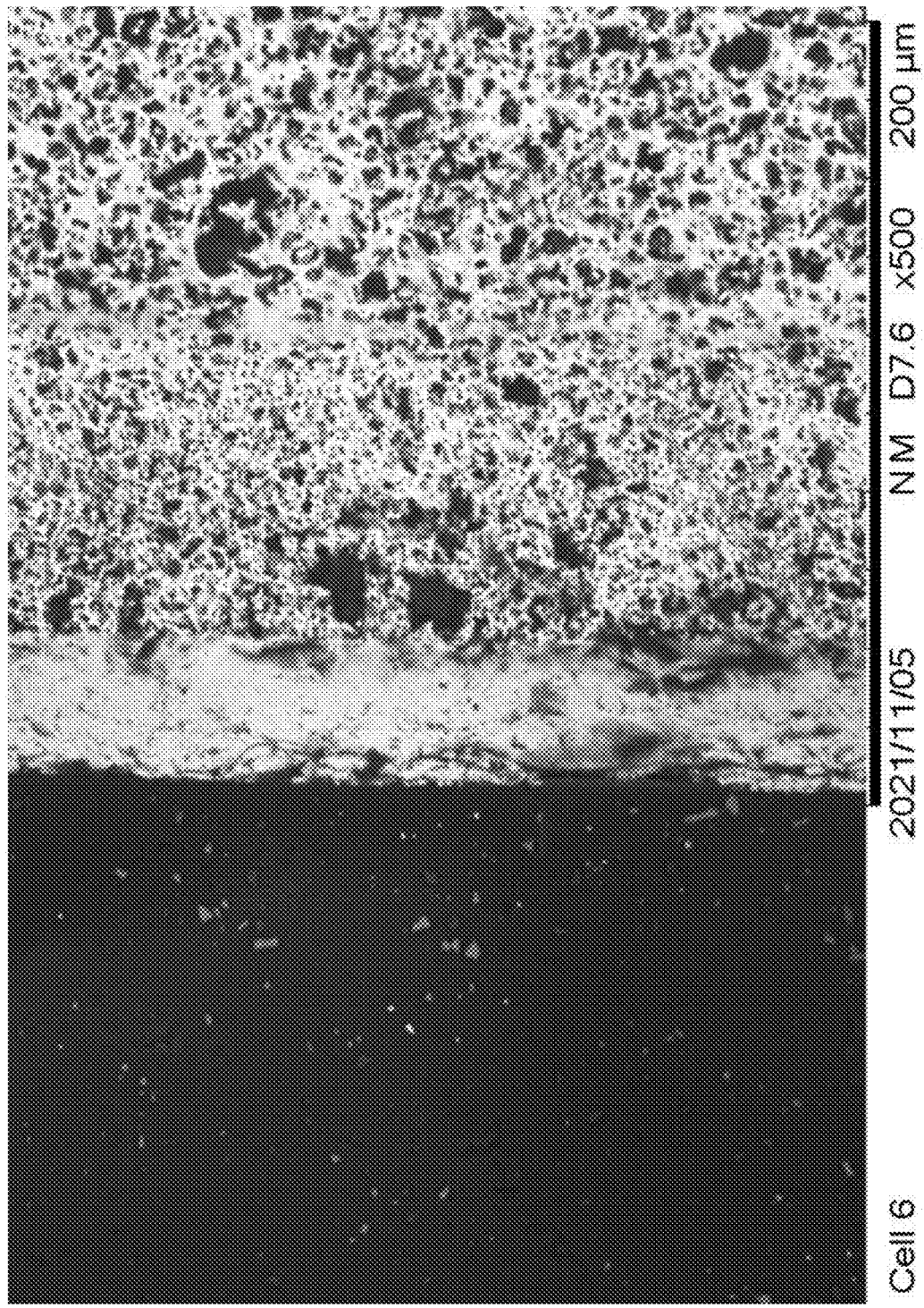
FIG. 41 is a SEM micrograph showing the thickness of the electrolyte layer to be about 40 μm.

The increase in viscosity was marginally successful at preventing settling; however, each YSZ slurry tested settled noticeably after a few days. These slurries were similarly applied (as a single dip) to support-cathode structures and imaged via SEM. FIG. 40 shows the electrolyte layer produced by one dip of a YSZ slurry of 20 vol % solids; FIG. 41 shows the electrolyte layer produced by one dip of a YSZ slurry of 26 vol % solids. Both figures show cracks in the electrolyte layer, caused during sintering, as the firing process development work was still in progress. Unfortunately, both of these thicknesses exceeded the target of 20 µm, and the slurries which produced them did not give much benefit in settling resistance. Therefore, a one dip procedure with the initial solids loading of 14 volume % was accepted as optimal for this work. The final formulation is given in Table XI.

TABLE XI

Final formulation for the YSZ electrolyte slurry.

| | Wt % |
|---|---|
| YSZ | 39.65% |
| Dolapix CE-64 | 0.33% |
| PVA | 1.17% |
| Nanoalumina | 0.35% |
| Water | 58.49% |

Dip Coating of Cathode and Electrolyte

Initially, unfired LCM support samples were hung from small alligator clips and the coating bath was raised around them. This method had two issues. First, the alligator clips put too much pressure on the unfired LCM part, causing damage. Second, the buoyancy of the support prevented the coating from reaching all the way up the wall of the part as desired.

These problems were solved by moving to a new process. In this process, the LCM support is first dried in the oven at 50-75° C. for about 30 min. Then, it is held by the flange with tweezers and dipped into the coating bath before being hung by the flange from a holder.

Figure 42:
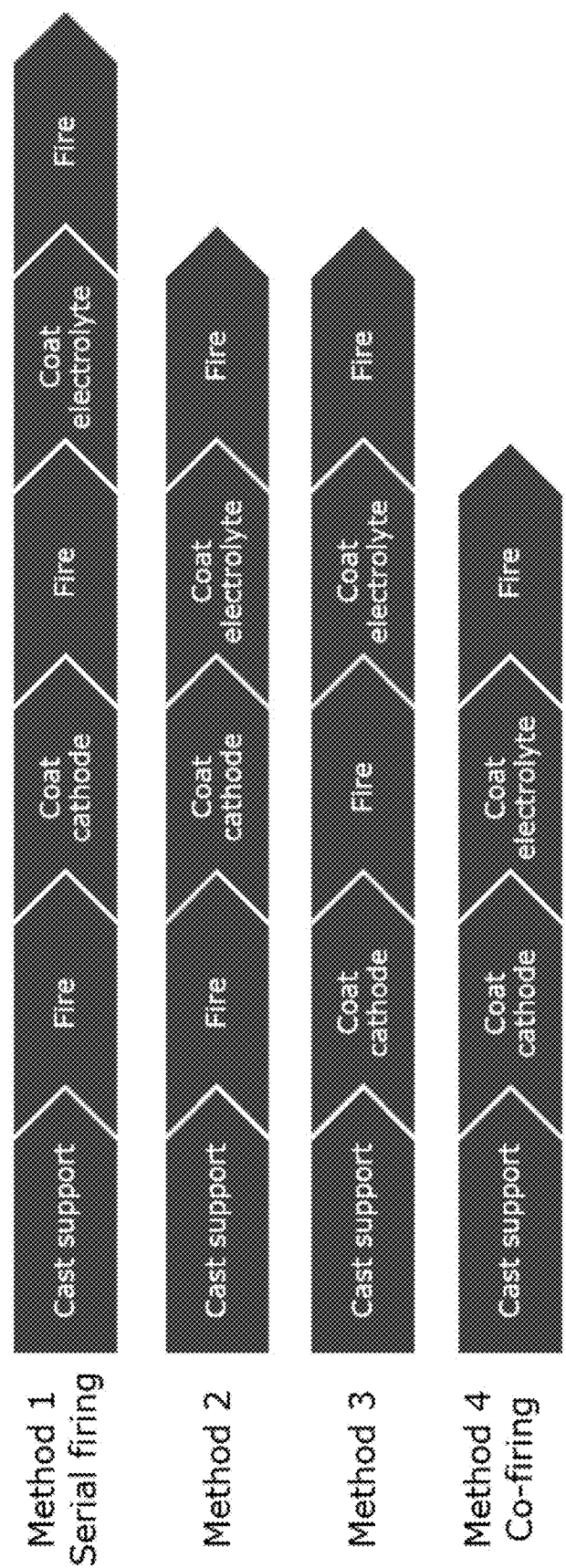
FIG. 42 is a schematic drawing of Firing method possibilities. Method 4 was selected because it produced prototypes without cracks in any layer and is the simplest to implement in manufacturing.
Figure 47B:
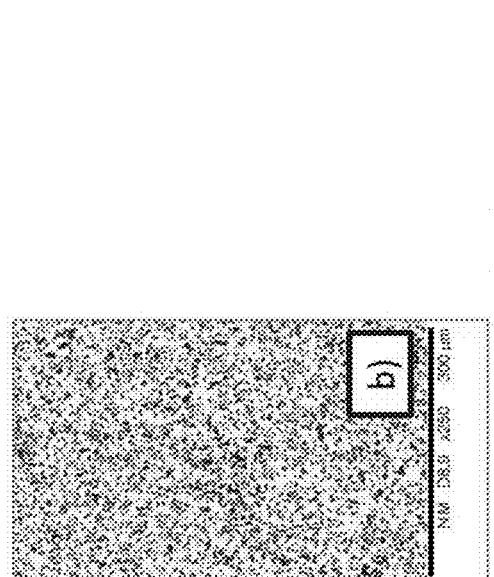
FIG. 47A-FIG. 47E are a set of SEM cross-section micrographs of a cathode-electrolyte structure which was operated at 1000° C. for about 5 hours.
Figure 47A:
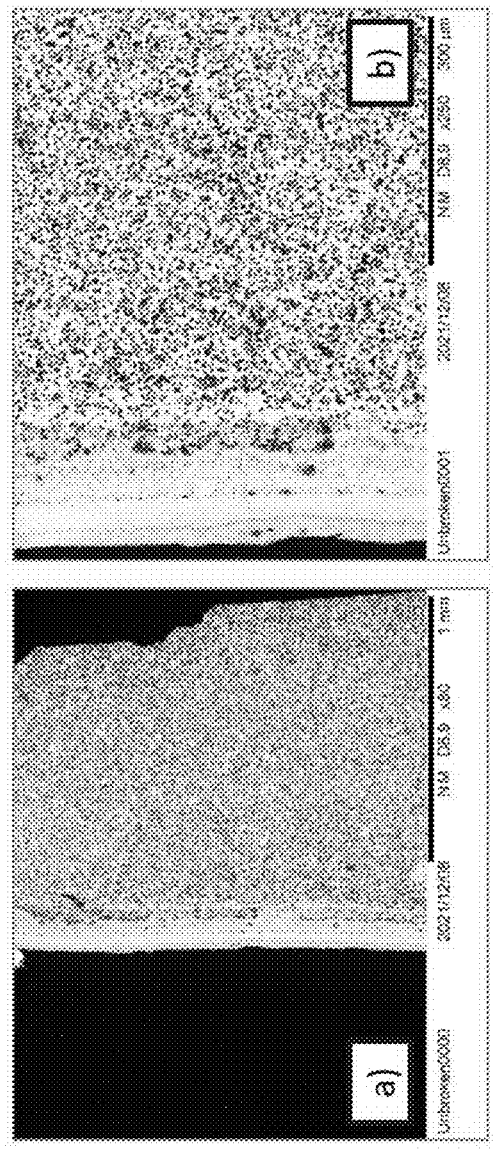
Figure 47E:
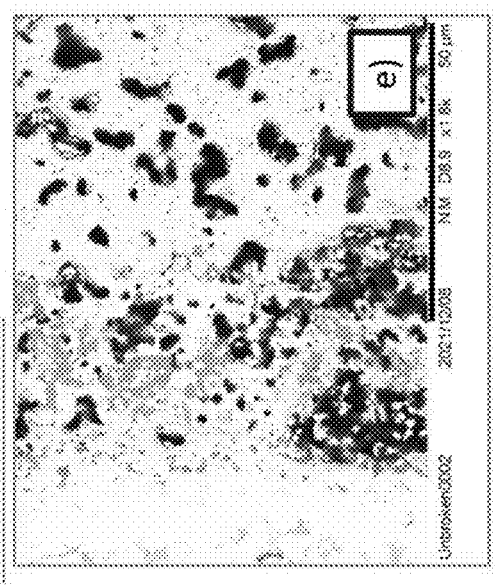
Figure 47D:
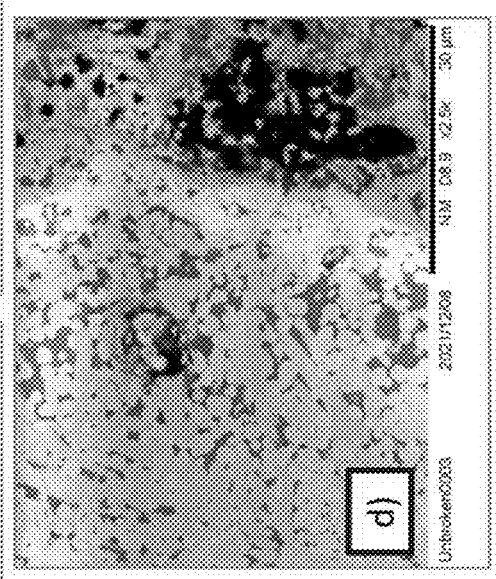
Figure 47C:
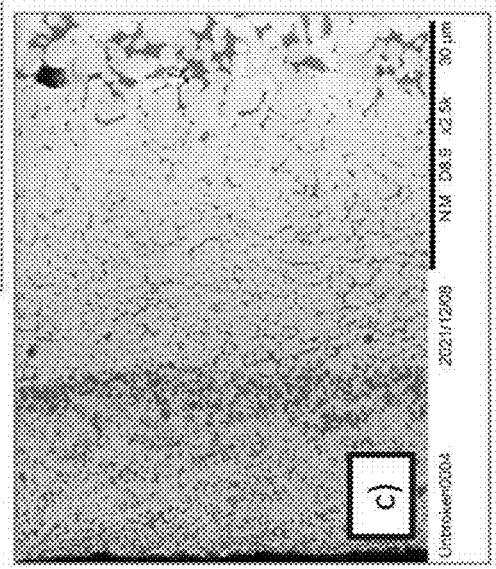

Initially it was not clear if it would be possible to co-fire the three-layer composite structure without it cracking due to differential shrinkages between layers. Neither the LCM support nor the LCM/YSZ cathode densified significantly upon successive firings, so there was full latitude in designing the firing process. On one extreme, all three layers could be co-fired; on the other, the part could be sintered three times: first as the support only, then after the cathode coating was applied, then again after the electrolyte coating was applied. The possibilities are shown in FIG. 42.

Method 1 represents complete serial firing, where the structure is fired after the formation of each layer. In this method, the support would experience 3 firing cycles. Method 4 represents complete co-firing, where all three layers are formed and then sintered in a single firing cycle. Methods 2 and 3 are intermediate methods, where some layers are serially fired and some are co-fired. Methods 1 and 3 failed when the structure was fired with the cathode layer exposed. In both cases, the cathode layer cracked and peeled off of the support. Since both methods 1 and 3 failed in the same way, this indicated that there was not a large difference in stress due to shrinking at the sintered support-green cathode interface versus at the green support-green cathode interface. However, it does indicate that the cathode layer is unstable if exposed during sintering. Method 2 produced a prototype with a cracked electrolyte. This result shows that there is likely a significant difference in shrinkage during sintering between the already-sintered support and the green electrolyte layer.

Firing method 4, which represents full co-firing, yielded the best results. The electrolyte layer does show some pinhole defects, but these are due to entrained air in the slurry, not cracking from differential shrinkage between layers during sintering.

Therefore, firing method 4, complete co-firing, was used as the firing method for producing this structure. This method gave the best quality of sintered part. In addition, this method is the least time-consuming and simplest of the possible methods which is important because manufacturability is one of the few remaining hurdles in the path towards commercializing DCFC technology.

Composite Characterization by SEM

Three full support-cathode-electrolyte structures were characterized by cross-sectional SEM. They are described in Table XII.

The goals of the SEM analysis were to confirm the approximate porosity and pore diameter for the support and cathode, to confirm that the electrolyte layer was fully dense, and to develop a relationship between solids content and dry coating thickness for the electrolyte layer.

FIG. 43A-FIG. 43E, FIG. 44A-FIG. 44E, and FIG. 45A-FIG. 45E display the images of Cell 1, Cell 3, and Cell 6, respectively. These images show that the intended structure has been achieved. A coarsely porous support has been coated with a finely porous cathode and a fully dense electrolyte. The images confirm that the porosity in both the support and the cathode is open and allows oxygen gas to be ionized in at the cathode-air interface for good cell performance. Further, the approximate average pore size for both the support and the cathode are confirmed to match the targets of 20 µm and 5 µm, respectively. The electrolyte is shown to be almost fully dense. Cracks are present in FIG. 44C and FIG. 45C, but these are the result of shrinking mismatch during firing and not incomplete sintering. An insignificant amount of closed porosity, which is likely the result of the binder in the electrolyte formulation, can be seen in FIG. 43C. A small amount of binder is necessary in the formulation to increase viscosity and is not expected to degrade cell performance. The thickness of the support is confirmed to match the target of 2 mm. The thickness of the cathode layer is confirmed to match the target of 40 μm. Finally, the relationship between electrolyte solids content and dry thickness is shown to be linear, and 14 vol % solids is shown to achieve the target thickness of 20 μM.

TABLE XII

Summary of samples characterized by SEM cross-section.

| Sample identifier | Support | | Cathode layer | | Electrolyte layer | |
|---|---|---|---|---|---|---|
| | Pore former content [vol %] | Intended average pore diameter [μm] | Pore former content [vol %] | Intended average pore diameter [μm] | Solids loading [vol %] | Thickness [μm] |
| Cell 1 | 50 | 20 | 40 | 5 | 14 | 20 |
| Cell 3 | | | | | 20 | 30 |
| Cell 6 | | | | | 26 | 40 |

FIG. 43A-FIG. 43E, FIG. 44A-FIG. 44E, and FIG. 45A-FIG. 45E display the images of Cell 1, Cell 3, and Cell 6, respectively. These images show that the intended structure has been achieved. A coarsely porous support has been coated with a finely porous cathode and a fully dense electrolyte. The images confirm that the porosity in both the support and the cathode is open and allows oxygen gas to be ionized in at the cathode-air interface for good cell performance. Further, the approximate average pore size for both the support and the cathode are confirmed to match the targets of 20 μm and 5 μm, respectively. The electrolyte is shown to be almost fully dense. Cracks are present in FIG. 44C and FIG. 45C, but these are the result of shrinking mismatch during firing and not incomplete sintering. An insignificant amount of closed porosity, which is likely the result of the binder in the electrolyte formulation, can be seen in FIG. 43C. A small amount of binder is necessary in the formulation to increase viscosity and is not expected to degrade cell performance. The thickness of the support is confirmed to match the target of 2 mm. The thickness of the cathode layer is confirmed to match the target of 40 μm. Finally, the relationship between electrolyte solids content and dry thickness is shown to be linear, and 14 vol % solids is shown to achieve the target thickness of 20 μm.

Mechanical and Thermal

The cathode-electrolyte structure, which is the focus of this work, maintained mechanical integrity throughout testing. Sensitivity to thermal shock was not an issue for the developed structure. After testing, the cathode-electrolyte structure was observed to be partially coated with solidified anode alloy which confirms that the electrolyte and anode were in good electrical contact during testing. The ceramic cement maintained adhesion and gas-tight sealing between the structure and the mullite support tube. Some discoloration of the electrolyte was observed, however no significant degradation after about 5 hours of operation at high temperature was observed.

To discover any differences on the micro scale, two used cathode-electrolyte structures were cross-sectioned and examined by SEM. A structure which was operated at 1000° C. for about 1.5 hours is detailed in FIG. 46A-FIG. 46E. A structure which was operated between 1000° C. and 1100° C. for about 5 hours is detailed in FIG. 47A-FIG. 47E.

FIG. 46A-FIG. 46E and FIG. 47A-FIG. 47E may be compared to FIG. 44A-FIG. 44E, which is a cross-section of an unused structure. Differences between the unused structure and the structure which was operated for 1.5 hours are minimal if any. There is perhaps some slight roughness in the outer edge of the structure operated for 1.5 hours. The structure which was operated for 5 hours shows some noticeable differences on the micro scale. Most significant is that the cathode-electrolyte interface is less sharply defined. This may be the result of reaction between the YSZ and LCM, or diffusion of the calcium dopant from the lanthanum manganite into the zirconia. Finally, a slight roughening of the outer edge of the electrolyte is also seen.

Figure 48:
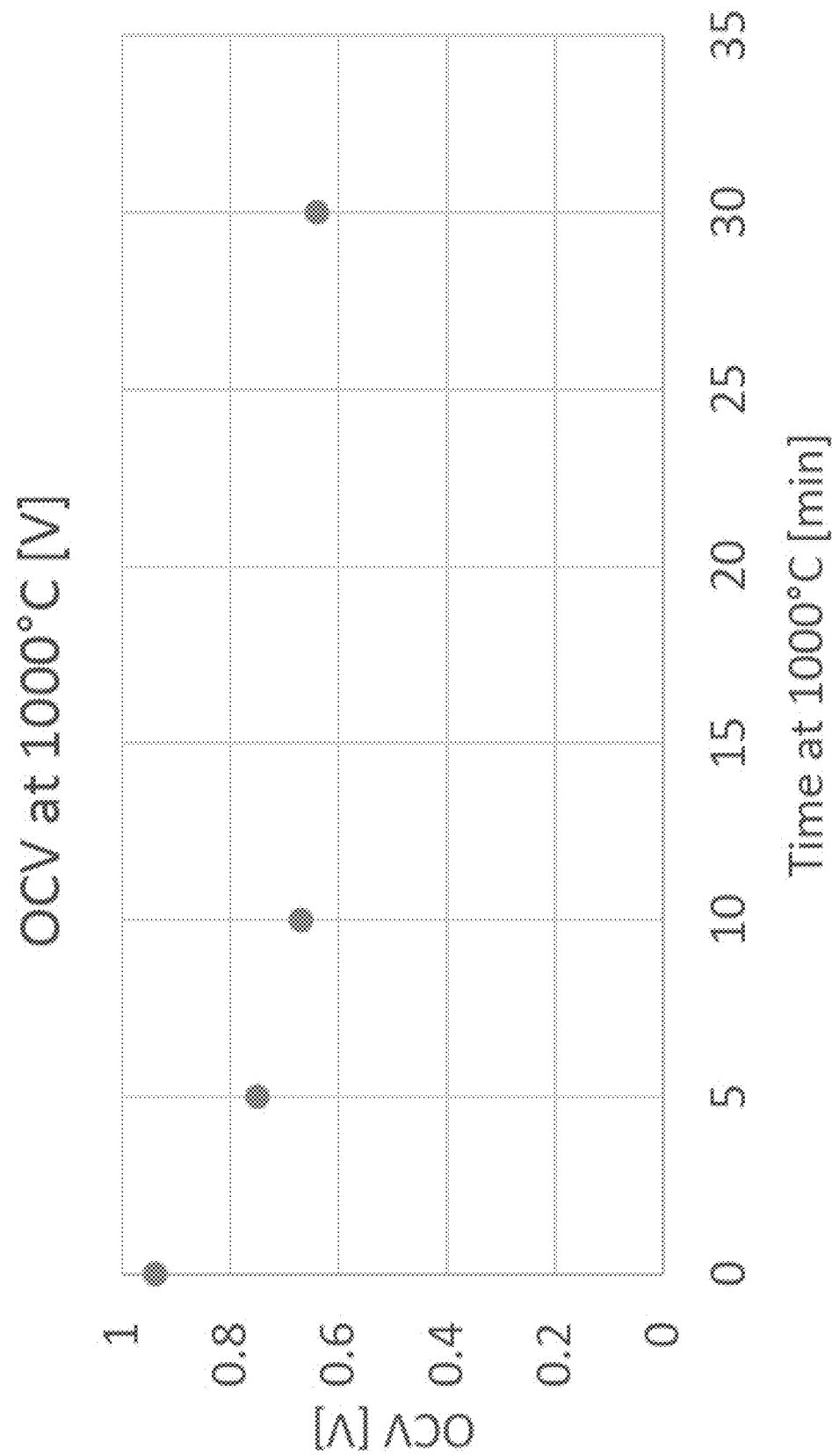
FIG. 48 is a graph showing OCV measurements over 30 minutes of operation at 1000° C.

Complete melting was achieved in the anode alloy. The graphite rod used as the anode current collector was verified to be in good electrical contact with the anode because it too was coated in metal after testing. First, the open circuit voltage (OCV) of the system was measured at 1000° C. OCV measurements over 30 minutes of operation are described in FIG. 48.

These data are important because they establish that the cathode-electrolyte structure is maintaining structural integrity. The electrolyte coating provides a robust enough separator that the circuit does not short and that the injected oxygen gas does not leak out.

$E_{th}$ for this cell at 1000° C. and 1bar was calculated to be 1.35V. The drop in OCV over 10 minutes of operation is likely due to the carbon in contact with the electrolyte being consumed during operation, which is evidence of the cell functioning as intended. As carbon is consumed in the anode in contact with the electrolyte, the activity of carbon in this region decreases. The cell was disconnected between the 10- and 30-minute measurements; the fact that OCV remains unchanged is further evidence of carbon being consumed during cell operation, and this process pausing when the cell is disconnected.

A portion of the embodiments described herein were published Jul. 8, 2021, in a thesis entitled, "High-Efficiency High Power Density Direct Carbon Fuel Cell" by Mr. Christian Faria, under the guidance of inventor Dr. Adam C. Powell, which is hereby incorporated by reference herein in its entirety. Another portion of the embodiments described herein were published December 2021 in a thesis entitled, "Development of a Support-Cathode-Electrolyte Structure for Direct Carbon Fuel Cell" by Mr. Steven Jacek, under the guidance of inventor Dr. Adam C. Powell, which is hereby incorporated by reference herein in its entirety.

The inventions described herein are the most practical methods. It is recognized, however, that departures may be made within the scope of the invention and that modifications will occur to a person skilled in the art. With respect to the above description then, it is to be realized that the optimum dimensional relationships for the parts of the invention, to include variations in size, materials, shape, form, function, steps, and manner of operation, assembly and use, would be apparent to one skilled in the art, and all equivalent relationships to those illustrated in the drawings and described in the specification are intended to be encompassed by the present inventions.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A method for generating electricity in a direct carbon fuel cell, the method comprising:
    heating and melting an alloy to obtain a liquid alloy anode;
    circulating the liquid alloy anode through a porous ceramic cathode, the cathode being a tubular structure and in communication with oxygen;
    reducing the oxygen at the porous ceramic cathode to obtain oxygen ions for diffusing through an electrolyte to the liquid alloy anode;
    oxidizing the oxygen ions at the liquid alloy anode thereby generating electricity; and
    providing vertical passages in the porous ceramic cathode to promote upward gas lift stirring.

2. The method according to claim 1 further comprising directing CO and $CO_2$ bubbles formed in the liquid alloy anode towards the surface of the liquid alloy anode for promoting upward gas lift stirring.

3. The method according to claim 2 further comprising contacting the liquid alloy anode and CO and $CO_2$ bubbles with a reactive metal for carbon capture and sequestration.

4. The method according to claim 3, the reactive metal is at least one selected from: magnesium, calcium, strontium, potassium, barium, and francium.

5. The method according to claim 1, wherein the cathode is a vertical tubular structure.

6. The method according to claim 1, wherein the cathode is a horizontal tubular structure.

7. The method according to claim 1, the cathode further comprises a coating of the electrolyte.

8. The method according to claim 1, the liquid alloy anode comprising at least one of: iron, carbon, manganese, nickel, cobalt, chromium, tin, molybdenum, silicon, and antimony.

9. The method according to claim 1 further comprising controlling a generation rate of electricity by varying a flow of oxygen.

10. A direct carbon fuel cell device comprising a porous ceramic tubular cathode, the cathode being coated with an electrolyte;
    a liquid alloy anode, the anode being circulated through the tubular cathode; and
    wherein the cathode includes at least one coarsely porous ceramic block having a plurality of vertical passages cut through the block to promote upward gas lift stirring by directing CO and $CO_2$ bubbles.

11. The device according to claim 10 further comprises an oxygen source.

12. The device according to claim 11, the oxygen source is ambient air.

13. The device according to claim 10, the porous ceramic cathode being at least one perovskite material selected from: $La_{0.8}Sr_{0.2}MnO_3$ (LSM), $La_{0.8}Ca_{0.2}MnO_3$ (LCM), magnesium oxide, and zirconium oxide.

14. The device according to claim 10, the electrolyte being at least one material selected from: yttria-stabilized zirconia (YSZ), scandia-stabilized zirconia (ScSZ), or samaria-doped ceria (SDC), and gadolinia-doped ceria (GDC).

15. The device according to claim 10, the porous ceramic tubular cathode being configured vertically or horizontally.

16. The device according to claim 10 further comprises a reactive metal carbon capture and sequestration unit.

17. The device according to claim 10, the cathode has an electronic conductivity of 10 $(\Omega \cdot cm)^{-1}$ to 100 $(\Omega \cdot cm)^{-1}$ at 700° C.

18. The device according to claim 10 further comprises at least one cell connected to the device through electrical leads.

19. The device according to claim 18, the cell is connected at high temperature to reduce energy losses in the electrical leads.

20. The device according to claim 10 further comprises a slag layer for absorbing electropositive impurities.

* * * * *